United States Patent
Ushijima

(10) Patent No.: US 11,468,580 B2
(45) Date of Patent: Oct. 11, 2022

(54) CALCULATION METHOD, COMPUTER-READABLE RECORDING MEDIUM RECORDING CALCULATION PROGRAM, AND INFORMATION PROCESSING APPARATUS

(71) Applicant: FUJITSU LIMITED, Kawasaki (JP)

(72) Inventor: Satoru Ushijima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/220,434

(22) Filed: Apr. 1, 2021

(65) Prior Publication Data

US 2021/0225016 A1 Jul. 22, 2021

Related U.S. Application Data

(63) Continuation of application No. PCT/JP2018/038872, filed on Oct. 18, 2018.

(51) Int. Cl.
*G06T 7/37* (2017.01)
*G06T 3/00* (2006.01)
(Continued)

(52) U.S. Cl.
CPC .............. *G06T 7/37* (2017.01); *G06T 3/0075* (2013.01); *G01S 7/4802* (2013.01); *G01S 17/42* (2013.01);
(Continued)

(58) Field of Classification Search
CPC ....... G06T 7/37; G06T 3/4038; G06T 3/0075; G06T 2207/30204; G06T 2200/24; G06T 2207/10028
See application file for complete search history.

(56) References Cited

U.S. PATENT DOCUMENTS 9,201,424 B1 * 12/2015 Ogale .................. G06T 7/80
2009/0232388 A1 * 9/2009 Minear ................ G06T 3/0075
382/154
(Continued)

FOREIGN PATENT DOCUMENTS

CN 103679741 B 1/2017
JP 2010-66595 A 3/2010
(Continued)

OTHER PUBLICATIONS

Paul J. Besl et al., "A Method for Registration of 3-D Shapes", IEEE Transactions on Pattern Analysis and Machine Intelligence, vol. 14, No. 2, pp. 239-256, Feb. 1992 (Total 18 pages).
(Continued)

*Primary Examiner* — Phi Hoang
(74) *Attorney, Agent, or Firm* — Fujitsu Patent Center

(57) ABSTRACT

A calculation method for causing a computer to execute processing of: acquiring first measurement information including information of a distance to an object measured by a first sensor, and second measurement information including information of a distance to the object measured by a second sensor; acquiring a first vector, a second vector in a different direction from the first vector, and a first translation point from the first measurement information; acquiring information of a third vector treated as a vector parallel to and in a same direction as the first vector, a fourth vector treated as a vector parallel to and in a same direction as the second vector, and a second translation point treated as a same position as the first translation point from the second measurement information; calculating a rotation angle and a translation distance for aligning a point group of the object measured by the second sensor.

20 Claims, 40 Drawing Sheets

(51) Int. Cl.
*G01S 7/48* (2006.01)
*G01S 17/42* (2006.01)

(52) U.S. Cl.
CPC .................. *G06T 2200/24* (2013.01); *G06T 2207/10028* (2013.01); *G06T 2207/30204* (2013.01)

(56) References Cited

U.S. PATENT DOCUMENTS

| | | | |
|---|---|---|---|
| 2014/0003705 A1 | 1/2014 | Taguchi et al. | |
| 2018/0101932 A1* | 4/2018 | Kwon | G06T 7/50 |
| 2018/0283851 A1* | 10/2018 | Watanabe | G01B 11/24 |
| 2018/0313942 A1* | 11/2018 | Wu | G01S 7/4808 |
| 2019/0130525 A1* | 5/2019 | Mou | G06T 3/0031 |
| 2019/0226852 A1* | 7/2019 | Xie | G01C 21/20 |
| 2019/0266748 A1* | 8/2019 | Ahmad | G06T 7/74 |
| 2020/0034989 A1 | 1/2020 | Koyama et al. | |
| 2020/0388004 A1* | 12/2020 | Zhang | G06T 7/337 |

FOREIGN PATENT DOCUMENTS

| | | |
|---|---|---|
| JP | 2013-161133 A | 8/2013 |
| JP | 2017-106749 A | 6/2017 |
| JP | 2017-166846 A | 9/2017 |
| JP | 6396982 B2 | 9/2018 |
| WO | 2017/033692 A1 | 3/2017 |
| WO | 2017/056567 A1 | 4/2017 |
| WO | 2018/181249 A1 | 10/2018 |

OTHER PUBLICATIONS

International Search Report and Written Opinion of the International Searching Authority (Form PCT/ISA/210, 220, and 237), mailed in connection with PCT/JP2018/038872 and dated Jan. 15, 2019 (Total 8 pages).

Extended European Search Report dated Oct. 5, 2021 for corresponding European Patent Application No. 18937479.6, 5 pages.

* cited by examiner

FIG. 9

| FIRST DISTANCE IMAGE INFORMATION | | SECOND DISTANCE IMAGE INFORMATION | |
|---|---|---|---|
| COORDINATE INFORMATION OF EACH POINT GROUP MEASURED BY SENSOR 10A | INFORMATION OF VISIBLE IMAGE CAPTURED BY SENSOR 10A | COORDINATE INFORMATION OF EACH POINT GROUP MEASURED BY SENSOR 10B | INFORMATION OF VISIBLE IMAGE CAPTURED BY SENSOR 10B |

| MARKER CHARACTERISTIC | FIRST VECTOR | | SECOND VECTOR | | THIRD VECTOR | | FOURTH VECTOR | | TRANSLATION POINT |
|---|---|---|---|---|---|---|---|---|---|
| | START POINT | END POINT | START POINT | END POINT | START POINT | END POINT | START POINT | END POINT | |
| TRIANGLE | ON | OFF | OFF | OFF | OFF | OFF | OFF | OFF | OFF |
| QUADRANGLE | OFF | ON | ON | OFF | ON | OFF | ON | OFF | ON |
| PENTAGON | OFF | OFF | OFF | OFF | OFF | ON | OFF | OFF | OFF |
| HEXAGON | OFF | OFF | OFF | ON | OFF | OFF | OFF | ON | OFF |

| | 441 | | 442 |
|---|---|---|---|
| TIME $T_1$ | FIRST DISTANCE IMAGE INFORMATION AT TIME $T_1$ | TIME $T_1$ | SECOND DISTANCE IMAGE INFORMATION AT TIME $T_1$ |
| TIME $T_2$ | FIRST DISTANCE IMAGE INFORMATION AT TIME $T_2$ | TIME $T_2$ | SECOND DISTANCE IMAGE INFORMATION AT TIME $T_2$ |
| TIME $T_3$ | FIRST DISTANCE IMAGE INFORMATION AT TIME $T_3$ | TIME $T_3$ | SECOND DISTANCE IMAGE INFORMATION AT TIME $T_3$ |
| ... | ... | ... | ... |

| VECTOR TYPE | SELECTED START POINT COORDINATES | SELECTED END POINT COORDINATES | CANDIDATE START POINT COORDINATES | CANDIDATE END POINT COORDINATES |
|---|---|---|---|---|
| FIRST VECTOR | (xs1, ys1, zs1) | (xe1, ye1, ze1) | (xs1-1, ys1-1, zs1-1), (xs1-2, ys1-2, zs1-2), (xs1-3, ys1-3, zs1-3), (xs1-4, ys1-4, zs1-4) | (xe1-1, ye1-1, ze1-1), (xe1-2, ye1-2, ze1-2), (xe1-3, ye1-3, ze1-3), (xe1-4, ye1-4, ze1-4) |
| SECOND VECTOR | (xs2, ys2, zs2) | (xe2, ye2, ze2) | (xs2-1, ys2-1, zs2-1), (xs2-2, ys2-2, zs2-2), (xs2-3, ys2-3, zs2-3), (xs2-4, ys2-4, zs2-4) | (xe2-1, ye2-1, ze2-1), (xe2-2, ye2-2, ze2-2), (xe2-3, ye2-3, ze2-3), (xe2-4, ye2-4, ze2-4) |
| THIRD VECTOR | (xs3, ys3, zs3) | (xe3, ye3, ze3) | (xs3-1, ys3-1, zs3-1), (xs3-2, ys3-2, zs3-2), (xs3-3, ys3-3, zs3-3), (xs3-4, ys3-4, zs3-4) | (xe3-1, ye3-1, ze3-1), (xe3-2, ye3-2, ze3-2), (xe3-3, ye3-3, ze3-3), (xe3-4, ye3-4, ze3-4) |
| FOURTH VECTOR | (xs4, ys4, zs4) | (xe4, ye4, ze4) | (xs4-1, ys4-1, zs4-1), (xs4-2, ys4-2, zs4-2), (xs4-3, ys4-3, zs4-3), (xs4-4, ys4-4, zs4-4) | (xe4-1, ye4-1, ze4-1), (xe4-2, ye4-2, ze4-2), (xe4-3, ye4-3, ze4-3), (xe4-4, ye4-4, ze4-4) |

542

| TRANSLATION POINT TYPE | SELECTED COORDINATES | CANDIDATE COORDINATES |
|---|---|---|
| FIRST TRANSLATION POINT | (x1, y1, z1) | (x1-1, y1-1, z1-1), (x1-2, y1-2, z1-2), (x1-3, y1-3, z1-3), (x1-4, y1-4, z1-4) |
| SECOND TRANSLATION POINT | (x2, y2, z2) | (x2-1, y2-1, z2-1), (x2-2, y2-2, z2-2), (x2-3, y2-3, z2-3), (x2-4, y2-4, z2-4) |

CALCULATION METHOD, COMPUTER-READABLE RECORDING MEDIUM RECORDING CALCULATION PROGRAM, AND INFORMATION PROCESSING APPARATUS

CROSS-REFERENCE TO RELATED APPLICATION

This application is a continuation application of International Application PCT/JP2018/038872 filed on Oct. 18, 2018 and designated the U.S., the entire contents of which are incorporated herein by reference.

FIELD

The embodiment relates to a calculation method, and the like.

BACKGROUND

There is a technique of detecting a three-dimensional point group of an object using a distance measuring device such as a laser sensor and recognizing a posture and the like of the object. In the following description, a laser sensor that detects a three-dimensional point group of an object is simply referred to as a "sensor".

Related art is disclosed in Patent Document 2: Japanese Laid-open Patent Publication No. 2017-106749, Japanese Laid-open Patent Publication No. 2017-166846, and P. J. BesI and N. D. McKay, "A method for registration of 3-D shapes, & quot; IEEE Transactions on Pattern Analysis and Machine Intelligence, vol. 14, no. 2, pp. 239-256, 1992.

SUMMARY

According to an aspect of the embodiments, a calculation method for causing a computer to execute processing of: acquiring first measurement information including information of a distance to an object measured by a first sensor, and second measurement information including information of a distance to the object measured by a second sensor; acquiring a first vector, a second vector in a different direction from the first vector, and a first translation point from the first measurement information; acquiring information of a third vector treated as a vector parallel to and in a same direction as the first vector in a real space, a fourth vector treated as a vector parallel to and in a same direction as the second vector in the real space, and a second translation point treated as a same position as the first translation point in the real space from the second measurement information; calculating a rotation angle and a translation distance for aligning a point group of the object measured by the second sensor with respect to a point group of the object measured by the first sensor on the basis of an end point of the first vector, an end point of the second vector, the first translation point, an end point of the third vector, an end point of the fourth vector, and the second translation point; and storing the rotation angle and the translation distance in a storage device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram illustrating an example of a data structure of a distance image table according to the present embodiment 1.

FIG. 19 is a diagram illustrating an example of a data structure of marker definition information.

FIG. 26 is a diagram illustrating an example of a data structure of a distance image table according to the present embodiment 3.

FIG. 31 is a diagram illustrating an example of a data structure of a specification table.

DESCRIPTION OF EMBODIMENTS

A three-dimensional point group of an object viewed from a sensor side (one direction) can be obtained by using one sensor but the three-dimensional point group of the object viewed from an opposite side of the sensor cannot be obtained. Therefore, there are some cases where recognition accuracy for the posture and the like of the object are deteriorated. Therefore, the recognition accuracy for a posture and the like of an object is improved by obtaining three-dimensional point groups of the object viewed from a plurality of directions using a plurality of sensors.

Here, in the case of detecting a three-dimensional point group of an object using a plurality of sensors, processing of aligning three-dimensional point groups respectively detected by the sensors and integrating the three-dimensional point groups into one three-dimensional point group is performed. In the following description, the processing of aligning three-dimensional point groups respectively detected by the sensors and integrating the three-dimensional point groups into one three-dimensional point group is described as "calibration".

As a technique for calibration, there is a device using an iterative closest point (ICP). The device searches for a value at which a distance between a vicinity point of a first three-dimensional point group and a vicinity point of a fixed second three-dimensional point group is minimized while translating and rotating the first three-dimensional point group, thereby specifying a translation value and a rotation angle for aligning the first three-dimensional point group and the second three-dimensional point group.

However, the above-described technique has a problem that respective point groups measured by a plurality of sensors cannot be aligned.

Figure 36:
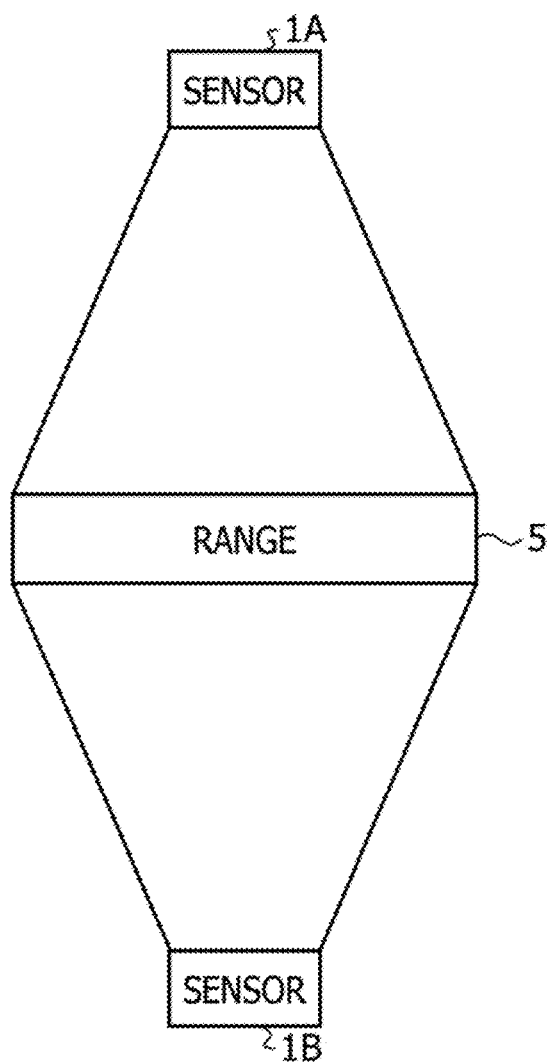
FIG. 36 is a diagram illustrating a first sensor arrangement example.

FIG. 36 is a diagram illustrating a first sensor arrangement example. In the example illustrated in FIG. 36, a sensor 1A and a sensor 1B are arranged to face each other. Furthermore, a target range for distance measurement is "range 5". As for the range 5, an overlap of measurable ranges by the sensors 1A and 1B is large, and thus a three-dimensional point group of the sensor 1A and a three-dimensional point group of the sensor 1B can be aligned on the basis of the technique.

Figure 37:
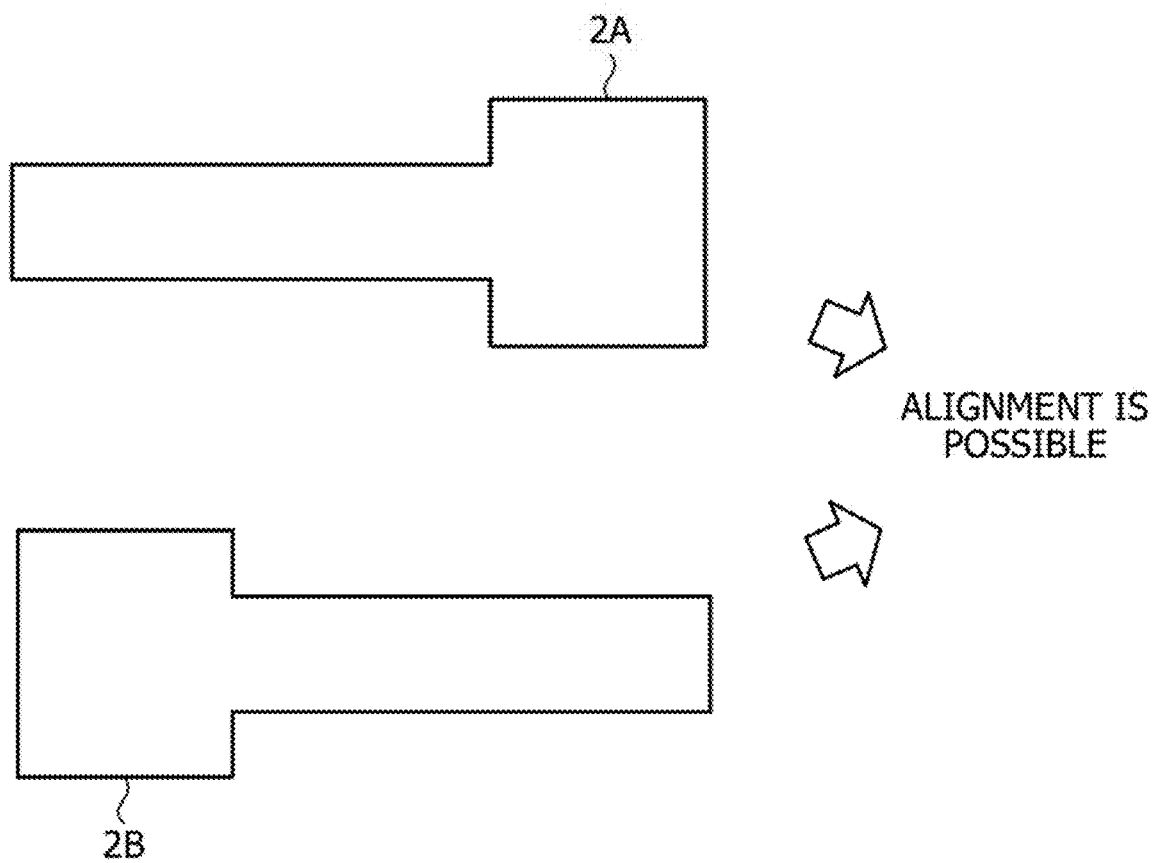
FIG. 37 is a diagram illustrating an example of distance measurement results of the first sensor arrangement example.

FIG. 37 is a diagram illustrating an example of distance measurement results of the first sensor arrangement example. In FIG. 37, a measurement result (three-dimensional point group) 2A is the measurement result of the sensor LA. A measurement result (three-dimensional point group) 2B is the measurement result of the sensor 18. For example, a common part can be easily specified in the measurement results 2A and 2B, and the three-dimensional point group of the sensor 1A and the three-dimensional point group of the sensor 1B can be aligned.

Here, the sensors have a characteristic that a measurable range becomes wider but the density of the three-dimensional point group becomes lower as the distance is larger. Furthermore, the sensors have a characteristic that the measurable range becomes narrower but the density of the three-dimensional point group becomes higher as the distance is shorter.

In the case where the target range for distance measurement becomes wider, the entire target range for distance measurement can be covered by arranging the sensors farther but the density of the three-dimensional point groups becomes lower, and the recognition accuracy for the posture and the like of the object may not be able to be obtained. Therefore, a plurality of sensors may be arranged as illustrated in FIG. 38.

Figure 38:
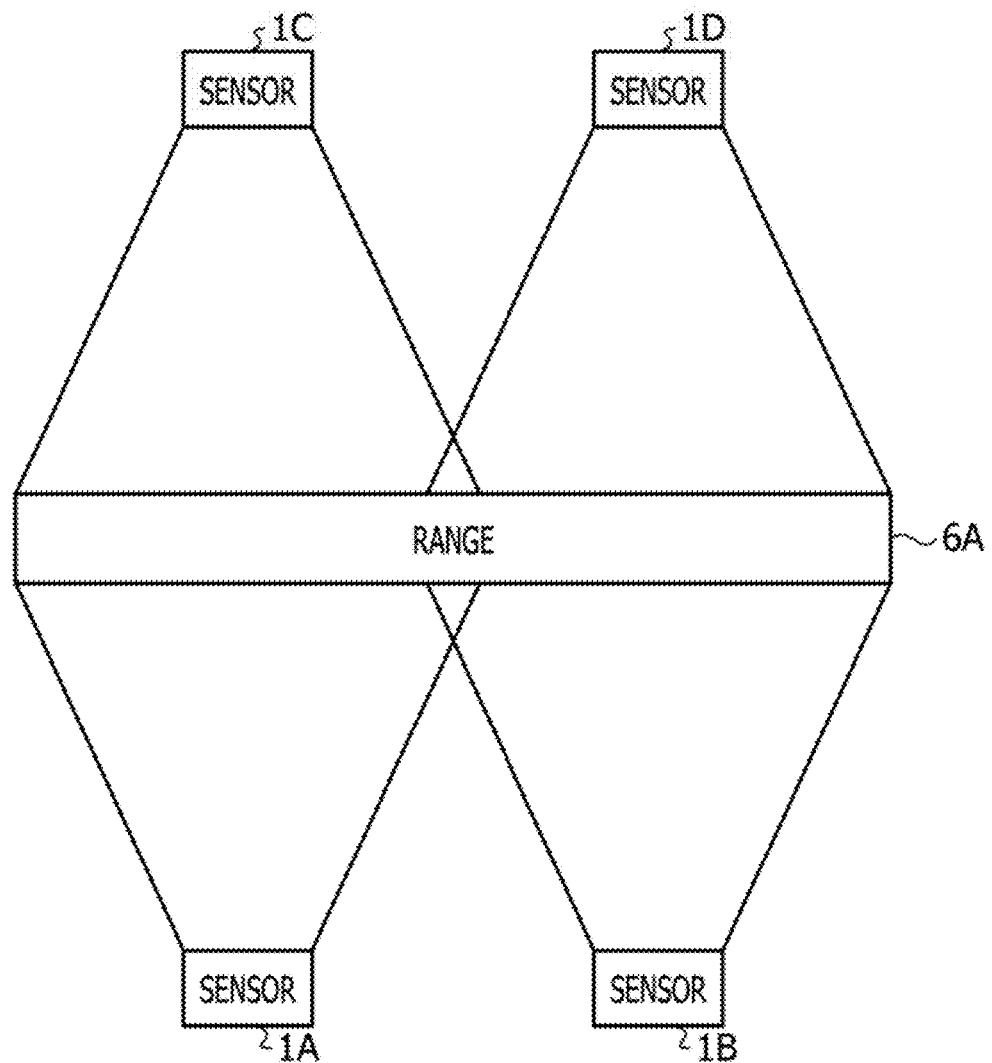
FIG. 38 is a diagram illustrating a second sensor arrangement example.

FIG. 38 is a diagram illustrating a second sensor arrangement example. In the example illustrated in FIG. 38, the sensor 1B is arranged in a side direction of the sensor 1A. A sensor 1D is arranged in a side direction of a sensor 1C. The sensor 1A and the sensor 1C are arranged to face each other. The sensor 1B and the sensor 1D are arranged to face each other. The target range for distance measurement is a "range 6A". Since the pair of the sensor 1A and the sensor 1C and the pair of the sensor 1B and the sensor 1D have a large overlap in the measurable ranges of the respective sensors, the respective three-dimensional point groups can be aligned. However, since the pair of the sensor 1A and the sensor 1B and the pair of the sensor 1C and the sensor 1D have a small overlap in the measurable ranges of the respective sensors, the alignment of the respective three-dimensional point groups is difficult by the technique.

Figure 39:
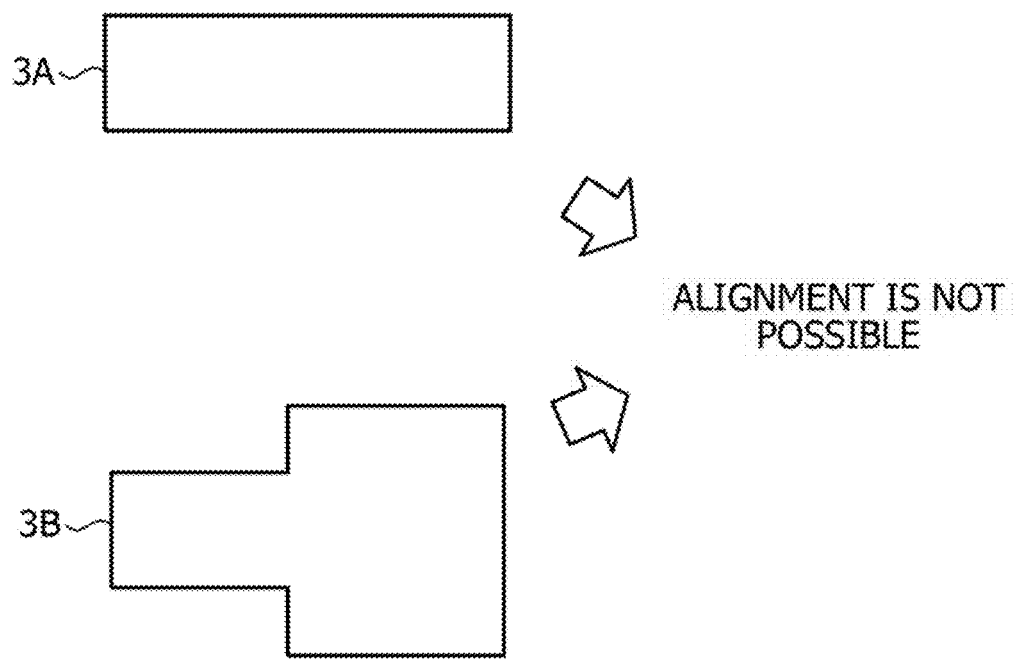
FIG. 39 is a diagram (1) Illustrating an example of distance measurement results of the second sensor arrangement example.

FIG. 39 is a diagram (1) Illustrating an example of distance measurement results of the second sensor arrangement example. In FIG. 39, a measurement result (three-dimensional point group) 3A is the measurement result of the sensor 1A. A measurement result (three-dimensional point group) 3B is the measurement result of the sensor 18. In FIG. 39, specifying a common part is difficult, unlike the case illustrated in FIG. 37.

Figure 40:
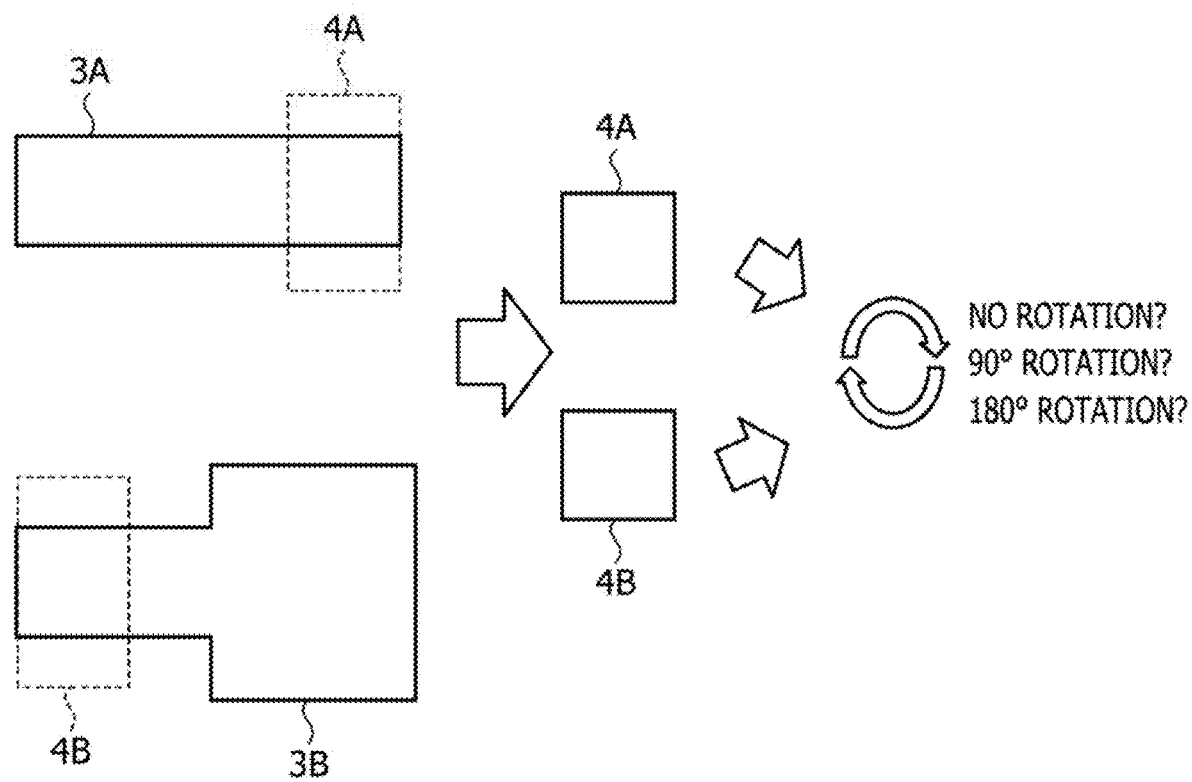
FIG. 40 is a diagram (2) illustrating an example of distance measurement results of the second sensor arrangement example.

FIG. 40 is a diagram (2) illustrating an example of distance measurement results of the second sensor arrangement example. For example, even if a range 4A of the measurement result 3A and a range 4B of the measurement result 3B are taken out as a common range, the number of three-dimensional point groups included in the common range may be small and the shape may not be sufficiently characteristic. If the number of three-dimensional point groups included in the common range is small, it is difficult to determine whether rotation is not necessary, 90-degree rotation is appropriate, 180-degree rotation is appropriate, or the like and it is not possible to perform alignment in the case of aligning the range 4A and the range 4B.

As described above, when the overlap between the measurement ranges of the two sensors is small, and the number of three-dimensional point groups included in the overlap portion of the respective sensors is small, alignment cannot be performed.

In one aspect, a calculation method, a calculation program, and an information processing apparatus for generating information for aligning respective point groups measured by a plurality of sensors even in a case where an overlap of measurement ranges of two sensors is small, and the number of three-dimensional point groups included in the overlap portion of the respective sensors is small may be provided. [0021] Hereinafter, embodiments of a calculation method, a calculation program, and an information processing apparatus according to the present invention will be described in detail with reference to the drawings. Note that the present invention is not limited by the embodiments.

Embodiment 1

Figure 1:
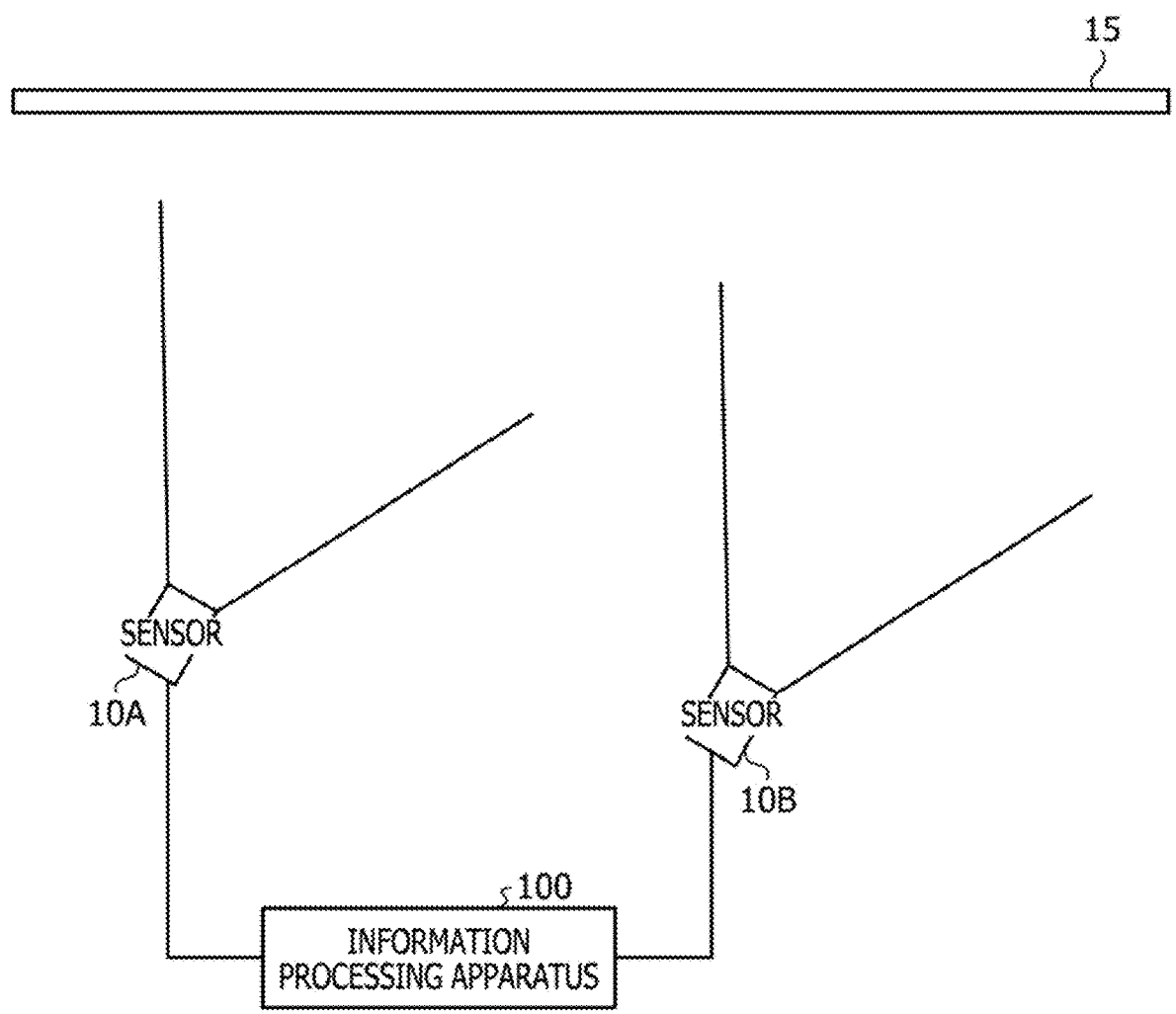
FIG. 1 is a diagram illustrating an example of a system according to the present embodiment 1.

FIG. 1 is a diagram illustrating an example of a system according to the present embodiment 1. As illustrated in FIG. 1, the system includes a sensor 10A, a sensor 10B, and an information processing apparatus 100. A distance measuring direction of the sensor 10A and the sensor 10B is a direction of a wall 15. The sensor 10A and the sensor 10B are arranged side by side. The information processing apparatus 100 is connected to the sensor 10A and the sensor 10B.

Figure 2:
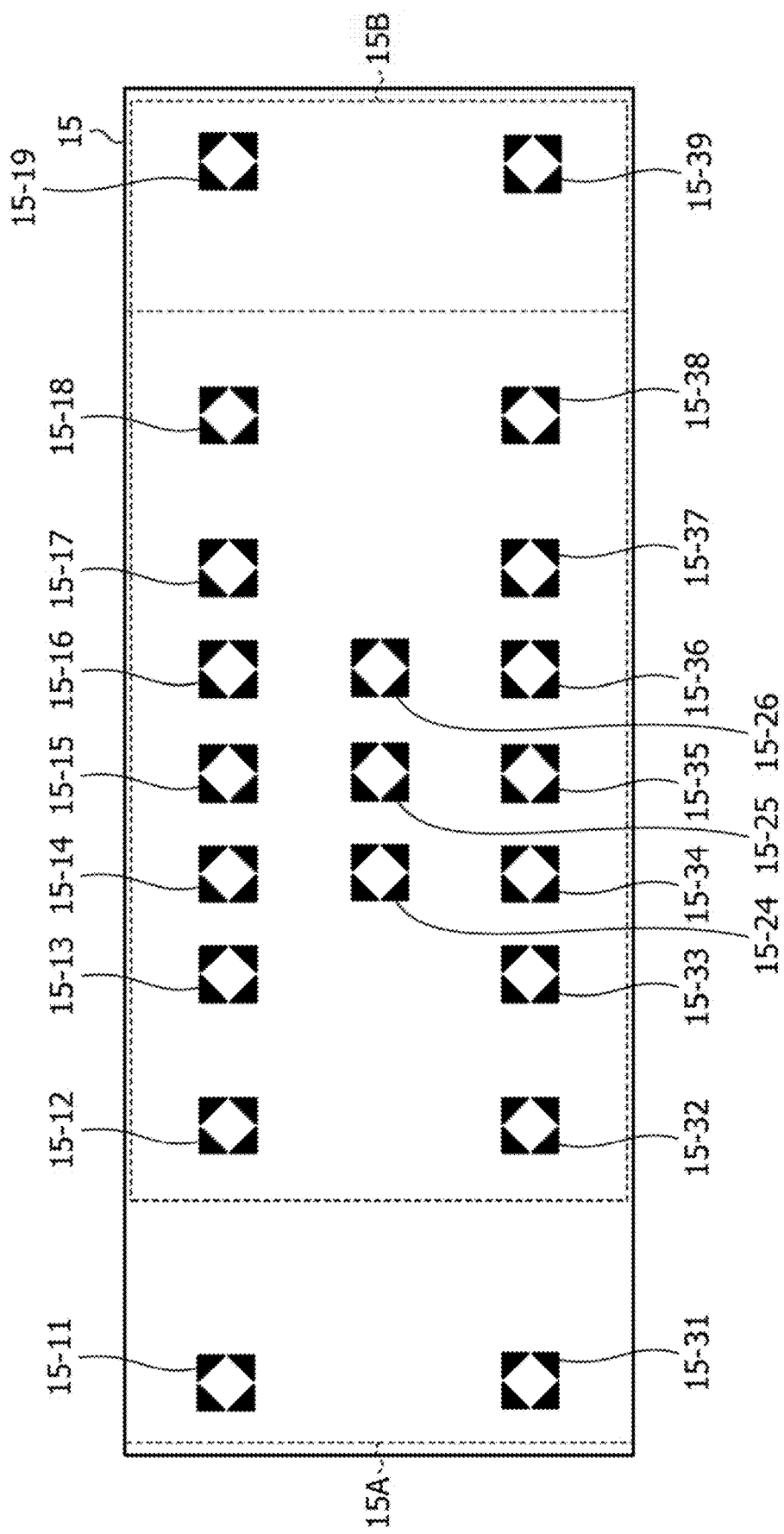
FIG. 2 is a diagram illustrating an example of an appearance of a wall.

FIG. 2 is a diagram illustrating an example of an appearance of the wall. As illustrated in FIG. 2, a plurality of marks is arranged on the wall 15. For example, a measurable range by the sensor 10A is a range 15A, and a measurable range by the sensor 10B is a range 15B on the wall 15.

For example, marks 15-11 to 15-19 are horizontally lined up. Marks 15-24 to 15-26 are horizontally lined up. Marks 15-31 to 15-39 are horizontally lined up. A straight line passing through the marks 15-11 to 15-19, a straight line passing through the marks 15-24 to 15-26, and a straight line passing through the marks 15-31 to 15-39 are parallel to one another.

Furthermore, an angle formed by a straight line passing through the marks 15-14, 15-24, and 15-34, and the straight line passing through the marks 15-11 to 15-19 is 90 degrees. An angle formed by a straight line passing through the marks 15-15, 15-25, and 15-35, and the straight line passing through the marks 15-11 to 15-19 is 90 degrees. An angle formed by a straight line passing through the marks 15-16, 15-26, and 15-36, and the straight line passing through the marks 15-11 to 15-19 is 90 degrees.

The sensor 10A is a measuring device that emits a laser beam and measures a distance between a point group constituting an object (wall 15) and the sensor 10A. Furthermore, the sensor 10A captures a visible image. The sensor 10A outputs first distance image information to the information processing apparatus 100. The first distance image information includes information of the distance between the point group constituting the object (wall 15) and the sensor 10A, and information of the visible image. The visible image described in the present embodiment corresponds to an image captured by a general camera.

The sensor 10B is a measuring device that emits a laser beam and measures a distance between a point group constituting the object (wall 15) and the sensor 10B. Furthermore, the sensor 10B captures a visible image. The sensor 10B outputs second distance image information to the information processing apparatus 100. The second distance image information includes information of the distance between the point group constituting the object (wall 15) and the sensor 10B, and information of the visible image.

Figure 3:
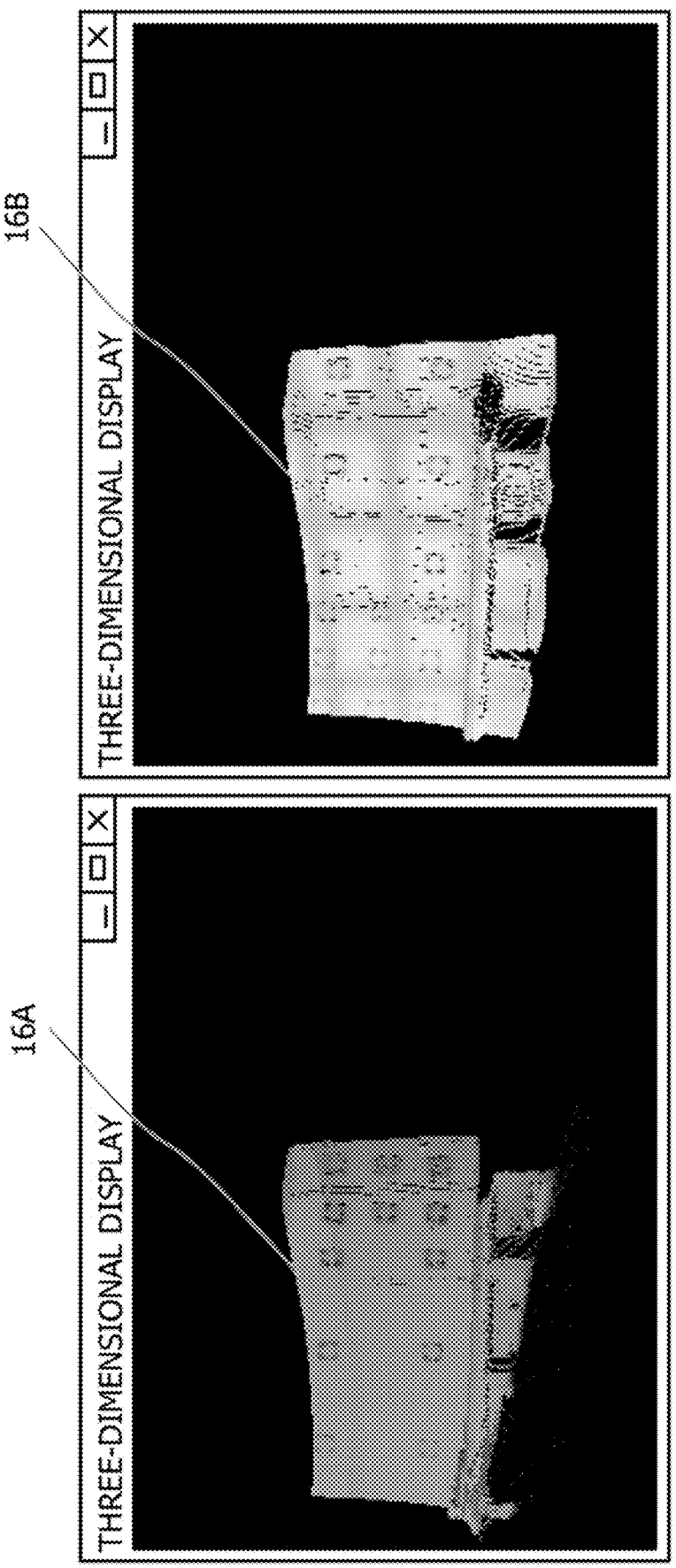
FIG. 3 is a diagram illustrating examples of point groups included in respective pieces of distance image information.

FIG. 3 is a diagram illustrating examples of the point groups included in the respective pieces of distance image information. In FIG. 3, as an example, each point group is illustrated according to reflection intensity. A point group 16A is a point group measured by the sensor 10A. A point group 16B is a point group measured by the sensor 10B.

Figure 4:
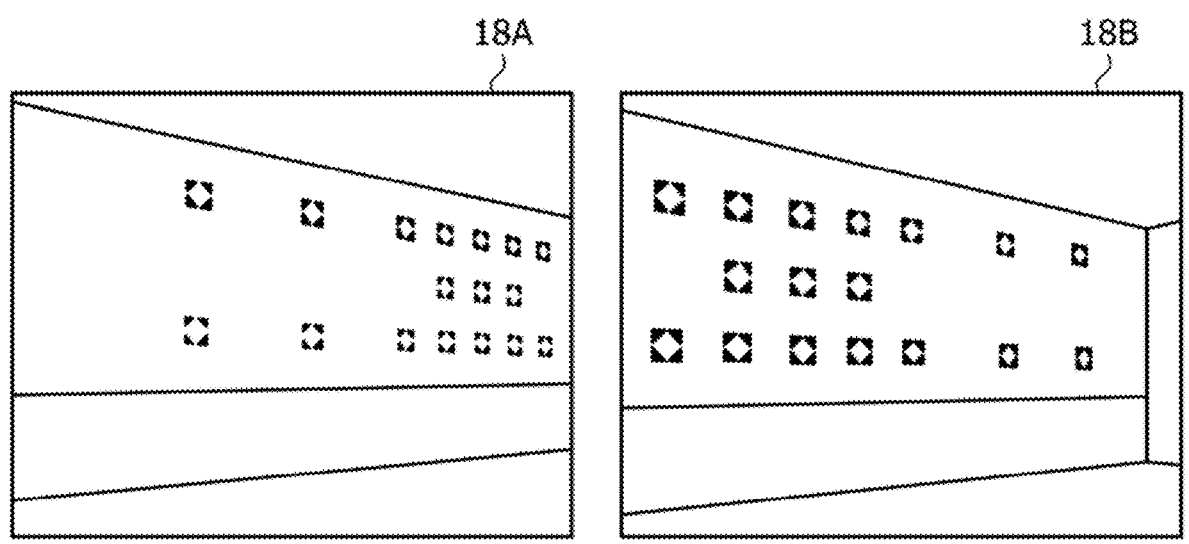
FIG. 4 is a diagram illustrating examples of respective visible images.

FIG. 4 is a diagram illustrating examples of the respective visible images. In FIG. 4, an image 18A is the visible image captured by the sensor 10A. An image 18B is the visible image captured by the sensor 10B.

The description returns to FIG. 1. The information processing apparatus 100 is a device that calculates parameters for aligning the point group measured by the sensor 10A and the point group measured by the sensor 10B on the basis of the first distance image information and the second distance image information. The parameters include a rotation angle and a translation distance.

In the case of aligning the respective point groups, the information processing apparatus 100 detects vectors for rotation alignment and points for translation alignment from the first distance image information and the second distance image information.

In the present embodiment 1, the vectors for rotation alignment detected from the first distance image information are described as "first vector" and "second vector". The point for translation alignment detected from the first distance image information is described as "first translation point".

Furthermore, the vectors for rotation alignment detected from the second distance image information are described as "third vector" and "fourth vector". The point for translation alignment detected from the second distance image information is described as "second translation point".

Here, the first vector and the third vector are assumed to satisfy "condition 1". The condition 1 is a condition that "the direction of the first vector and the direction of the third vector are the same in a real space". Note that the position of the first vector and the position of the third vector do not have to be the same in the real space. The length of the first vector and the length of the third vector do not have to be the same in the real space.

The second vector and the fourth vector are assumed to satisfy "condition 2". The condition 2 is a condition that "the direction of the second vector and the direction of the fourth vector are the same in the real space". Note that the position of the second vector and the position of the fourth vector do not have to be the same in the real space. The length of the second vector and the length of the fourth vector do not have to be the same in the real space.

The first vector (third vector) and the second vector (fourth vector) are assumed to satisfy "condition 3". The condition 3 is a condition that "the first vector (third vector) and the second vector (fourth vector) are not in the same direction and are not in opposite directions in the real space". The angle formed by the first vector (third vector) and the second vector (fourth vector) is desirably close to 90 degrees.

The first translation point and the second translation point are assumed to satisfy "condition 4". The condition 4 is a condition that "the position of the first translation point and the position of the second translation point are the same position in the real space".

The Information processing apparatus 100 according to the present embodiment 1 generates and displays an instruction screen based on visible images of the sensors 10A and 10B, and receives selection of start points and end points of first to fourth vectors and first and second translation points from a user. In the case of selecting the start points and end points of the first to fourth vectors and the first and second translation points, the user makes sure that the above-described conditions 1 to 4 are satisfied.

Figure 5:
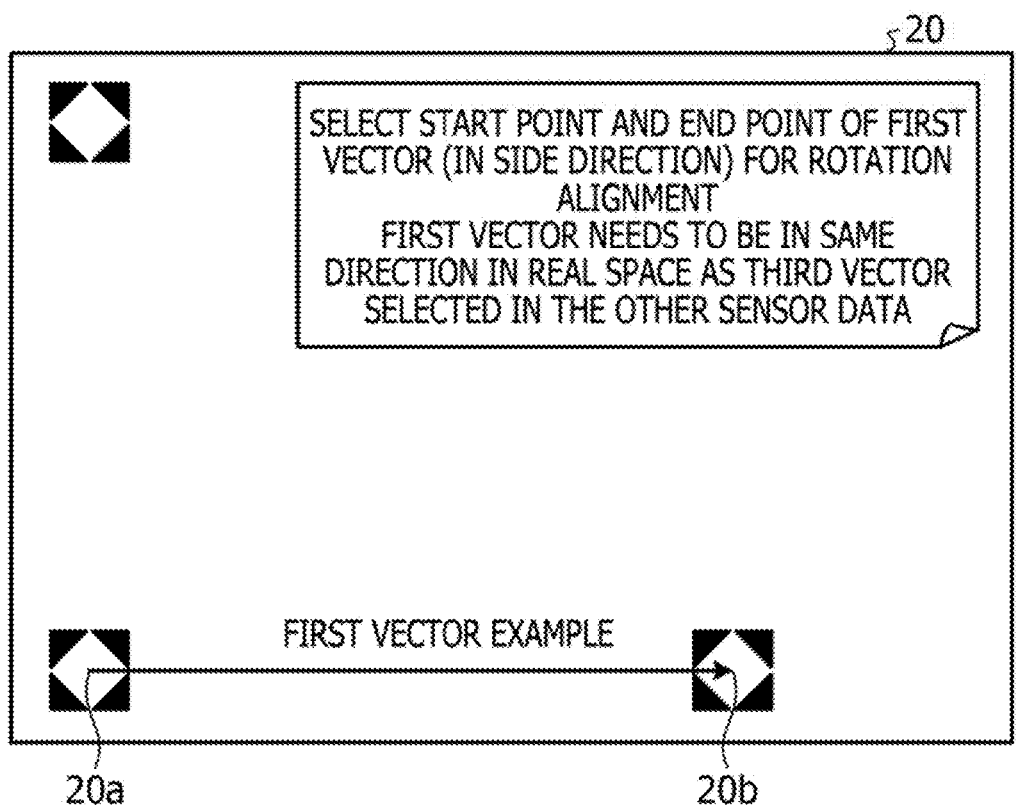
FIG. 5 is a diagram (1) illustrating an example of an instruction screen according to the present embodiment 1.

FIG. 5 is a diagram (1) illustrating an example of the instruction screen according to the present embodiment 1. An instruction screen 20 illustrated in FIG. 5 is a screen generated on the basis of the visible image of the sensor 10A. The user refers to the instruction screen 20 and operates an input device of the information processing apparatus 100 to select the start point of the first vector and the end point of the first vector. In the example illustrated in FIG. 5, a point 20a is selected as the start point of the first vector, and a point 20b is selected as the end point of the first vector.

Although not illustrated, the information processing apparatus 100 displays the instruction screen that receives selection of the third vector on the basis of the visible image of the sensor 10B. The user refers to the instruction screen and selects the start point of the third vector and the end point of the third vector. In the case of selecting the first vector and the third vector, the user makes sure that the first vector and the third vector satisfy the condition 1.

Figure 6:
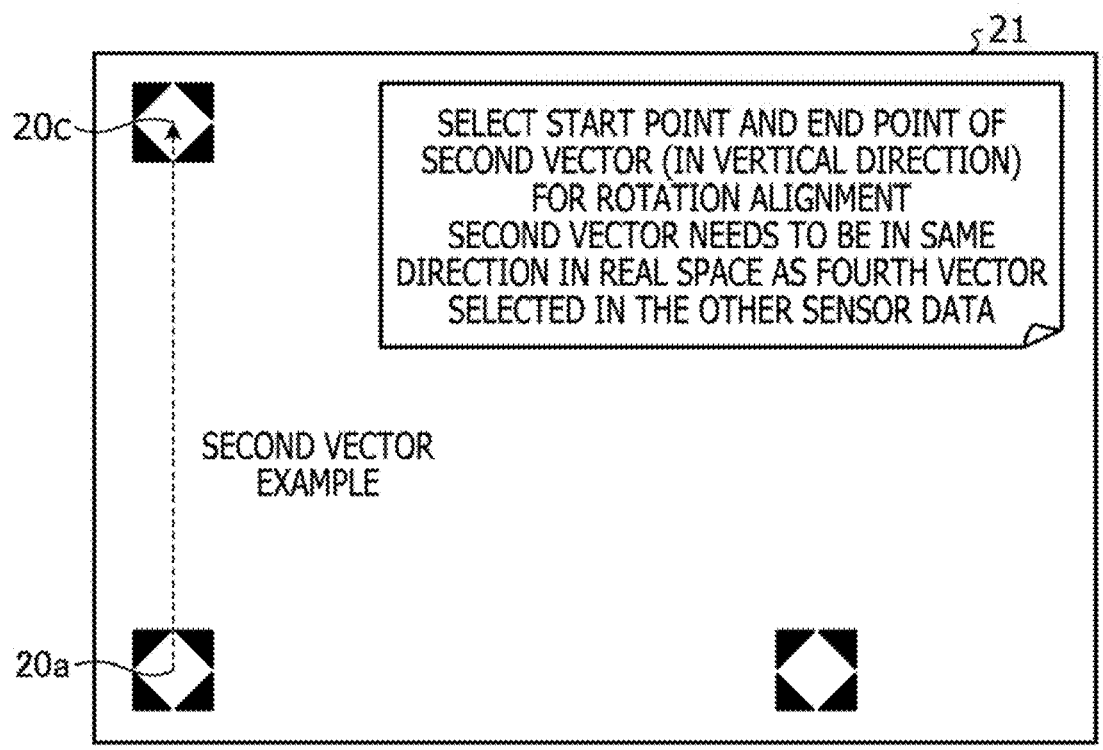
FIG. 6 is a diagram (2) Illustrating an example of the instruction screen according to the present embodiment 1.

FIG. 6 is a diagram (2) illustrating an example of the instruction screen according to the present embodiment 1. An instruction screen 21 illustrated in FIG. 6 is a screen generated on the basis of the visible image of the sensor 10A. The user refers to the instruction screen 21 and operates the input device of the information processing apparatus 100 to select the start point of the second vector and the end point of the second vector. In the example illustrated in FIG. 6, the point 20a is selected as the start point of the second vector, and a point 20c is selected as the end point of the second vector.

Although not illustrated, the information processing apparatus 100 displays the instruction screen that receives selection of the fourth vector on the basis of the visible image of the sensor 10B. The user refers to the instruction screen and selects the start point of the fourth vector and the end point of the fourth vector. In the case of selecting the second vector and the fourth vector, the user makes sure that the second vector and the fourth vector satisfy the condition 2. The user makes sure that the first vector and the second vector satisfy the condition 3. The user makes sure that the third vector and the fourth vector satisfy the condition 3.

Figure 7:
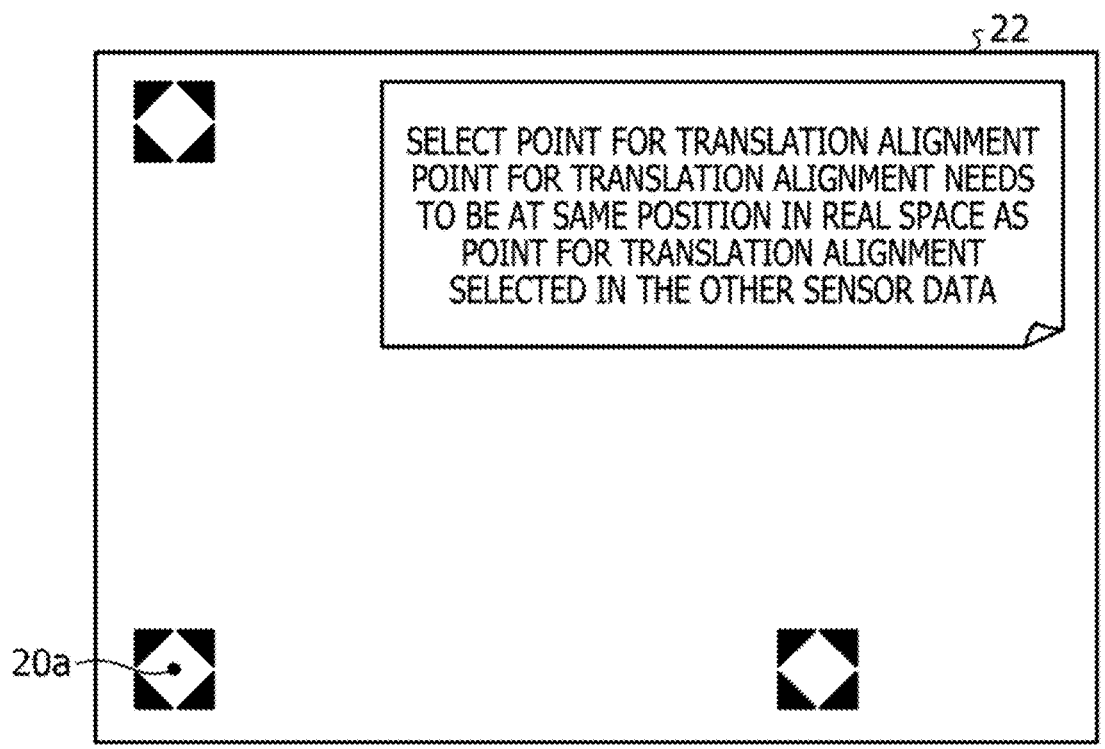
FIG. 7 is a diagram (3) illustrating an example of the instruction screen according to the present embodiment 1.

FIG. 7 is a diagram (3) illustrating an example of the instruction screen according to the present embodiment 1. An instruction screen 22 illustrated in FIG. 7 is a screen generated on the basis of the visible image of the sensor 10A. The user refers to the instruction screen 22 and operates the input device of the information processing apparatus 100 to select the first translation point. In the example illustrated in FIG. 7, the point 20a is selected as the first translation point.

Although not illustrated, the information processing apparatus 100 displays the instruction screen that receives the second translation point on the basis of the visible image of the sensor 10B. The user refers to the instruction screen and selects the second translation point. The user makes sure that the position of the first translation point and the position of the second translation point satisfy the condition 4.

As described above, the information processing apparatus 100 displays the instruction screen and receives the start point and the end point of the first vector, the start point and the end point of the second vector, and the first translation point from the user. Furthermore, the information processing apparatus 100 displays the instruction screen and receives the start point and the end point of the third vector, the start point and the end point of the fourth vector, and the second translation point from the user.

The information processing apparatus 100 calculates the parameters for aligning the point group measured by the sensor 10A and the point group measured by the sensor 10B on the basis of the first to fourth vectors and the first and second translation points. By receiving instructions for specifying the first to fourth vectors and the first and second translation points from the user using the instruction screens in this way, the alignment can be performed even in a case where the number of three-dimensional point groups included in the common range of the measurement range of the sensor 10A and the measurement range of the sensor 10B is small and the point groups do not sufficiently have characteristic shapes.

Figure 8:
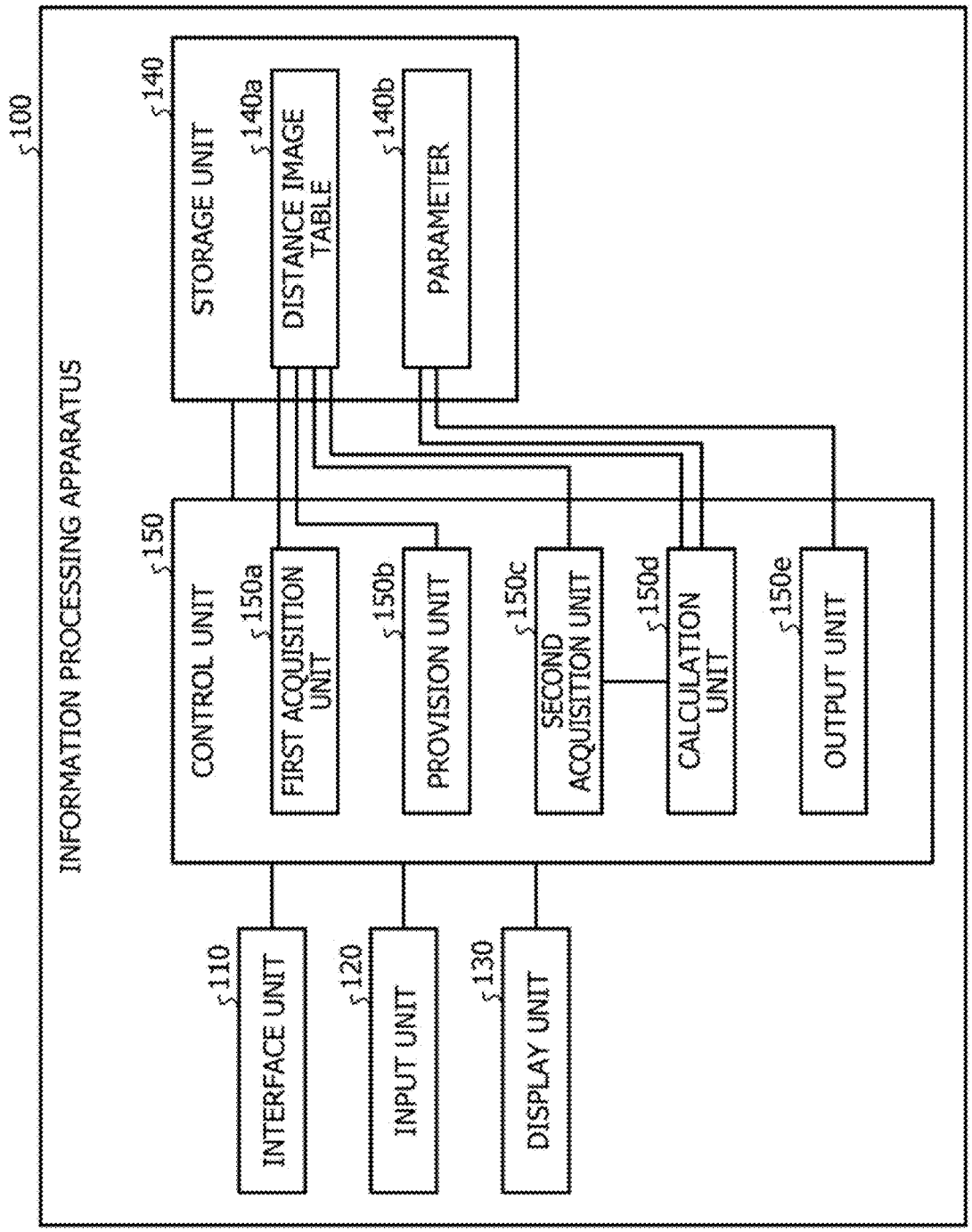
FIG. 8 is a functional block diagram illustrating a configuration of an information processing apparatus according to the present embodiment 1.

Next, an example of a configuration of the information processing apparatus 100 according to the present embodiment 1 will be described. FIG. 8 is a functional block diagram illustrating a configuration of the information processing apparatus according to the present embodiment 1. As illustrated in FIG. 8, the information processing apparatus 100 includes an interface unit 110, an input unit 120, a display unit 130, a storage unit 140, and a control unit 150.

The interface unit 110 is a communication device that receives information from the sensor 10A and the sensor 10B. The interface unit 110 receives first distance image information from the sensor 10A, and outputs the received first distance image information to the control unit 150. The interface unit 110 receives second distance image information from the sensor 10B, and outputs the received second distance image information to the control unit 150. Furthermore, the interface unit 110 may be connected to a scoring device described below.

The input unit 120 is an input device for inputting various types of information to the information processing apparatus 100. For example, the input unit 120 corresponds to a keyboard, a mouse, a touch panel, or the like. The user refers to the instruction screens illustrated in FIGS. 5 to 7 and operates the input unit 120 to select the start point and the end point of the first vector, the start point and the end point of the second vector, and the first translation point. Furthermore, the user operates the input unit 120 to select the start point and the end point of the third vector, the start point and the end point of the fourth vector, and the second translation point.

The display unit 130 is a display device that displays various types of information output from the control unit 150. For example, the display unit 130 corresponds to a liquid crystal display, a touch panel, or the like. For example, the display unit displays the instruction screens illustrated in FIGS. 5 to 7.

The storage unit 140 includes a distance image table 140a and a parameter 140b. The storage unit 140 corresponds to a semiconductor memory element such as a random access memory (RAM), a read-only memory (ROM), and a flash memory, or a storage device such as a hard disk drive (HDD).

The distance image table 140a is a table that stores the first distance image information output from the sensor 10A and the second distance image information output from the sensor 10B. FIG. 9 is a diagram illustrating an example of a data structure of the distance image table according to the present embodiment 1.

As Illustrated in FIG. 9, the distance image table 140a includes the first distance image information and the second distance image information. The first distance image information includes coordinate information of the point group measured by the sensor 10A (three-dimensional coordinates of each point) and information of the visible image captured by the sensor 10A. Each point group is assumed to be associated with each position of the visible image. Although not illustrated, each point is given a number that uniquely identifies the point.

The second distance image information includes coordinate information of each point group measured by the sensor 10B (three-dimensional coordinates of each point) and information of the visible image captured by the sensor 10B. Each point group is assumed to be associated with each position of the visible image. Although not illustrated, each point is given a number that uniquely identifies the point.

The parameter 140b is parameters for aligning the point group measured by the sensor 10A and the point group measured by the sensor 10B. The parameter 140b Includes information of an alignment rotation angle and information of an alignment translation distance.

The control unit 150 includes a first acquisition unit 150a, a provision unit 150b, a second acquisition unit 150c, a calculation unit 150d, and an output unit 150e. The control unit 150 can be implemented by a central processing unit (CPU), a micro processing unit (MPU), or the like. Furthermore, the control unit 150 may also be implemented by hard-wired logic such as an Application Specific Integrated Circuit (ASIC) and a Field Programmable Gate Array (FPGA).

The first acquisition unit 150a acquires the first distance image information from the sensor 10A via the interface unit 110, and registers the acquired first distance image information in the distance image table 140a. The first acquisition unit 150a acquires the second distance image information from the sensor 10B, and registers the acquired second distance image information in the distance image table 140a.

In the case of registering the first distance image information in the distance image table 140a, the first acquisition unit 150a converts the information of the distance between each point group and the sensor 10A into three-dimensional coordinate information. For example, the first acquisition unit 150a uses a conversion table that converts a distance into three-dimensional coordinates in the case of converting the distance information into three-dimensional coordinate information.

In the case of registering the second distance image information in the distance image table 140a, the first acquisition unit 150a converts the information of the distance between each point group and the sensor 10B into three-dimensional coordinate information. For example, the first acquisition unit 150a uses a conversion table that converts a distance into three-dimensional coordinates in the case of converting the distance information into three-dimensional coordinate information.

The provision unit 150b is a processing unit that generates information of the instruction screen and outputs the information of the instruction screen to the display unit 130 to display the instruction screen. The instruction screen displayed on the display unit 130 corresponds to the instruction screen 20, 21, 22, or the like illustrated in each of FIGS. 5 to 7 and the like.

The provision unit 150b generates the instruction screen on the basis of the visible image stored in the distance image table 140a. The provision unit 150b generates the instruction screen for receiving selection of the first vector, the second vector, and the first translation point, using the visible image of the first distance image information. In the case of generating the information of the instruction screen, the provision unit 150b provides a comment for distinguishing whether to select the start point and end point of the first vector, select the start point and end point of the second vector, or select the first translation point.

The provision unit 150b generates the instruction screen for receiving selection of the third vector, the fourth vector, and the second translation point, using the visible image of the second distance image information. In the case of generating the information of the instruction screen, the provision unit 150b provides a comment for distinguishing whether to select the start point and end point of the third vector, select the start point and end point of the fourth vector, or select the second translation point.

The second acquisition unit 150c is a processing unit that acquires the first vector, the second vector, the first translation point, the third vector, the fourth vector, and the second translation point on the basis of the information selected by the user on the instruction screen.

When the instruction screen for selecting the start point and the end point of the first vector is displayed on the display unit 130 by the provision unit 150b, the user operates the input unit 120 to select the start point and the end point of the first vector. The second acquisition unit 150c acquires information of the start point and the end point of the first vector from the input unit 120. In the example illustrated in FIG. 5, the point 20a is selected as the start point and the point 20b is selected as the end point. The information of the start point and the end point of the first vector selected by the input unit 120 corresponds to the coordinates of the visible image.

The second acquisition unit 150c specifies identification information of a point corresponding to the start point of the first vector selected by the user on the instruction screen from each point group on the basis of the first distance image information of the distance image table 140a. The identification information of the point corresponding to the start point of the first vector is referred to as "first start point identification information".

The second acquisition unit 150c specifies identification information of a point corresponding to the end point of the first vector selected by the user on the instruction screen from each point group on the basis of the first distance image information of the distance image table 140a. The identification information of the point corresponding to the end point of the first vector is referred to as "first end point identification Information".

When the instruction screen for selecting the start point and the end point of the second vector is displayed on the display unit 130 by the provision unit 150b, the user operates the input unit 120 to select the start point and the end point of the second vector. The second acquisition unit 150c acquires information of the start point and the end point of the second vector from the input unit 120. In the example illustrated in FIG. 6, the point 20a is selected as the start point and the point 20c is selected as the end point. The information of the start point and the end point of the second vector selected by the input unit 120 corresponds to the coordinates of the visible image.

The second acquisition unit 150c specifies identification information of a point corresponding to the start point of the second vector selected by the user on the instruction screen from each point group on the basis of the first distance image information of the distance image table 140a. The identification information of the point corresponding to the start point of the second vector is referred to as "second start point identification information".

The second acquisition unit 150c specifies identification information of a point corresponding to the end point of the second vector selected by the user on the instruction screen from each point group on the basis of the first distance image information of the distance image table 140a. The identification information of the point corresponding to the end point of the second vector is referred to as "second end point identification information".

When the instruction screen for selecting the first translation point is displayed on the display unit 130 by the provision unit 150b, the user operates the input unit 120 to select the first translation point. The second acquisition unit 150c acquires information of the first translation point from the input unit 120. In the example illustrated in FIG. 7, the point 20a is selected as the first translation point. The information of the first translation point selected by the input unit 120 corresponds to the coordinates of the visible image.

The second acquisition unit 150c specifies identification information of a point corresponding to the first translation point selected by the user on the instruction screen from each point group on the basis of the first distance image information of the distance image table 140a. The identification information of the point corresponding to the first translation point is referred to as "first translation point identification information".

The second acquisition unit 150c outputs the first start point identification information, the first end point identification information, the second start point identification information, the second end point identification information, and the first translation point identification information to the calculation unit 150d.

When the instruction screen for selecting the start point and the end point of the third vector is displayed on the display unit 130 by the provision unit 150b, the user operates the input unit 120 to select the start point and the end point of the third vector. The second acquisition unit 150c acquires information of the start point and the end point of the third vector from the input unit 120. The information of the start point and the end point of the third vector selected by the input unit 120 corresponds to the coordinates of the visible image.

The second acquisition unit 150c specifies identification information of a point corresponding to the start point of the third vector selected by the user on the instruction screen from each point group on the basis of the second distance image information of the distance image table 140a. The identification information of the point corresponding to the start point of the third vector is referred to as "third start point identification information".

The second acquisition unit 150c specifies identification information of a point corresponding to the end point of the third vector selected by the user on the instruction screen from each point group on the basis of the second distance image information of the distance image table 140a. The identification information of the point corresponding to the end point of the third vector is referred to as "third end point identification information".

When the instruction screen for selecting the start point and the end point of the fourth vector is displayed on the display unit 130 by the provision unit 150b, the user operates the input unit 120 to select the start point and the end point of the fourth vector. The second acquisition unit 150c acquires information of the start point and the end point of the fourth vector from the input unit 120. The information of the start point and the end point of the fourth vector selected by the input unit 120 corresponds to the coordinates of the visible image.

The second acquisition unit 150c specifies identification information of a point corresponding to the start point of the fourth vector selected by the user on the instruction screen from each point group on the basis of the second distance image information of the distance image table 140a. The identification information of the point corresponding to the start point of the fourth vector is referred to as "fourth start point identification information".

The second acquisition unit 150c specifies identification information of a point corresponding to the end point of the fourth vector selected by the user on the instruction screen from each point group on the basis of the second distance image information of the distance image table 140a. The identification information of the point corresponding to the end point of the fourth vector is referred to as "fourth end point identification information".

When the instruction screen for selecting the second translation point is displayed on the display unit 130 by the provision unit 150b, the user operates the input unit 120 to select the second translation point. The second acquisition unit 150c acquires information of the second translation point from the input unit 120. The information of the second translation point selected by the input unit 120 corresponds to the coordinates of the visible image.

The second acquisition unit 150c specifies identification information of a point corresponding to the second translation point selected by the user on the instruction screen from each point group on the basis of the second distance image information of the distance image table 140a. The identification information of the point corresponding to the second translation point is referred to as "second translation point identification information".

The second acquisition unit 150c outputs the third start point identification information, the third end point identification information, the fourth start point identification information, the fourth end point identification information, and the second translation point identification information to the calculation unit 150d.

The calculation unit 150d is a processing unit that calculates the rotation angle and the translation distance for alignment on the basis of the first vector, the second vector, the third vector, the fourth vector, the first translation point, and the second translation point. The calculation unit 150d stores the calculated rotation angle and translation distance information in the storage unit 140 as the parameter 140b. The rotation angle and translation distance for alignment included in the parameter 140b are appropriately referred to as "alignment rotation angle" and "alignment translation distance".

For example, the calculation unit 150d specifies three-dimensional coordinates of the start point and the end point of each vector and three-dimensional coordinates of each translation point by executing the following processing.

The calculation unit 150d detects three-dimensional coordinates of the start point and the end point of the first vector on the basis of the first start point identification information and the first end point identification information, and the first distance image information of the distance image table 140a, and specifies the first vector. The calculation unit 150d detects three-dimensional coordinates of the start point and the end point of the second vector on the basis of the second start point identification information and the second end point identification information, and the first distance image information, and specifies the second vector. The calculation unit 150d identifies the three-dimensional coordinates of the first translation point on the basis of the first translation identification information and the first distance image information.

The calculation unit 150d detects three-dimensional coordinates of the start point and the end point of the third vector on the basis of the third start point identification information and the third end point identification information, and the second distance image information of the distance image table 140a, and specifies the third vector. The calculation unit 150d detects three-dimensional coordinates of the start point and the end point of the fourth vector on the basis of the fourth start point identification information and the fourth end point identification information, and the second distance image information, and specifies the second vector. The calculation unit 150d identifies the three-dimensional coordinates of the second translation point on the basis of the second translation identification information and the second distance image information.

Figure 10:
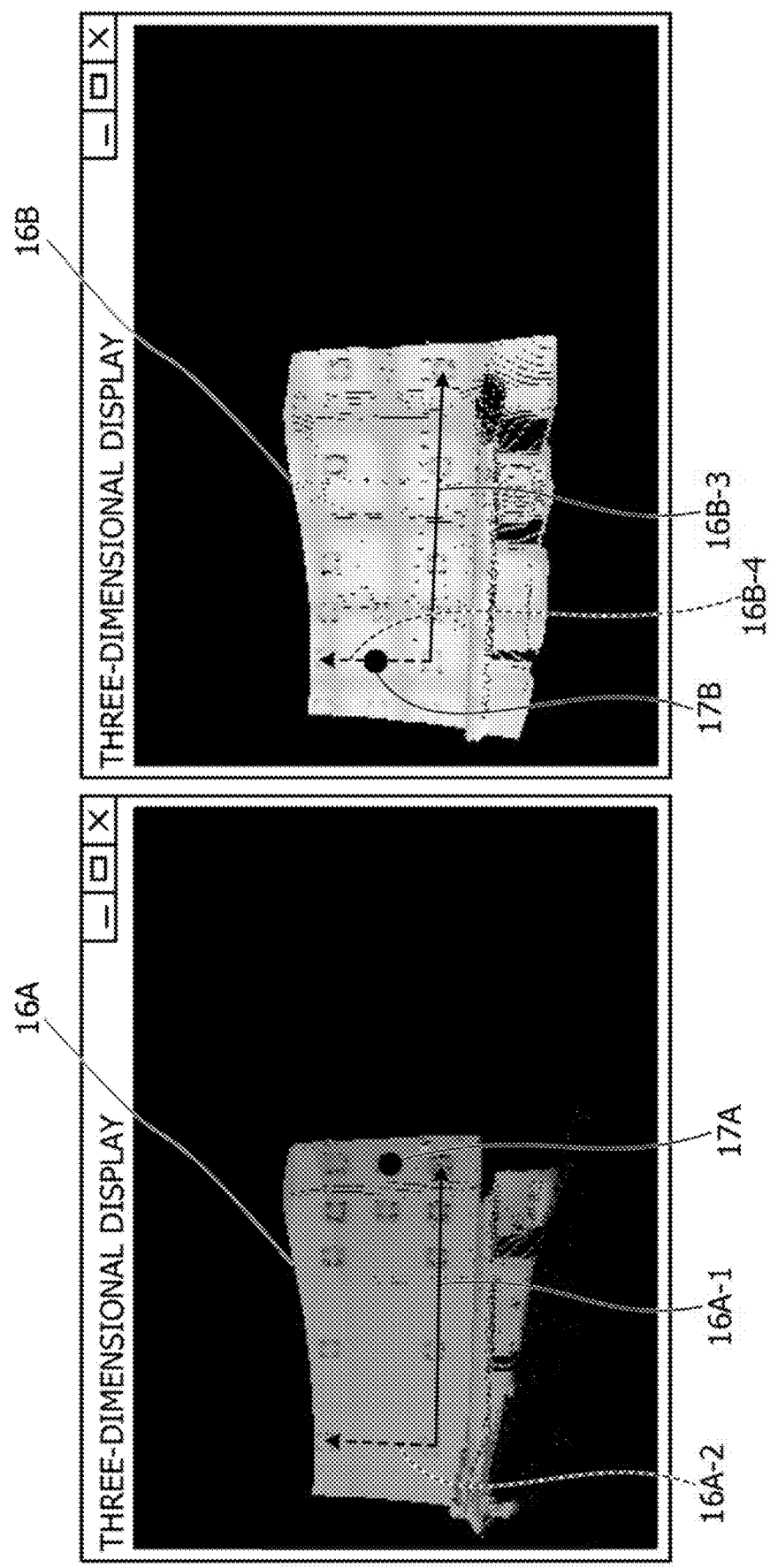
FIG. 10 is a diagram illustrating an example of first to fourth vectors and first and second translation points.

FIG. 10 is a diagram illustrating an example of the first to fourth vectors and the first and second translation points. In FIG. 10, a point group 16A is the point group measured by the sensor 10A. A point group 16B is the point group measured by the sensor 10B. A vector 16A-1 of the point group 16A is the first vector. A vector 16A-2 of the point group 16A is the first vector. A point 17A is the first translation point.

A vector 16B-3 of the point group 16A is the third vector. A vector 168-4 of the point group 16B is the fourth vector. A point 178 is the second translation point.

Next, the calculation unit 150d converts the first vector, the second vector, the third vector, and the fourth vector into unit vectors, respectively. For example, the calculation unit 150d converts the first vector into a unit vector by dividing the first vector by the length of the first vector. The other vectors are similarly converted into unit vectors. In the following description, the first vector, the second vector, the third vector, and the fourth vector converted into the unit vectors are simply described as first vector, second vector, third vector, and fourth vector, respectively.

The calculation unit 150d moves each start point of the first vector, the second vector, the third vector, and the fourth vector to the position of the origin of three-dimensional coordinates.

The calculation unit 150d calculates the rotation angle of the third vector that minimizes a total distance D in the equation (1). In the equation (1), $D_{13}$ represents the distance between the end point of the first vector and the end point of the third vector. $D_{24}$ represents the distance between the end point of the second vector and the end point of the fourth vector. For example, the rotation angle has an X rotation angle, a Y rotation angle, and a Z rotation angle. The X rotation angle corresponds to the rotation angle (roll) around an x-axis. The Y rotation angle corresponds to the rotation angle (pitch) around a y-axis. The Z rotation angle indicates the rotation angle (yaw) around a z-axis.

$$D=D_{13}+D_{23} \quad (1)$$

The calculation unit 150d fixes the first vector and the second vector, changes the rotation angle of the third vector, and calculates the minimum total distance D. For example, the calculation unit 150d repeatedly executes the processing of calculating the total distance D by gradually changing the X rotation angle, the Y rotation angle, and the Z rotation angle, and searches for the X rotation angle, the Y rotation angle, and the Z rotation angle that minimize the total distance D. Note that the calculation unit 150d maintains the positional relationship between the third vector and the fourth vector. That is, the rotation angle of the fourth vector is changed according to the change of the rotation angle with respect to the third vector. The rotation angle at which the total distance D is minimized is the "alignment rotation angle".

When the calculation unit 150d calculates the alignment rotation angle, the calculation unit 150d performs processing of calculating the translation distance. The calculation unit 150d rotates the three-dimensional coordinates of the second translation point by the alignment rotation angle. The calculation unit 150d calculates a difference between the three-dimensional coordinates of the second translation point rotated by the alignment rotation angle and the three-dimensional coordinates of the first translation point as the alignment translation distance. The alignment translation distance includes an X translation distance, a Y translation distance, and a Z translation distance.

The X translation distance is a difference between an x-coordinate of the first translation point and an x-coordinate of the second translation point. The Y translation distance is a difference between a y-coordinate of the first translation point and a y-coordinate of the second translation point. The Z translation distance is a difference between a z-coordinate of the first translation point and a z-coordinate of the second translation point.

The calculation unit 150d stores the alignment rotation angle and the alignment translation distance calculated by the above processing as parameter 140d in the storage unit 140.

The output unit 150e is a processing unit that outputs the parameter 140b to an external device such as the scoring device.

Figure 11:
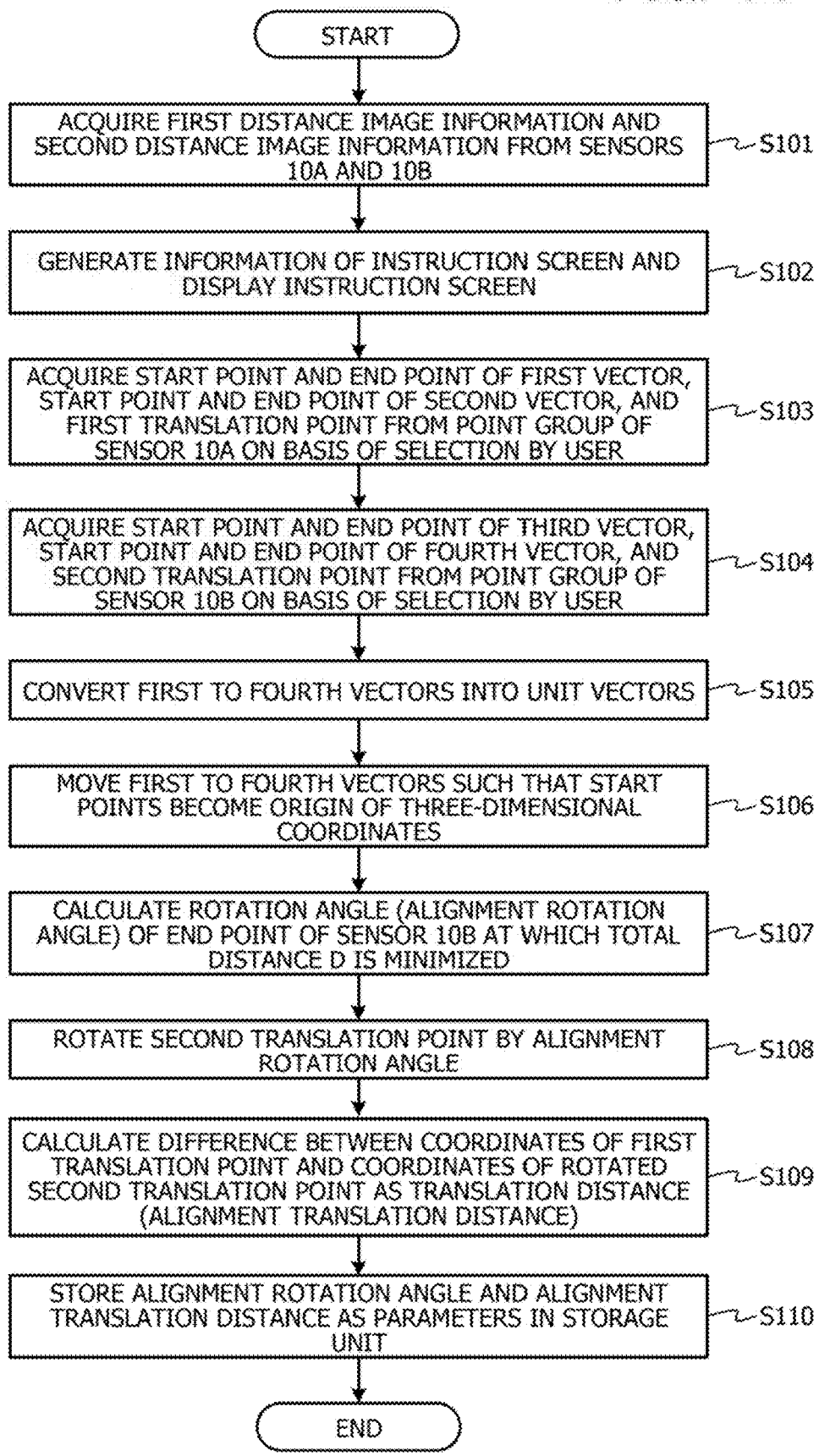
FIG. 11 is a flowchart illustrating a processing procedure of the information processing apparatus according to the present embodiment 1.

Next, an example of a processing procedure of the information processing apparatus 100 according to the present embodiment 1 will be described. FIG. 11 is a flowchart illustrating a processing procedure of the information processing apparatus according to the present embodiment 1. As illustrated in FIG. 11, the first acquisition unit 150a of the information processing apparatus 100 acquires the first distance image information and the second distance image information from the sensors 10A and 10B (step S101).

The provision unit 150b of the information processing apparatus 100 generates the information of the instruction screen and causes the display unit 130 to display the instruction screen (step S102).

The second acquisition unit 150c of the information processing apparatus 100 acquires the start point and end point of the first vector, the start point and end point of the second vector, and the first translation point from the point group of the sensor 10A on the basis of the selection by the user (step S103). The second acquisition unit 150c acquires the start point and end point of the third vector, the start point and end point of the fourth vector, and the second translation point from the point group of the sensor 10B on the basis of the selection by the user (step S104).

The calculation unit 150d of the information processing apparatus 100 converts the first to fourth vectors into unit vectors (step S105). The calculation unit 150d moves the first to fourth vectors such that the start points become the origin of three-dimensional coordinates (step S106).

The calculation unit 150d calculates the rotation angle (alignment rotation angle) of the end point of the sensor 10B at which the total distance D is minimized (step S107). The calculation unit 150d rotates the second translation point by the alignment rotation angle (step S108).

The calculation unit 150d calculates the difference between the coordinates of the first translation point and the coordinates of the rotated second translation point as the translation distance (alignment translation distance) (step S109). The calculation unit 150d stores the alignment rotation angle and the alignment translation distance as parameter 140b in the storage unit 140 (step S110).

Next, effects of the information processing apparatus 100 according to the present embodiment 1 will be described. The information processing apparatus 100 displays the instruction screens and acquires the first to fourth vectors and the first and second translation points that satisfy the conditions 1 to 4, and calculates the parameters for aligning the point group measured by the sensor 10A and the point group measured by the sensor 10B on the basis of the first to fourth vectors and the first and second translation points. By receiving selections for specifying the first to fourth vectors and the first and second translation points that satisfy the conditions 1 to 4 from the user using the instruction screens in this way, the alignment can be performed even in a case where the number of three-dimensional point groups included in the common range of the measurement range of the sensor 10A and the measurement range of the sensor 10B is small and the point groups do not sufficiently have characteristic shapes.

Figure 12:
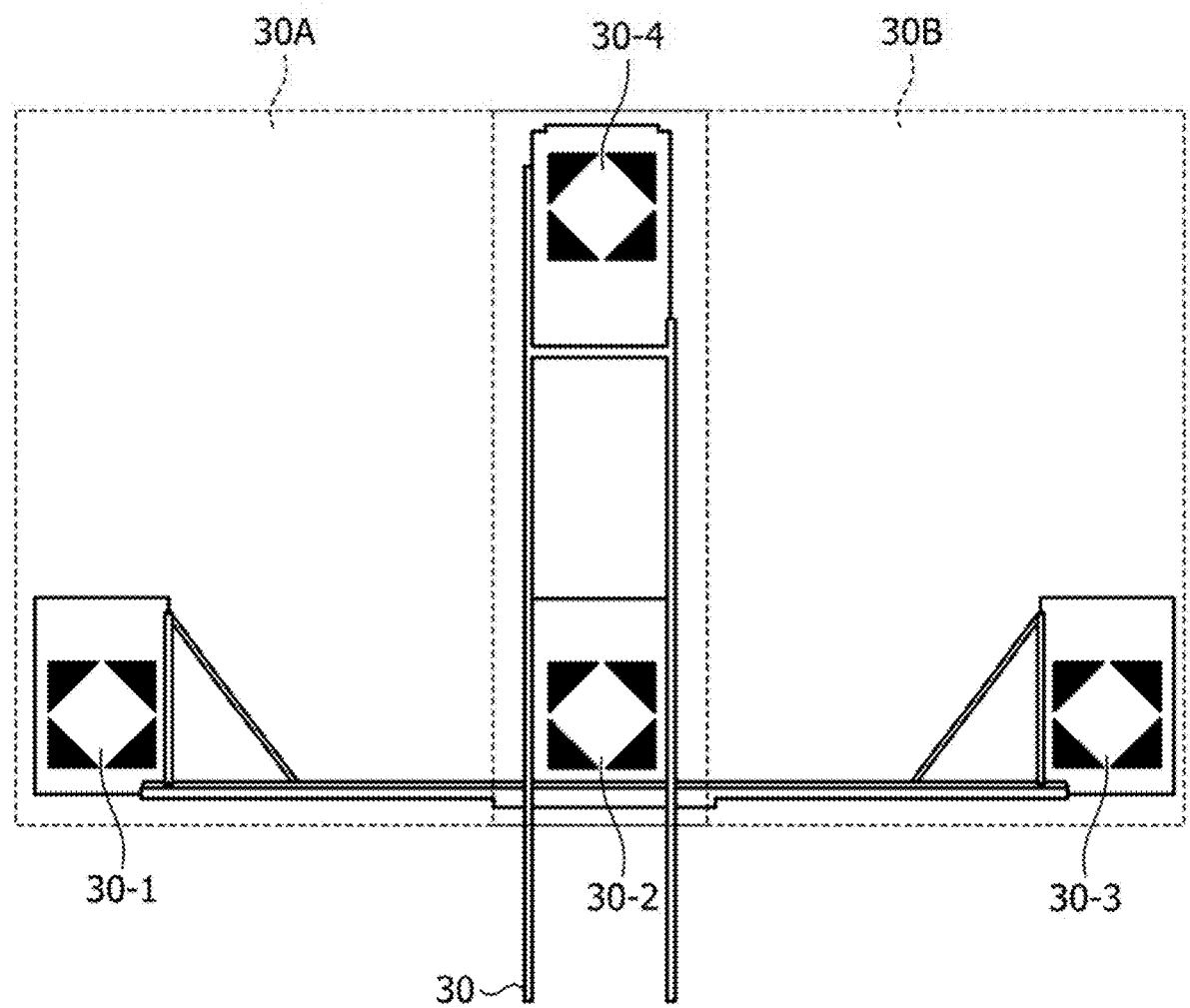
FIG. 12 is a diagram illustrating an example of a portable marker arrangement table.

By the way, the marker used in the embodiment 1 may not be embedded in the wall 15 illustrated in FIG. 2, but may be portable. FIG. 12 is a diagram illustrating an example of a portable marker arrangement table. A marker arrangement table 30 illustrated in FIG. 12 includes markers 30-1 to 30-4. The markers 30-1 to 30-3 are horizontally lined up. An angle formed by a straight line passing through the markers 30-1 to 30-3 and a straight line passing through the markers 30-1 and 30-4 is 90 degrees. The measurable range by the sensor 10A is defined as a range 30A. The measurable range by the sensor 10B is defined as a range 30B.

The information processing apparatus 100 generates information of the instruction screen on the basis of the visible image of the marker arrangement table 30, and displays the information on the display unit 130. The Information processing apparatus 100 receives the selection of the start points and end points of the first to fourth vectors and the first and second translation points from the user who refers to the instruction screens.

Next, an example of a scoring device that grades performance of a player who performs gymnastics using the parameter 140b calculated by the information processing apparatus 100 described in the present embodiment 1 will be described. Here, the scoring device will be described, but the parameter 140b calculated by the information processing apparatus 100 can be used not only for the scoring device but also for a device that senses an object using a plurality of sensors.

Figure 13:
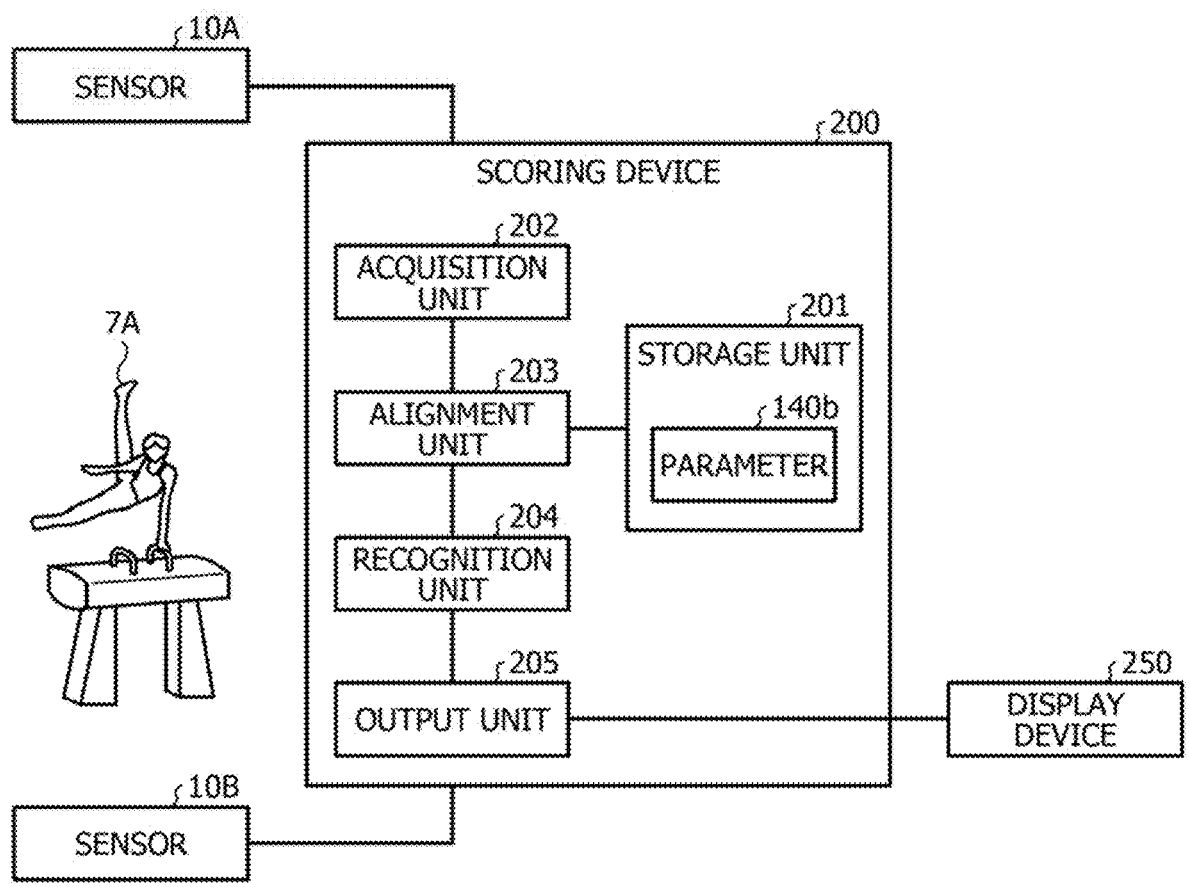
FIG. 13 is a functional block diagram illustrating a configuration of a scoring device.

FIG. 13 is a functional block diagram illustrating a configuration of a scoring device. As illustrated in FIG. 13, this scoring device 200 is connected to the sensor 10A, the sensor 10B, and a display device 250. The sensor 10A and the sensor 10B correspond to the sensor 10A and the sensor 10B illustrated in FIG. 1. The arrangement status of the sensors 10A and 10B illustrated in FIG. 12 and the arrangement status of the sensors 10A and 10B illustrated in FIG. 1 are assumed to be the same. The arrangement status indicates arrangement positions of the sensors 10A and 10B and directions of the sensors. The sensors 10A and 10B measure the first distance image information and the second distance image information including a player 7A.

The display device 250 is a display device that displays information output from the scoring device. The display device 250 corresponds to, for example, a liquid crystal display, a touch panel, or the like.

The scoring device 200 includes a storage unit 201, an acquisition unit 202, an alignment unit 203, a recognition unit 204, and an output unit 205.

The storage unit 201 has the parameter 140b. The storage unit 201 corresponds to a semiconductor memory element such as a RAM, a ROM, or a flash memory, or a storage device such as an HDD. A parameter 140b is information corresponding to the parameter 140b described with reference to FIG. 8.

The acquisition unit 202 acquires the first distance image information from the sensor 10A and acquires the second distance image information from the sensor 10b. The acquisition unit 202 extracts a first point group constituting an object 6 included in the first distance image information on the basis of the first distance image information and a first background frame. The acquisition unit 202 extracts a second point group constituting the object 6 included in the second distance image information on the basis of the second distance image information and a second background frame. The acquisition unit 202 outputs coordinate information of the first point group and coordinate information of the first point group to the alignment unit 203. Here, the first background frame indicates the first distance image information not including the object 6, and is set in advance. The second background frame indicates the second distance image information not including the object 6, and is set in advance.

The alignment unit 203 is a processing unit that aligns the first point group and the second point group on the basis of the parameter 140b. The alignment unit 203 aligns coordinates of each point included in the second point group on the basis of the alignment rotation angle and the alignment translation distance included in the parameter 140b. The alignment unit 203 outputs information of the aligned second point group and the first point group to the recognition unit 204.

The recognition unit 204 is a processing unit that recognizes a skeleton of the object 6 by combining the aligned second point group and the first point group. The recognition unit 204 detects the position of the skeleton of the object 6 at each time, compares the transition of the position of the skeleton with a table (not illustrated) that defines scoring criteria, and scores the performance of the object 6. The recognition unit 204 outputs scoring result information to the output unit 205. For example, the scoring result information includes a difficulty (D) score and an execution (E) score.

Figure 14:
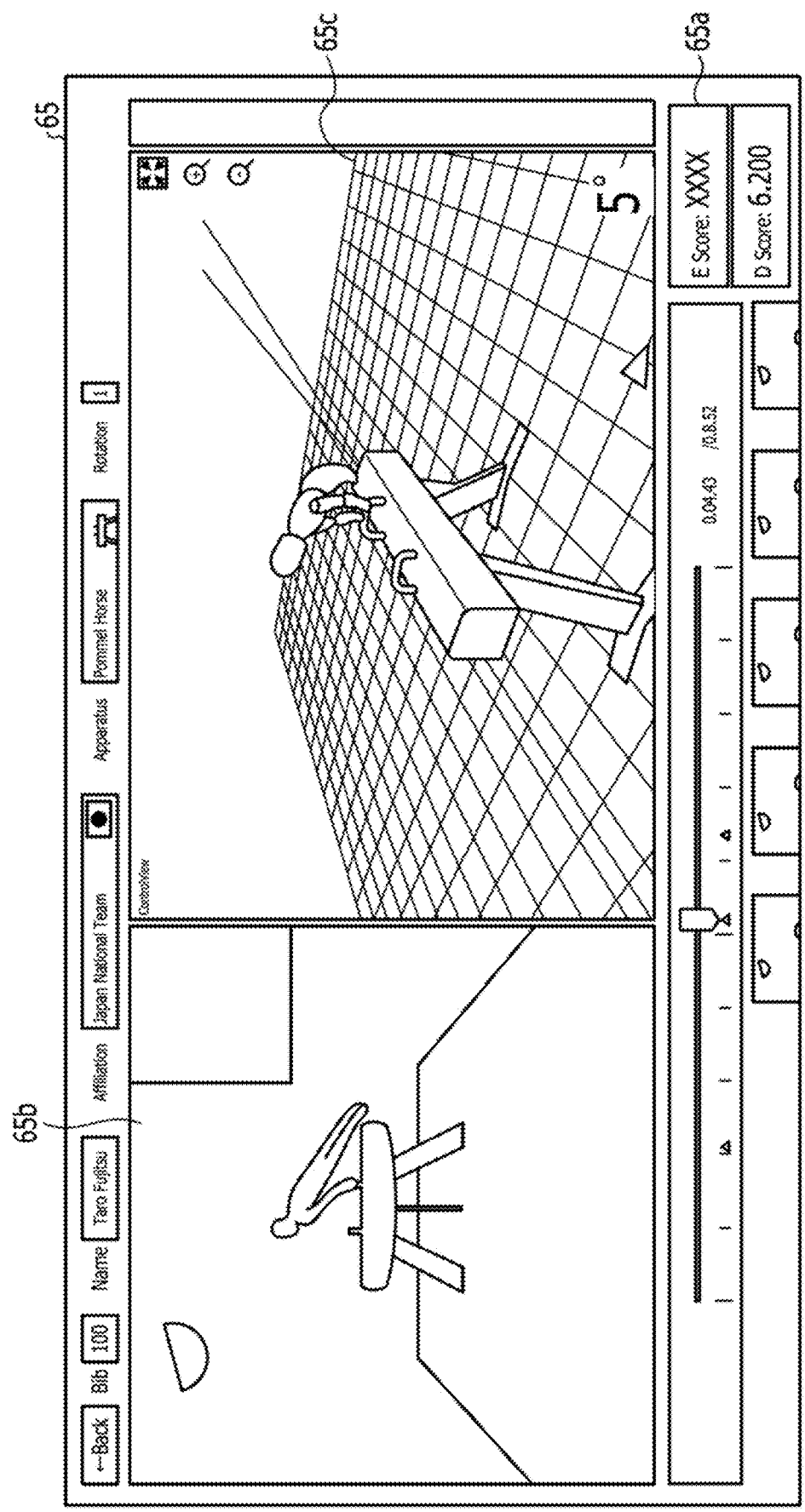
FIG. 14 is a diagram illustrating an example of a scoring screen.

The output unit 205 is a processing unit that generates scoring screen information on the basis of the scoring result information. The output unit 205 outputs the scoring screen information to the display device 250 and displays the information. FIG. 14 is a diagram illustrating an example of a scoring screen. As illustrated in FIG. 14, scoring screen information 65 includes regions 65a, 65b, and 65c.

The region 65a is a region for displaying the scoring results such as the D score and E score. The region 65b is a region for displaying an image of the object 6 captured by a camera or the like. The region 65c is a region for displaying a 3D model estimated on the basis of skeletal information estimated from the aligned first and second point groups.

Figure 15:
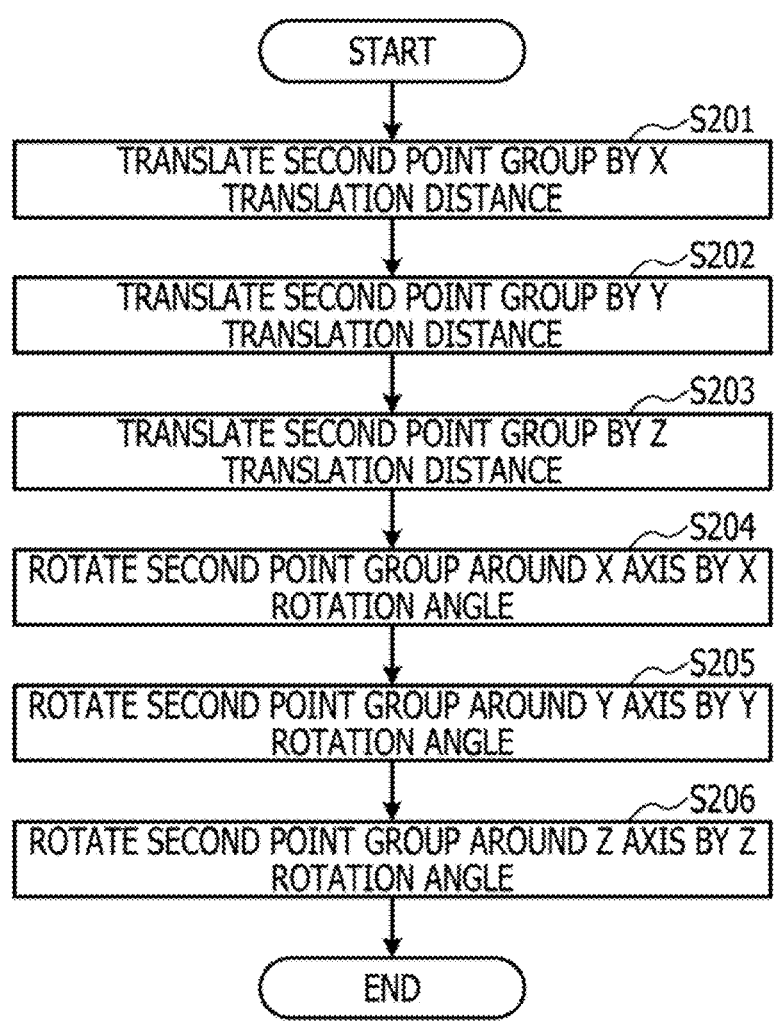
FIG. 15 is a flowchart illustrating a processing procedure of an alignment unit of the scoring device.

Next, an example of a processing procedure of the alignment unit 203 of the scoring device 200 will be described. FIG. 15 is a flowchart illustrating a processing procedure of an alignment unit of a scoring device. In the example in FIG. 15, a case of aligning the second point group will be described. However, the first point group is aligned similarly to the second point group.

As Illustrated in FIG. 15, the alignment unit 203 of the scoring device 200 translates the second point group by the X translation distance (step S201). The alignment unit 203 translates the second point group by the Y translation distance (step S202). The alignment unit 203 translates the second point group by the Z translation distance (step S203).

The alignment unit 203 rotates the second point group about the X axis by the X rotation angle (step S204). The alignment unit 203 rotates the second point group about the Y axis by the Y rotation angle (step S205). The alignment unit 203 rotates the second point group about the Z axis by the Z rotation angle (step S206).

As described above, the scoring device 200 aligns the point groups measured by the sensors 10A and 10B on the basis of the parameter 140b generated by the information processing apparatus 100, thereby accurately specifying the point group of the entire object and improving the scoring accuracy.

Figure 16:
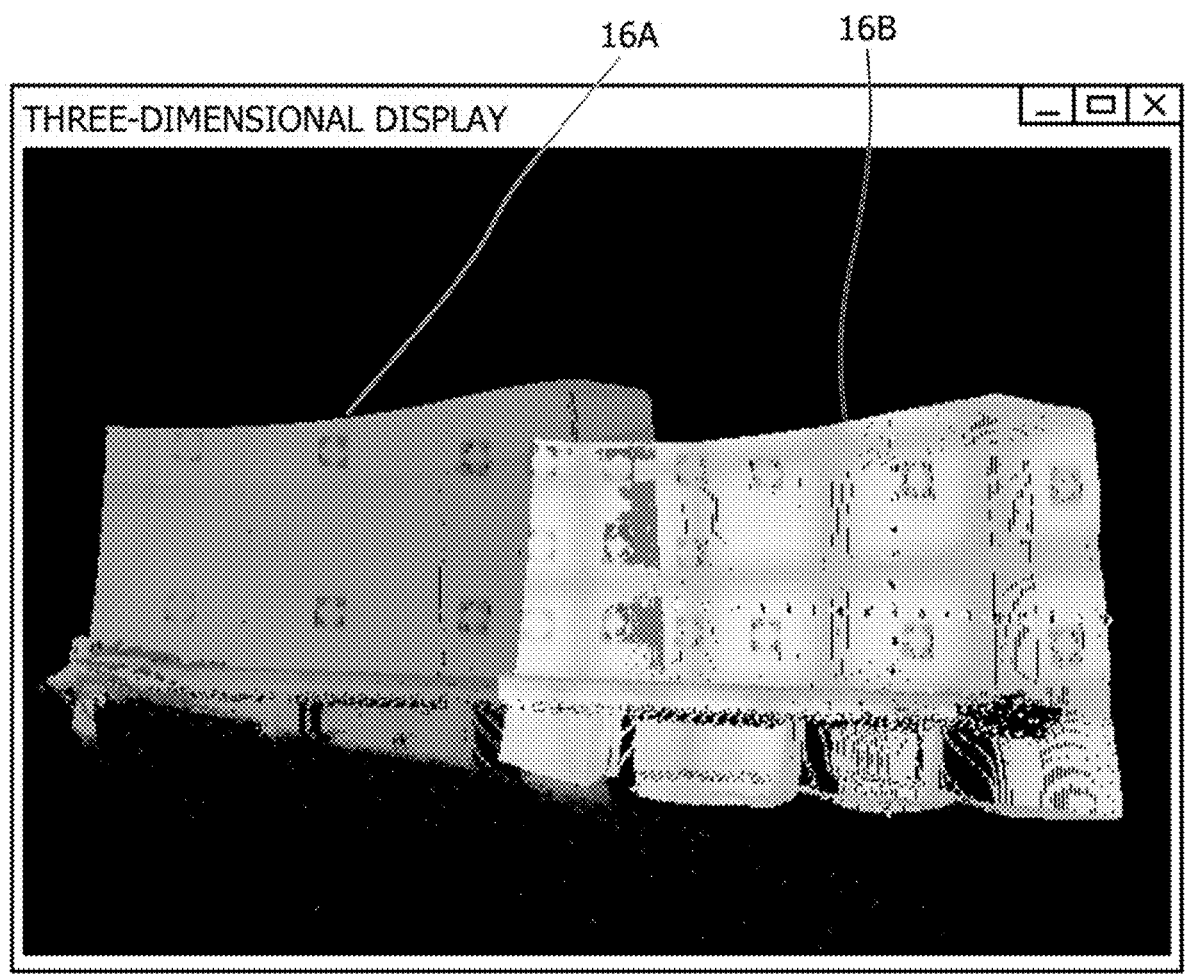
FIG. 16 is a diagram illustrating an example of a first point group and a second point group after alignment.

FIG. 16 is a diagram illustrating an example of the first point group and the second point group after alignment. For convenience of description, FIG. 16 illustrates the alignment result of the point group 16A (first point group) and the point group 168 (second point group) illustrated in FIG. 3. As illustrated in FIG. 16, the positions of the respective markers accurately match.

Note that, in the present embodiment 1, the case where the information processing apparatus 100 and the scoring device 200 are realized by separate devices has been described, but the present embodiment is not limited to the case. For example, the functions of the information processing apparatus 100 may include the functions of the scoring device 200. That is, the control unit 150 of the information processing apparatus 100 may include the alignment unit 203, the recognition unit 240, the output unit 205, and the like of the scoring device 200.

Embodiment 2

Next, an information processing apparatus according to the present embodiment 2 will be described. The information processing apparatus according to the present embodiment 2 is connected to a sensor 10A and a sensor 10B similarly to the embodiment 1.

The information processing apparatus according to the embodiment 2 automatically detects center coordinates of a marker. Furthermore, by arranging markers having different shapes in a predetermined positional relationship, the shape of each mark is recognized, and first to fourth vectors and first and second translation points that satisfy conditions 1 to 4 are automatically detected. By executing such processing, it is possible to calculate parameters for alignment even if a user does not select the respective vectors and translation points to satisfy the conditions 1 to 4.

Figure 17:
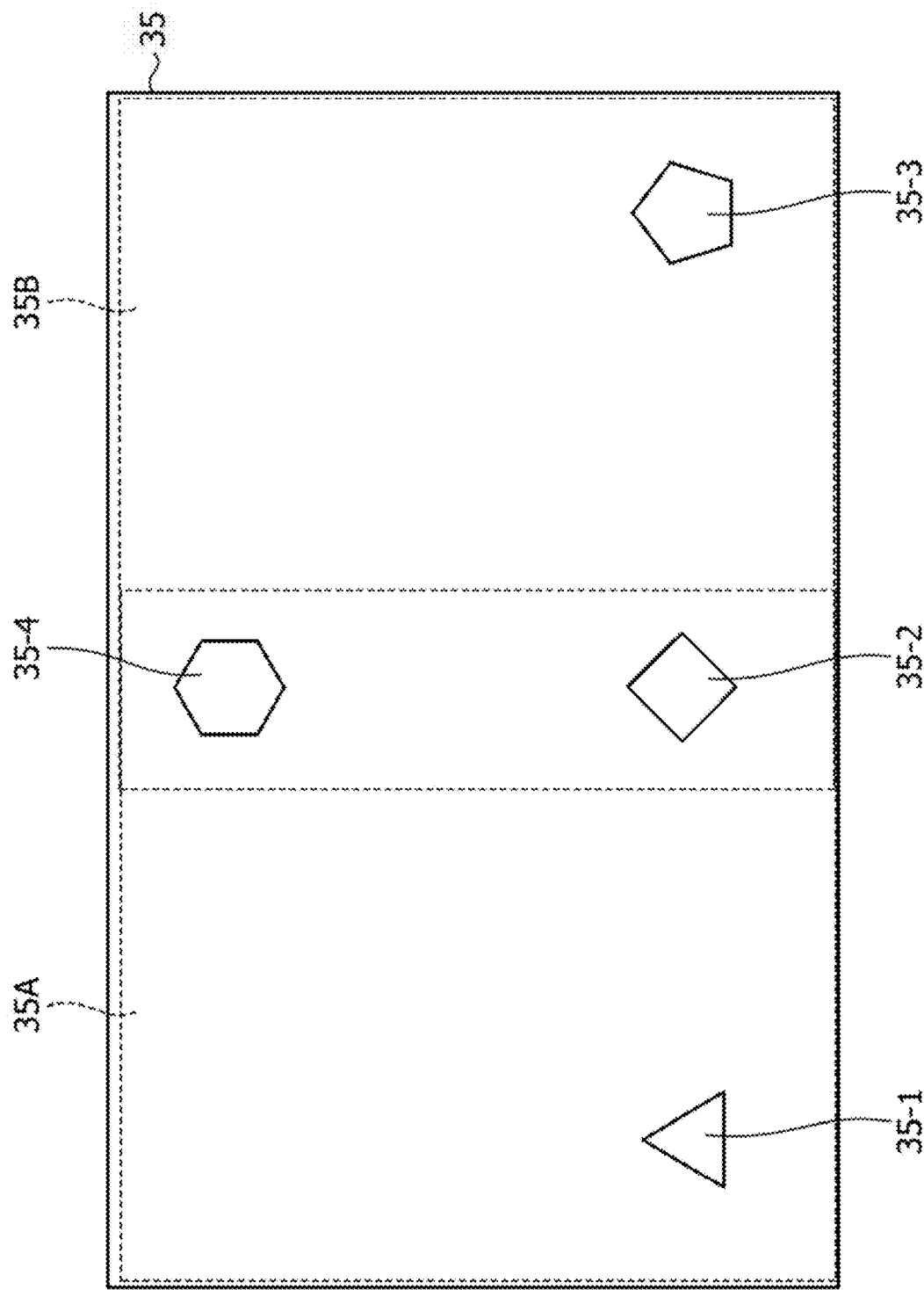
FIG. 17 is a diagram illustrating examples of markers used in the present embodiment 2.

FIG. 17 is a diagram illustrating examples of markers used in the present embodiment 2. As illustrated in FIG. 17, a wall 35 includes markers 35-1 to 35-4. The markers 35-1 to 35-3 are horizontally lined up. An angle formed by a straight line passing through the markers 35-1 to 35-3 and a straight line passing through the markers 35-1 and 35-4 is 90 degrees. A measurable range by the sensor 10A is defined as a range 35A. A measurable range by the sensor 10B is defined as a range 35B.

The markers 35-1 to 35-4 each has a unique shape. The marker 35-1 is a "triangle". The marker 35-2 is a "quadrangle (diamond)". The marker 35-3 is a "pentagon". The marker 35-4 is a"hexagon".

Figure 18:
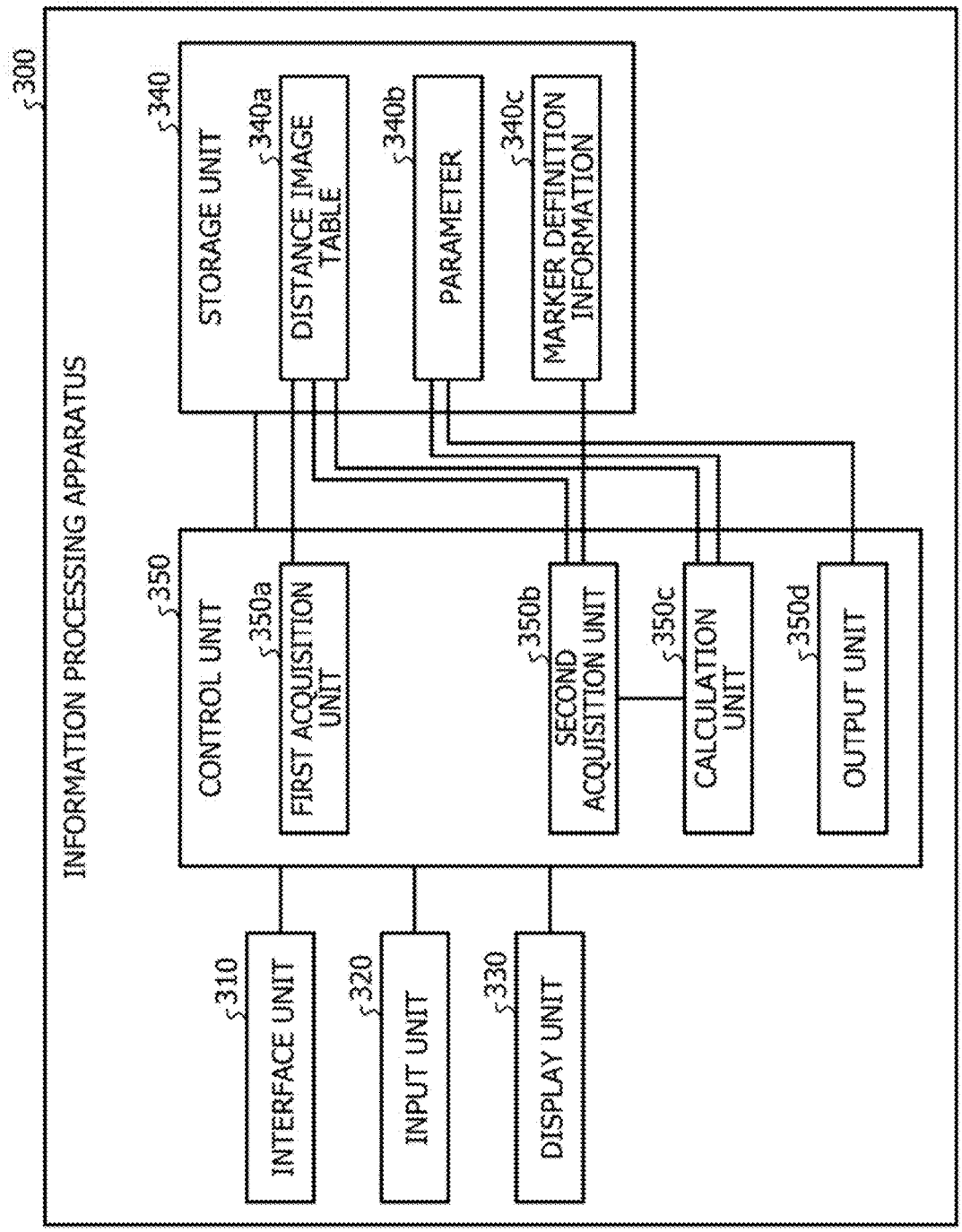
FIG. 18 is a functional block diagram illustrating a configuration of an information processing apparatus according to the present embodiment 2.

FIG. 18 is a functional block diagram illustrating a configuration of the information processing apparatus according to the present embodiment 2. As Illustrated in FIG. 18, this information processing apparatus 300 includes an interface unit 210, an input unit 320, a display unit 330, a storage unit 340, and a control unit 350.

The interface unit 210 is a communication device that receives information from the sensor 10A and the sensor 10B. The interface unit 210 receives first distance image information from the sensor 10A, and outputs the received first distance image information to the control unit 350. The interface unit 210 receives second distance image information from the sensor 10B, and outputs the received second distance image information to the control unit 350. Furthermore, the interface unit 210 may be connected to the scoring device 200 described in the embodiment 1.

The input unit 320 is an input device for inputting various types of information to the information processing apparatus 100. For example, the input unit 120 corresponds to a keyboard, a mouse, a touch panel, or the like. The user operates the input unit 120 to input various types of information.

The display unit 330 is a display device that displays various types of information output from the control unit 350. For example, the display unit 330 corresponds to a liquid crystal display, a touch panel, or the like.

The storage unit 340 includes a distance image table 340a and a parameter 340b. The storage unit 340 corresponds to a semiconductor memory element such as a RAM, a ROM, or a flash memory, or a storage device such as an HDD.

The distance image table 340a is a table that stores the first distance image information output from the sensor 10A and the second distance image information output from the sensor 10B. The data structure of the distance image table 340a is similar to the data structure of the distance image table 140a illustrated in FIG. 9.

The parameter 340b is a parameter for aligning the point group measured by the sensor 10A and the point group measured by the sensor 10B. The parameter includes information of an alignment rotation angle and information of an alignment translation distance.

Marker definition information 340c is information indicating correspondence among a characteristic of each marker and start points and end points of vectors, and translation points. FIG. 19 is a diagram illustrating an example of a data structure of the marker definition information. As illustrated in FIG. 19, the marker definition information associates the marker characteristic with the start points and end points of the respective vectors and the translation points using ON/OFF flags. On indicates that the association is valid and OFF indicates that the association is invalid.

For example, the marker with the marker characteristic "triangle" is defined to be the start point of the first vector. The marker with the marker characteristic "quadrangle" is defined to be the end point of the first vector, the start point of the second vector, the start point of the third vector, the start point of the fourth vector, and the translation point. The marker with the marker characteristic "pentagon" is defined to be the end point of the third vector. The marker with the marker characteristic "hexagon" is defined to be the end point of the second vector and the end point of the fourth vector.

The description returns to FIG. 18. The control unit 350 includes a first acquisition unit 350a, a second acquisition unit 350b, a calculation unit 350c, and an output unit 350d. The control unit 350 can be implemented by a CPU, an MPU, or the like. Furthermore, the control unit 350 can also be implemented by hard-wired logic such as an ASIC or an FPGA.

The first acquisition unit 350a acquires first distance image information from the sensor 10A via the interface unit 310, and registers the acquired first distance image information in the distance image table 340a. The first acquisition unit 350a acquires second distance image information from the sensor 101, and registers the acquired second distance image information in the distance image table 340a. Other descriptions regarding the first acquisition unit 350a are similar to those regarding the first acquisition unit 150a described in the embodiment 1.

The second acquisition unit 350b is a processing unit that acquires the first vector, the second vector, the first translation point, the third vector, the fourth vector, and the second translation point on the basis of respective visible images of the first and second distance image information and the marker definition information 340c.

The second acquisition unit 350b executes pattern matching with template of the polygons (triangle, quadrangle, pentagon, and hexagon) for the visible image of the distance image table 340a, and detects the markers of the triangle, quadrangle, pentagon, and hexagon. The second acquisition unit 350b determines which marker corresponds to the start point or end point of which vector, or which translation point on the basis of the marker definition information 340c, and acquires the first vector, second vector, first translation point, third vector, fourth vector, and second translation point.

The second acquisition unit 350b selects a point (the start point of the first vector) included in the triangle marker (the center of the marker) on the visible image of the first distance image information. In a case where a plurality of points is present in the triangle marker, the second acquisition unit 350b selects one of the points. The second acquisition unit 350b specifies identification information of a point corresponding to the selected point (the start point of the first vector) from each point group on the basis of the first distance image information of the distance image table 340a. The identification information of the point corresponding to the start point of the first vector is referred to as "first start point identification information".

The second acquisition unit 350b selects points (the end point of the first vector, the start point of the second vector, and the first translation point) included in the quadrangle marker (the center of the marker) on the visible image of the first distance image information. In a case where a plurality of points is present in the quadrangle marker, the second acquisition unit 350b selects one of the points.

The second acquisition unit 350b specifies identification information of points corresponding to the selected points (the end point of the first vector, the start point of the second vector, and the first translation point) from each point group on the basis of the first distance image information of the distance image table 340a. The identification information of the point corresponding to the end point of the first vector is referred to as "first end point identification information". The identification information of the point corresponding to the start point of the second vector is referred to as "second start point identification information". The identification information of the point corresponding to the first translation point is referred to as "first translation point identification information". In the example illustrated in FIG. 17, the points illustrated in the first end point identification information, the second start point identification information, and the first translation point identification information are the same point.

The second acquisition unit 350b selects a point (the end point of the second vector) included in the hexagon marker (the center of the marker) on the visible image of the first distance image information. In a case where a plurality of points is present in the hexagon marker, the second acquisition unit 350b selects one of the points. The second acquisition unit 350b specifies identification information of a point corresponding to the selected point (the end point of the second vector) from each point group on the basis of the first distance image information of the distance image table 340a. The identification information of the point corresponding to the end point of the second vector is referred to as "second end point identification information".

The second acquisition unit 350b selects points (the start point of the third vector, the start point of the fourth vector, and the second translation point) included in the quadrangle marker (the center of the marker) on the visible image of the second distance image information. In a case where a plurality of points is present in the quadrangle marker, the second acquisition unit 350b selects one of the points.

The second acquisition unit 350b specifies identification information of points corresponding to the selected points (the start point of the third vector, the start point of the fourth vector, and the second translation point) from each point group on the basis of the second distance image information of the distance image table 340a. The identification information of the point corresponding to the start point of the third vector is referred to as "third start point identification information". The identification information of the point corresponding to the start point of the fourth vector is referred to as "fourth start point identification information". The identification information of the point corresponding to the second translation point is referred to as "second translation point identification information". In the example illustrated in FIG. 17, the points illustrated in the third start point identification Information, the fourth start point identification information, and the second translation point identification information are the same point.

The second acquisition unit 350b selects a point (the end point of the third vector) included in the pentagon marker (the center of the marker) on the visible image of the second distance image information. In a case where a plurality of points is present in the pentagon marker, the second acquisition unit 350b selects one of the points. The second acquisition unit 350b specifies identification Information of a point corresponding to the selected point (the end point of the third vector) from each point group on the basis of the second distance image information of the distance image table 340a. The identification information of the point corresponding to the end point of the third vector is referred to as "third end point identification information".

The second acquisition unit 350b selects a point (the end point of the fourth vector) included in the hexagon marker (the center of the marker) on the visible image of the second distance image information. In a case where a plurality of points is present in the hexagon marker, the second acquisition unit 350b selects one of the points. The second acquisition unit 350b specifies identification information of a point corresponding to the selected point (the end point of the fourth vector) from each point group on the basis of the second distance image information of the distance image table 340a. The identification information of the point corresponding to the end point of the fourth vector is referred to as "fourth end point identification information".

The second acquisition unit 350b outputs the first start point identification Information, the first end point identification Information, the second start point identification information, the second end point identification information, and the first translation point identification information to the calculation unit 350c. The second acquisition unit 350b outputs the third start point identification information, the third end point identification information, the fourth start point identification information, the fourth end point identification information, and the second translation point identification information to the calculation unit 350c.

The calculation unit 350c is a processing unit that calculates a rotation angle and a translation distance for alignment on the basis of the first vector, the second vector, the third vector, the fourth vector, the first translation point, and the second translation point. The calculation unit 350c stores the calculated rotation angle and translation distance information in the storage unit 340 as the parameter 340b. The processing of the calculation unit 350c is similar to the processing of the calculation unit 150d described in the embodiment 1.

The output unit 350d is a processing unit that outputs the parameter 340b to an external device such as the scoring device 200 described in the embodiment 1.

Figure 20:
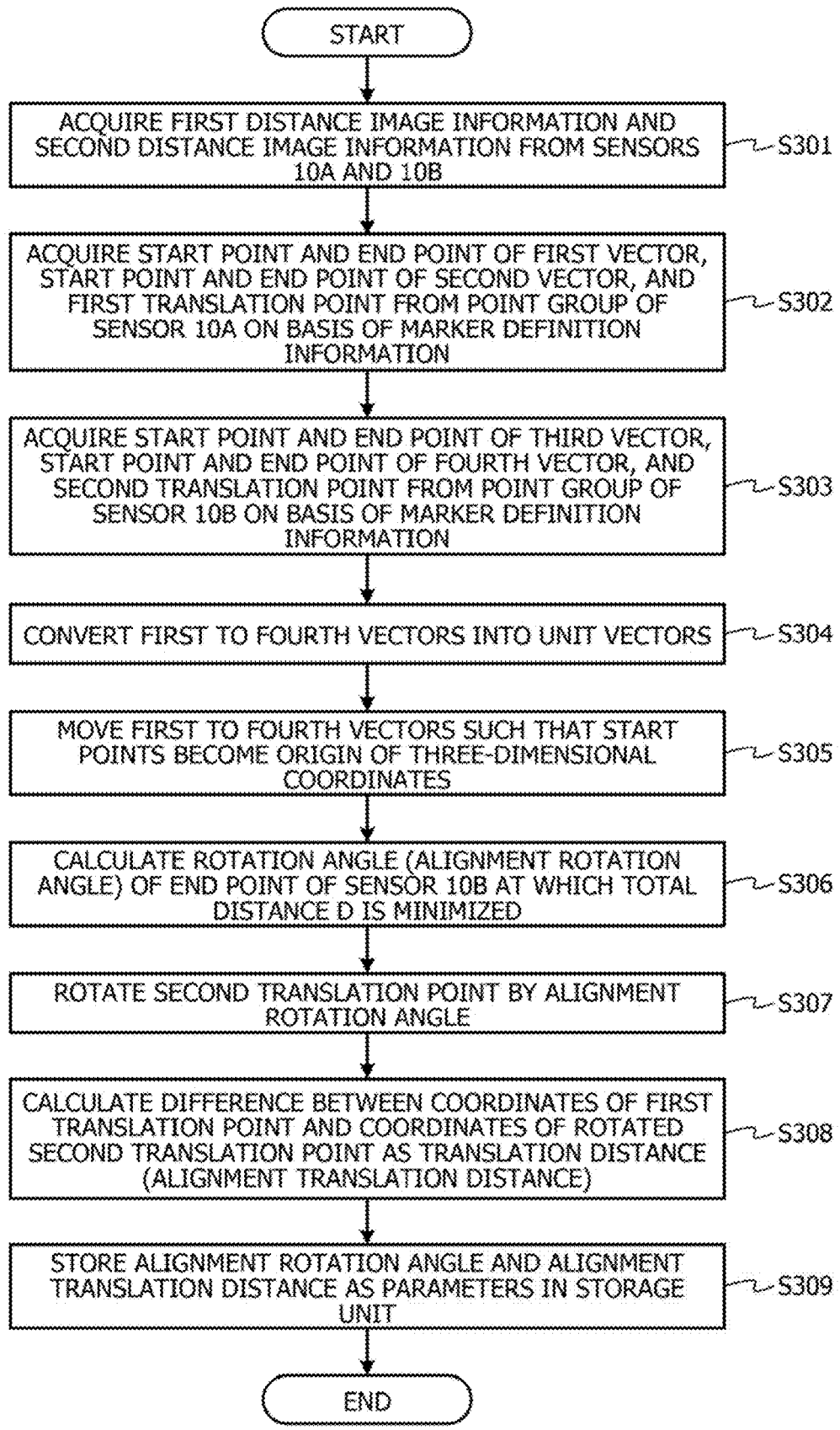
FIG. 20 is a flowchart illustrating a processing procedure of the information processing apparatus according to the present embodiment 2.

Next, an example a processing procedure of the information processing apparatus 300 according to the present embodiment 2 will be described. FIG. 20 is a flowchart illustrating a processing procedure of the information processing apparatus according to the present embodiment 2. As illustrated in FIG. 20, the first acquisition unit 350a of the information processing apparatus 300 acquires the first distance image information and the second distance image information from the sensors 10A and 10B (step S301).

The second acquisition unit 350b of the information processing apparatus 300 acquires the start point and end point of the first vector, the start point and end point of the second vector, and the first translation point from the point group of the sensor 10A on the basis of the marker definition information 340c (step S302). The second acquisition unit 350b acquires the start point and end point of the third vector, the start point and end point of the fourth vector, and the second translation point from the point group of the sensor 10B on the basis of the marker definition information 340c (step S303).

The calculation unit 350c of the information processing apparatus 300 converts the first to fourth vectors into unit vectors (step S304). The calculation unit 350c moves the first to fourth vectors such that the start points become the origin of three-dimensional coordinates (step S305).

The calculation unit 350c calculates the rotation angle (alignment rotation angle) of the end point of the sensor 10B at which a total distance D is minimized (step S306). The calculation unit 350c rotates the second translation point by the alignment rotation angle (step S307).

The calculation unit 350c calculates the difference between the coordinates of the first translation point and the coordinates of the rotated second translation point as the translation distance (alignment translation distance) (step S308). The calculation unit 350c stores the alignment rotation angle and the alignment translation distance as parameter 340b in the storage unit 340 (step S309).

Next, effects of the information processing apparatus 300 according to the present embodiment 2 will be described. The information processing apparatus 300 arranges the markers having different shapes in a predetermined positional relationship, thereby recognizing the shape of each mark, and automatically detecting the first to fourth vectors and the first and second translation points that satisfy the conditions 1 to 4. By executing such processing, it is possible to calculate parameters for alignment even if a user does not select the respective vectors and translation points to satisfy the conditions 1 to 4.

Note that, in the present embodiment 2, the case where the information processing apparatus 300 and the scoring device 200 are realized by separate devices has been described, but the present embodiment is not limited to the case. For example, the functions of the information processing apparatus 300 may include functions of the scoring device 200. That is, the control unit 350 of the information processing apparatus 300 may include an alignment unit 203, a recognition unit 240, an output unit 205, and the like of the scoring device 200.

Embodiment 3

As described in the embodiment 1, the alignment can be performed as long as the vectors (start points and end points of the first to fourth vectors) in the horizontal direction and the vertical direction in the real space and the same position (first and second translation points) in the real space can be acquired between the sensors 10A and 10B. In the embodiment 1, the case where the markers are arranged on the wall 15 has been described. However, if start points and end points of first to fourth vectors and first and second translation points can be acquired from an existing instrument or object, these points may be acquired from the existing instrument or object.

An information processing apparatus according to the present embodiment 3 displays an instruction screen and receives selection of the start points and end points of the first to fourth vectors and the first and second translation points from a user, using the fact, for example, that a parallel base for gymnastics is horizontal and that there is a moment when a player stands upright and stops moving.

Figure 21:
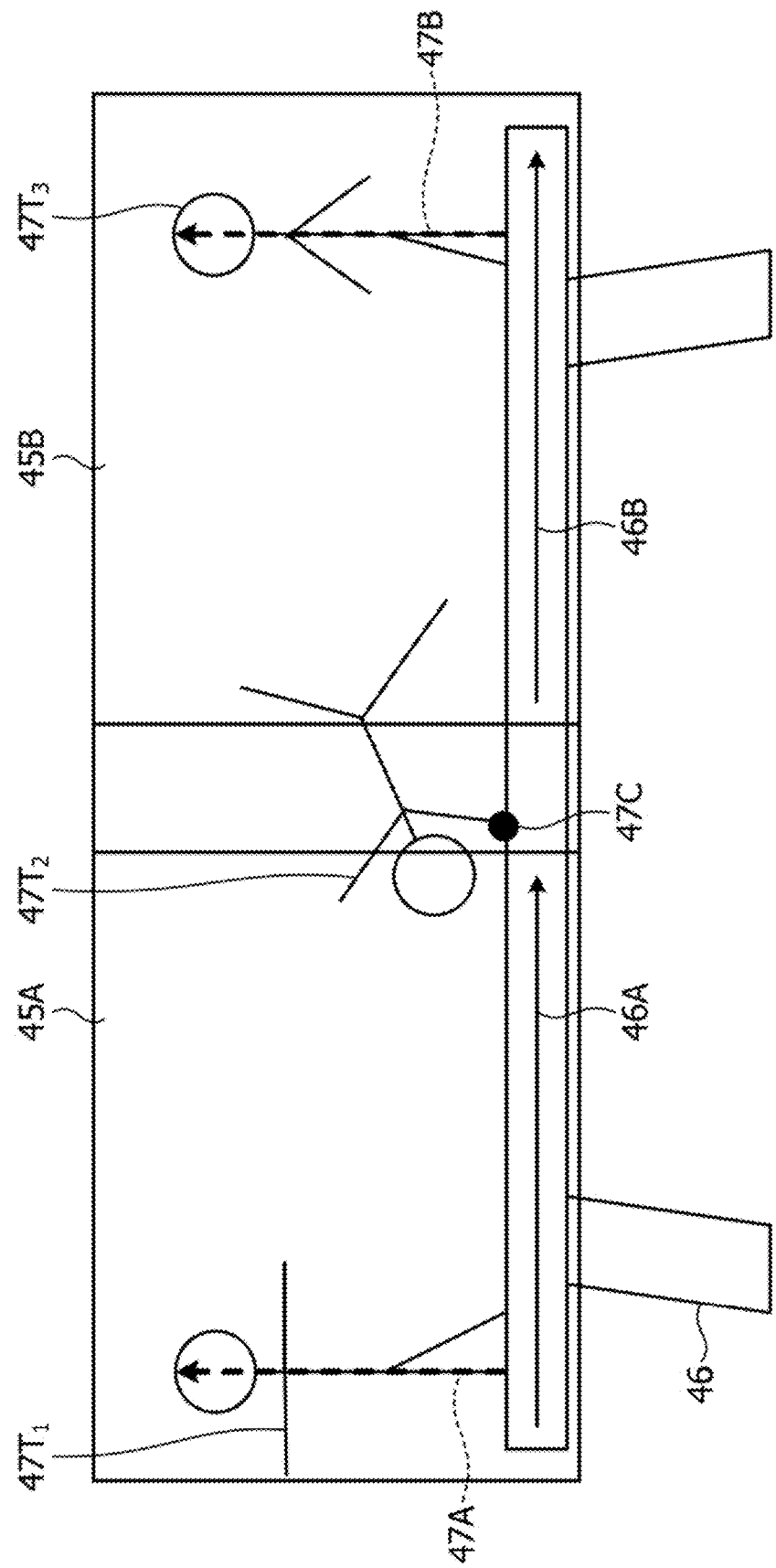
FIG. 21 is a diagram illustrating a player acting on a parallel base.

FIG. 21 is a diagram illustrating a player acting on a parallel base. In FIG. 21, a measurable range by a sensor 10A is defined as a range 45A. A measurable range by a sensor 10B is defined as a range 45B. Since a parallel base 46 is parallel, horizontal vectors 46A and 46B (first vector and third vector) can be obtained.

The player is acting on the parallel base 46, and the player at time $T_1$ is player $47T_1$. The player at time $T_2$ is player $47T_2$. The player at time $T_3$ is the player $47T_3$. At time $T_1$, the player 47T is upright, so a vertical vector 47A (second vector) can be obtained. At time $T_3$, the player $47T_3$ is upright, so a vertical vector 47B (fourth vector) can be obtained.

Furthermore, at time $T_2$, the player $47T_2$ is located in a region where the range 45A and the range 45B overlap, and a point 47C (first translation point and second translation point) for translation alignment can be obtained. Note that points for translation alignment other than the point 47C may be acquired from the region where the range 45A and the range 45B overlap as long as the points are at the same position.

Figure 22:
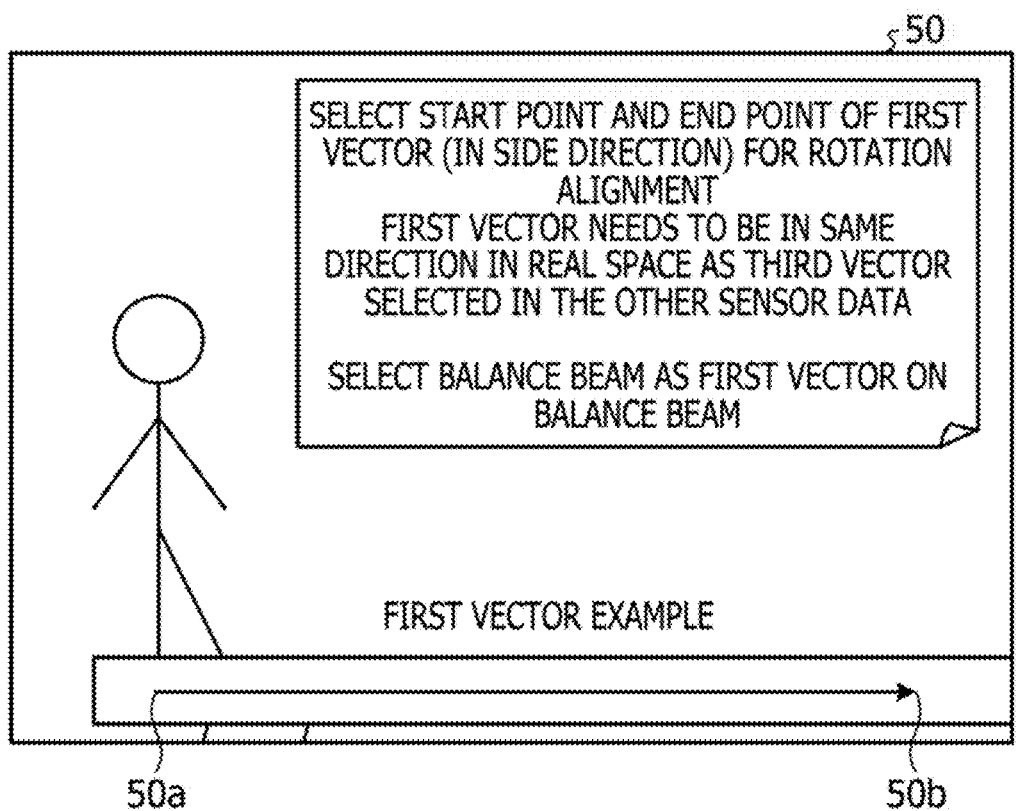
FIG. 22 is a diagram (1) Illustrating an example of an instruction screen according to the present embodiment 3.

FIG. 22 is a diagram (1) Illustrating an example of an instruction screen according to the present embodiment 3. An instruction screen 50 illustrated in FIG. 22 is a screen generated on the basis of the visible image of the sensor 10A. The user refers to the instruction screen 50 and operates an input device of an information processing apparatus 400 to select the start point of the first vector and the end point of the first vector. In the example illustrated in FIG. 22, a point 20*a* is selected as a start point of the first vector, and a point 50*b* is selected as an end point of the first vector.

Although not illustrated, the information processing apparatus 400 displays the instruction screen that receives selection of the third vector on the basis of the visible image of the sensor 10B. The user refers to the instruction screen and selects the start point of the third vector and the end point of the third vector. In the case of selecting the first vector and the third vector, the user makes sure that the first vector and the third vector satisfy condition 1.

Figure 23:
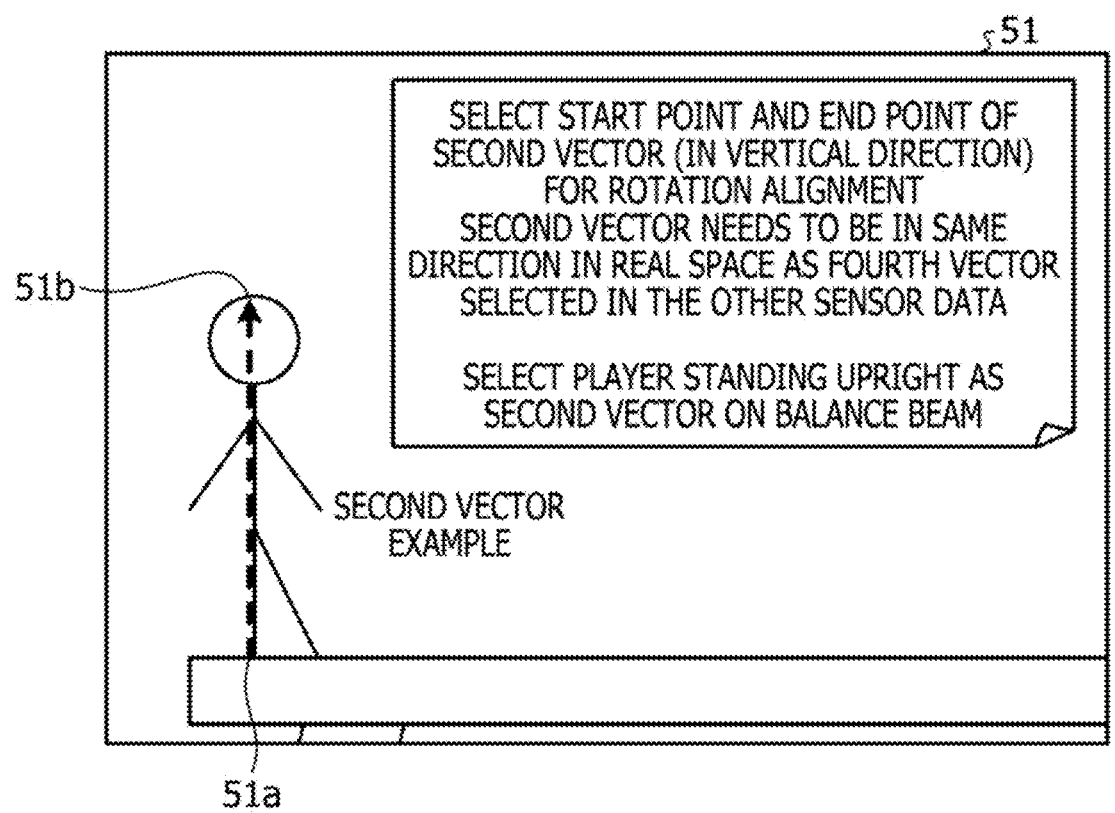
FIG. 23 is a diagram (2) illustrating an example of the instruction screen according to the present embodiment 3.

FIG. 23 is a diagram (2) illustrating an example of the instruction screen according to the present embodiment 3. An instruction screen 51 illustrated in FIG. 23 is a screen generated on the basis of the visible image of the sensor 10A. The user refers to the instruction screen 51 and operates the input device of the information processing apparatus 400 to select the start point of the second vector and the end point of the second vector. In the example illustrated in FIG. 23, a point 51*a* is selected as a start point of the second vector, and a point 51*b* is selected as an end point of the second vector.

Although not illustrated, the information processing apparatus 400 displays the instruction screen that receives selection of the fourth vector on the basis of the visible image of the sensor 10B. The user refers to the instruction screen and selects the start point of the fourth vector and the end point of the fourth vector. In the case of selecting the second vector and the fourth vector, the user makes sure that the second vector and the fourth vector satisfy condition 2. The user makes sure that the first vector and the second vector satisfy condition 3. The user makes sure that the third vector and the fourth vector satisfy the condition 3.

Figure 24:
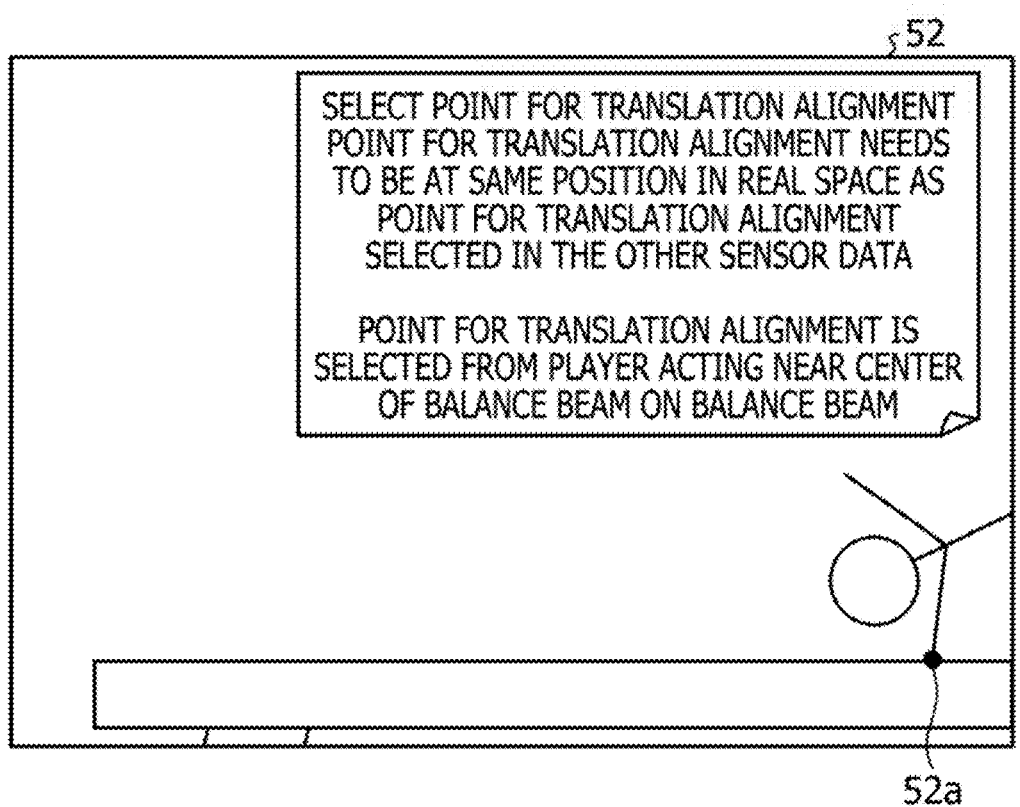
FIG. 24 is a diagram (3) illustrating an example of the instruction screen according to the present embodiment 3.

FIG. 24 is a diagram (3) illustrating an example of the instruction screen according to the present embodiment 3. An instruction screen 52 illustrated in FIG. 24 is a screen generated on the basis of the visible image of the sensor 10A. The user refers to the instruction screen 52 and operates the input device of the information processing apparatus 400 to select the first translation point. In the example illustrated in FIG. 24, a point 52*a* is selected as the first translation point.

Although not illustrated, the information processing apparatus 400 displays the instruction screen that receives the second translation point on the basis of the visible image of the sensor 10B. The user refers to the instruction screen and selects the second translation point. The user makes sure that the position of the first translation point and the position of the second translation point satisfy the condition 4.

As described above, the information processing apparatus 400 displays the instruction screens using the fact, for example, that the parallel base for gymnastics is horizontal and that there is a moment when the player stands upright and stops moving, instead of the markers described above in the embodiment 1. Therefore, the first to fourth vectors and the first and second translation points can be obtained without using the markers as described in the embodiment 1.

Figure 25:
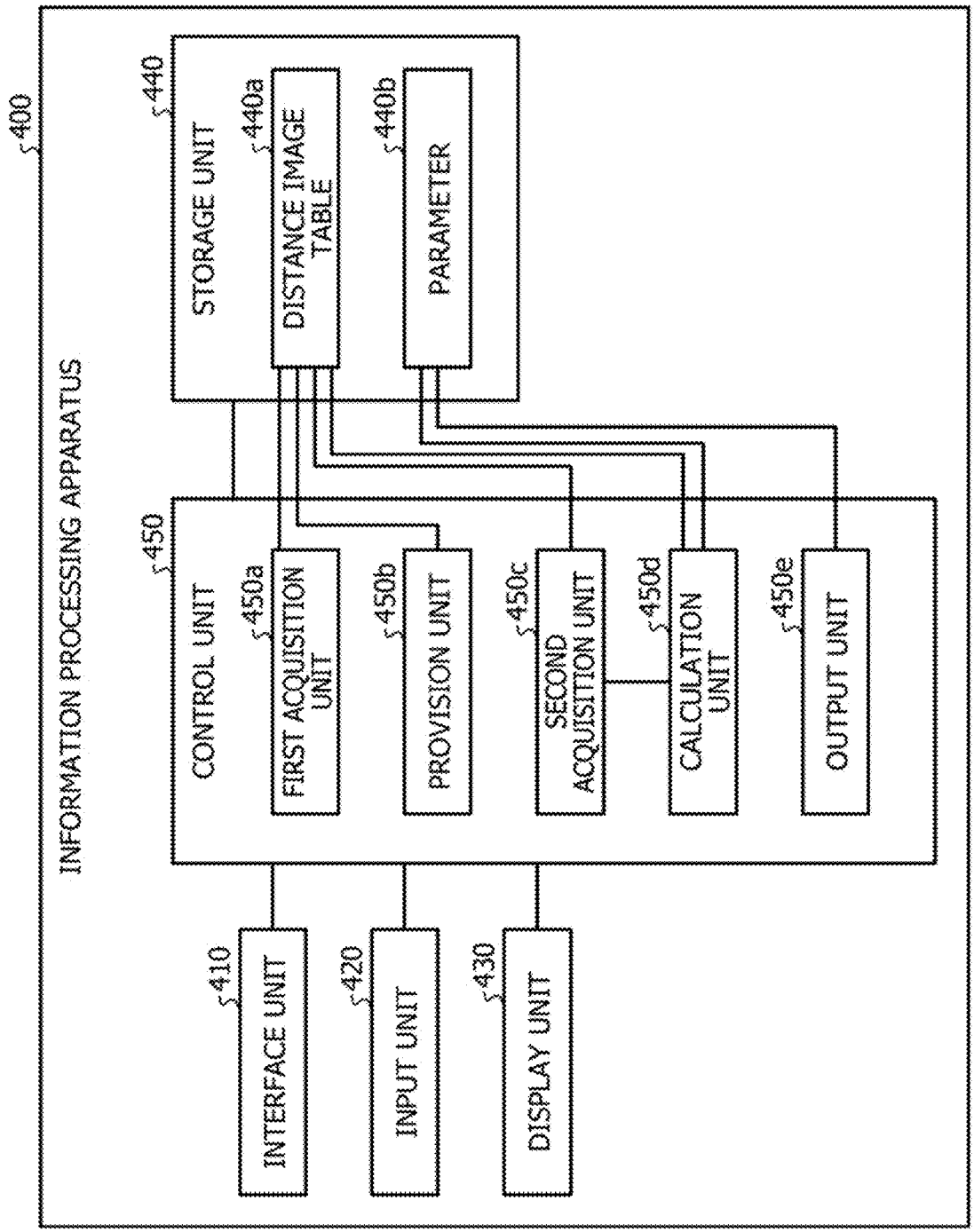
FIG. 25 is a functional block diagram illustrating a configuration of an information processing apparatus according to the present embodiment 3.

Next, an example of a configuration of the information processing apparatus 400 according to the present embodiment 3 will be described. FIG. 25 is a functional block diagram illustrating a configuration of the information processing apparatus according to the present embodiment 3. As illustrated in FIG. 25, the information processing apparatus 400 includes an interface unit 410, an input unit 420, a display unit 430, a storage unit 440, and a control unit 450.

The interface unit 410 is a communication device that receives information from the sensor 10A and the sensor 10B. The interface unit 410 receives first distance image information from the sensor 10A, and outputs the received first distance image information to the control unit 450. The interface unit 410 receives second distance image information from the sensor 10B, and outputs the received second distance image information to the control unit 450. Furthermore, the interface unit 110 may be connected to a scoring device described below.

The input unit 420 is an input device for inputting various types of information to the information processing apparatus 400. For example, the input unit 420 corresponds to a keyboard, a mouse, a touch panel, or the like. The user refers to the instruction screens illustrated in FIGS. 22 to 24 and operates the input unit 420 to select the start point and the end point of the first vector, the start point and the end point of the second vector, and the first translation point. Furthermore, the user operates the input unit 420 to select the start point and the end point of the third vector, the start point and the end point of the fourth vector, and the second translation point.

The display unit 430 is a display device that displays various types of information output from the control unit 450. For example, the display unit 430 corresponds to a liquid crystal display, a touch panel, or the like. For example, the display unit displays the instruction screens illustrated in FIGS. 22 to 24.

The storage unit 440 includes a distance image table 440*a* and a parameter 440*b*. The storage unit 440 corresponds to a semiconductor memory element such as a RAM, a ROM, or a flash memory, or a storage device such as an HDD.

The distance image table 440*a* is a table that stores the first distance image information of each time output from the sensor 10A and the second distance image information of each time output from the sensor 10B. FIG. 26 is a diagram illustrating an example of a data structure of a distance image table according to the present embodiment 3.

As illustrated in FIG. 26, a distance image table 440*a* includes tables 441 and 442. The table 441 IS a table that associates the time with the first distance image information measured by the sensor 10A at that time. The table 442 is a table that associates the time with the second distance image information measured by the sensor 10B at that time. The first distance image information and the second distance image information are similar to those described in the embodiment 1.

The parameter 440*b* is a parameter for aligning a point group measured by the sensor 10A and a point group measured by the sensor 10B. The parameter 440*b* Includes Information of an alignment rotation angle and information of an alignment translation distance.

The control unit 450 includes a first acquisition unit 450*a*, a provision unit 450*b*, a second acquisition unit 450*c*, a calculation unit 450*d*, and an output unit 450*e*. The control unit 450 can be implemented by a CPU, an MPU, or the like.

Furthermore, the control unit 450 can also be implemented by hard-wired logic such as an ASIC or an FPGA.

The first acquisition unit 450a acquires the first distance image information from the sensor 10A at each time via the interface unit 410, and registers the acquired first distance image information in the table 441 of the distance image table 440a. The first acquisition unit 150a acquires the second distance image information from the sensor 10B at each time, and registers the acquired second distance image information in the table 442 of the distance image table 440a.

In the case of registering the first distance image information in the table 441 of the distance image table 440a, the first acquisition unit 450a converts information of a distance between each point group and the sensor 10A into three-dimensional coordinate information. For example, the first acquisition unit 450a uses a conversion table that converts a distance into three-dimensional coordinates in the case of converting distance information into three-dimensional coordinate information.

In the case of registering the second distance image information in the table 442 of the distance image table 440a, the first acquisition unit 450a converts the information of the distance between each point group and the sensor 10B into three-dimensional coordinate information. For example, the first acquisition unit 450a uses a conversion table that converts a distance into three-dimensional coordinates in the case of converting distance information into three-dimensional coordinate information.

The provision unit 450b is a processing unit that generates information of the instruction screen and outputs the information of the instruction screen to the display unit 430 to display the instruction screen. The instruction screen displayed on the display unit 430 corresponds to the instruction screen 50, 51, 52, or the like illustrated in each of FIGS. 22 to 24 and the like.

The provision unit 450b generates the instruction screen on the basis of the visible image stored in the distance image table 440a. The provision unit 450b generates the instruction screen for receiving selection of the first vector, using the visible image of the first distance image information. The provision unit 450b provides a comment to select the start point and the end point of the first vector in the case of generating the information of the instruction screen.

The provision unit 450b performs the following processing in the case of generating the instruction screen for receiving selection of the second vector. The provision unit 450b selects a visible image having an edge of a predetermined length or more in the vertical direction from the first distance image information (visible images) at respective times in the table 441. For example, the visible image having an edge of a predetermined length or more in the vertical direction includes an upright player. The provision unit 450b generates the instruction screen for receiving selection of the second vector, using the selected visible image. The provision unit 450b provides a comment to select the start point and the end point of the second vector in the case of generating the information of the instruction screen.

The provision unit 450b performs the following processing in the case of generating the instruction screen for receiving selection of the first translation point. The provision unit 450b selects a visible image including the player in an overlap region where the range 45A and the range 45B overlap from the first distance image information (visible images) at respective times in the table 441. For example, the provision unit 450b may hold a background image for the overlap region and determine whether or not the player is included in an overlap image using a difference between the overlap region of the visible image and the background image. The provision unit 450b generates the instruction screen for receiving selection of the first translation point, using the selected visible image. The provision unit 450b provides a comment to select the first translation point in the case of generating the information of the instruction screen.

The provision unit 450b generates the instruction screen for receiving selection of the third vector, using the visible image of the second distance image information. The provision unit 450b provides a comment to select the start point and the end point of the third vector in the case of generating the information of the instruction screen.

The provision unit 450b performs the following processing in the case of generating the instruction screen for receiving selection of the fourth vector. The provision unit 450b selects a visible image having an edge of a predetermined length or more in the vertical direction from the second distance image information (visible images) at respective times in the table 442. For example, the visible image having an edge of a predetermined length or more in the vertical direction includes an upright player. The provision unit 450b generates the instruction screen for receiving selection of the fourth vector, using the selected visible image. The provision unit 450b provides a comment to select the start point and the end point of the fourth vector in the case of generating the information of the instruction screen.

The provision unit 450b performs the following processing in the case of generating the instruction screen for receiving selection of the second translation point. The provision unit 450b selects a visible image including the player in an overlap region where the range 45A and the range 45B overlap from the second distance image information (visible images) at respective times in the table 442. For example, the provision unit 450b may hold a background image for the overlap region and determine whether or not the player is included in an overlap image using a difference between the overlap region of the visible image and the background image. The provision unit 450b generates the instruction screen for receiving selection of the second translation point, using the selected visible image. The provision unit 450b provides a comment to select the second translation point in the case of generating the information of the instruction screen.

The second acquisition unit 450c is a processing unit that acquires the first vector, the second vector, the first translation point, the third vector, the fourth vector, and the second translation point on the basis of the information selected by the user on the instruction screen. The second acquisition unit 450c performs similar processing to the second acquisition unit 150c of the embodiment 1, and specifies the first start point identification information, the first end point identification information, the second start point identification information, the second end point identification information, and the first translation point identification information. The second acquisition unit 450c performs similar processing to the second acquisition unit 150c of the embodiment 1, and specifies the third start point identification information, the third end point identification information, the fourth start point identification Information, the fourth end point identification information, and the second translation point identification information.

The second acquisition unit 450c outputs the first start point identification information, the first end point identification information, the second start point identification information, the second end point identification information, the first translation point identification information, the third start point identification information, the third end point identification information, the fourth start point identification information, the fourth end point identification information, and the second translation point identification information to the calculation unit 450d.

The calculation unit 450d is a processing unit that calculates the rotation angle and the translation distance for alignment on the basis of the first vector, the second vector, the third vector, the fourth vector, the first translation point, and the second translation point. The calculation unit 450d stores the calculated rotation angle and translation distance information in the storage unit 440 as a parameter 440b. The processing of the calculation unit 450d is similar to the processing of the calculation unit 150d described in the embodiment 1.

The output unit 450e is a processing unit that outputs the parameter 440b to an external device such as the scoring device 200 described in the embodiment 1.

Figure 27:
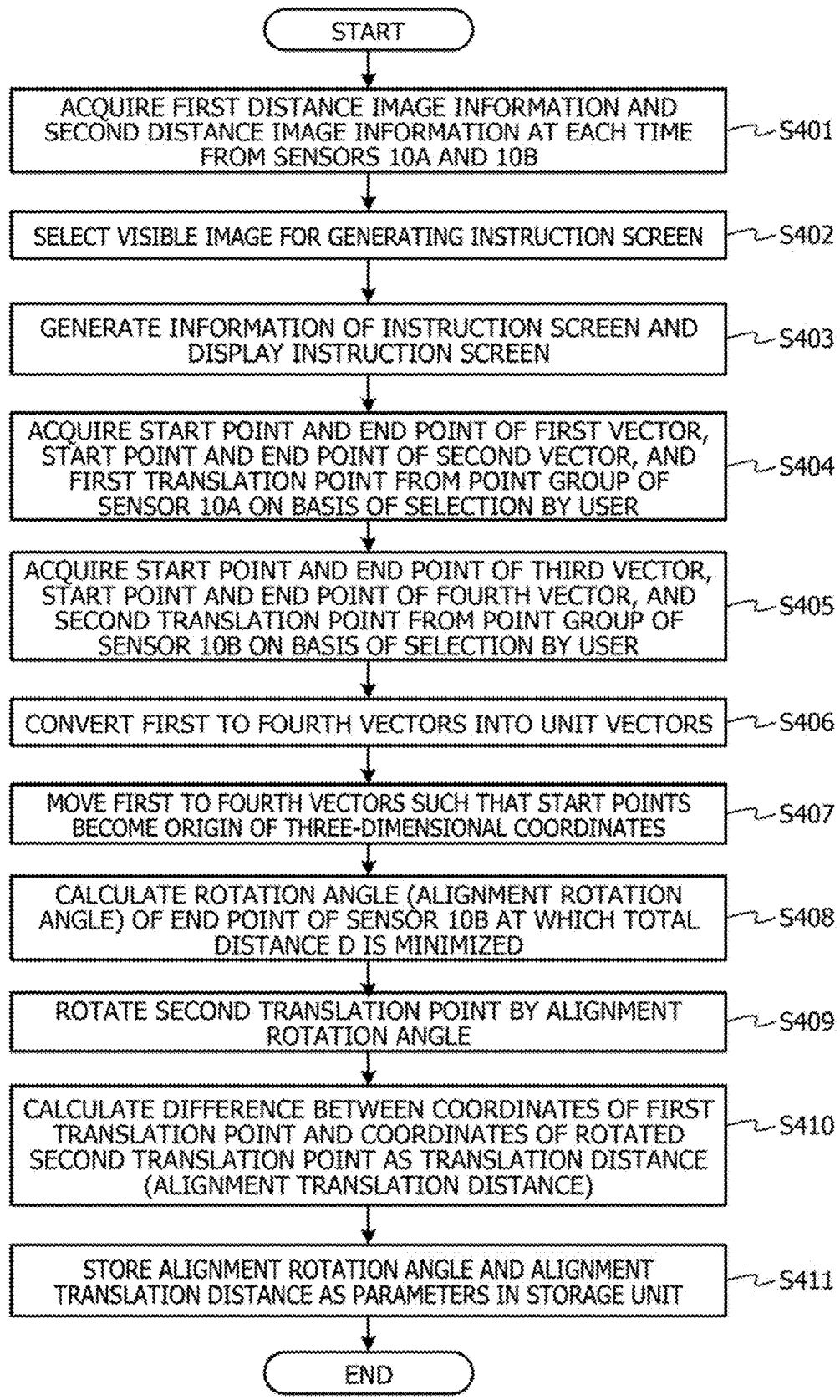
FIG. 27 is a flowchart illustrating a processing procedure of the information processing apparatus according to the present embodiment 3.

Next, an example a processing procedure of the information processing apparatus 400 according to the present embodiment 3 will be described. FIG. 27 is a flowchart illustrating a processing procedure of the information processing apparatus according to the present embodiment 3. As illustrated in FIG. 27, the first acquisition unit 450a of the information processing apparatus 400 acquires the first distance image information and the second distance image information at each time from the sensors 10A and 10B (step S401).

The provision unit 450b of the information processing apparatus 400 selects the visible image for generating the instruction screen (step S402). The provision unit 450b generates the information of the instruction screen and causes the display unit 430 to display the instruction screen (step S403).

The second acquisition unit 450c of the information processing apparatus 400 acquires the start point and end point of the first vector, the start point and end point of the second vector, and the first translation point from the point group of the sensor 10A on the basis of the selection by the user (step S404). The second acquisition unit 450c acquires the start point and end point of the third vector, the start point and end point of the fourth vector, and the second translation point from the point group of the sensor 10B on the basis of the selection by the user (step S405).

The calculation unit 450d of the information processing apparatus 400 converts the first to fourth vectors into unit vectors (step S406). The calculation unit 450d moves the first to fourth vectors such that the start points become the origin of three-dimensional coordinates (step S407).

The calculation unit 450d calculates the rotation angle (alignment rotation angle) of the end point of the sensor 10B at which the total distance D is minimized (step S408). The calculation unit 450d rotates the second translation point by the alignment rotation angle (step S409).

The calculation unit 450d calculates the difference between the coordinates of the first translation point and the coordinates of the rotated second translation point as the translation distance (alignment translation distance) (step S410). The calculation unit 450d stores the alignment rotation angle and the alignment translation distance as parameter 440b in the storage unit 440 (step S411).

Next, effects of the information processing apparatus 400 according to the present embodiment 3 will be described. The information processing apparatus 400 displays the instruction screens using the fact, for example, that the parallel base for gymnastics is horizontal and that there is a moment when the player stands upright and stops moving, instead of the markers described above in the embodiment 1. Therefore, the first to fourth vectors and the first and second translation points can be obtained without using the markers as described in the embodiment 1. Then, thereby, the sensor 10A and the sensor 10B can be aligned.

Note that, in the present embodiment 3, the case of acquiring the first to fourth vectors and the first and second translation points using the parallel base and the player has been described. However, the embodiment is not limited to the case. The information processing apparatus 400 may acquire the start points and end points of the first to fourth vectors and the first and second translation points from another instrument or object by which those points can be acquired.

In the embodiment 3, the case where the information processing apparatus 400 and the scoring device 200 are realized by separate devices has been described, but the present embodiment is not limited to the case. For example, the functions of the information processing apparatus 400 may include functions of the scoring device 200. That is, the control unit 450 of the information processing apparatus 400 may include an alignment unit 203, a recognition unit 240, an output unit 205, and the like of the scoring device 200.

Embodiment 4

Next, an information processing apparatus according to the present embodiment 4 will be described. The information processing apparatus according to the present embodiment 4 is connected to a sensor 10A and a sensor 106 similarly to the embodiment 1.

Figure 28:
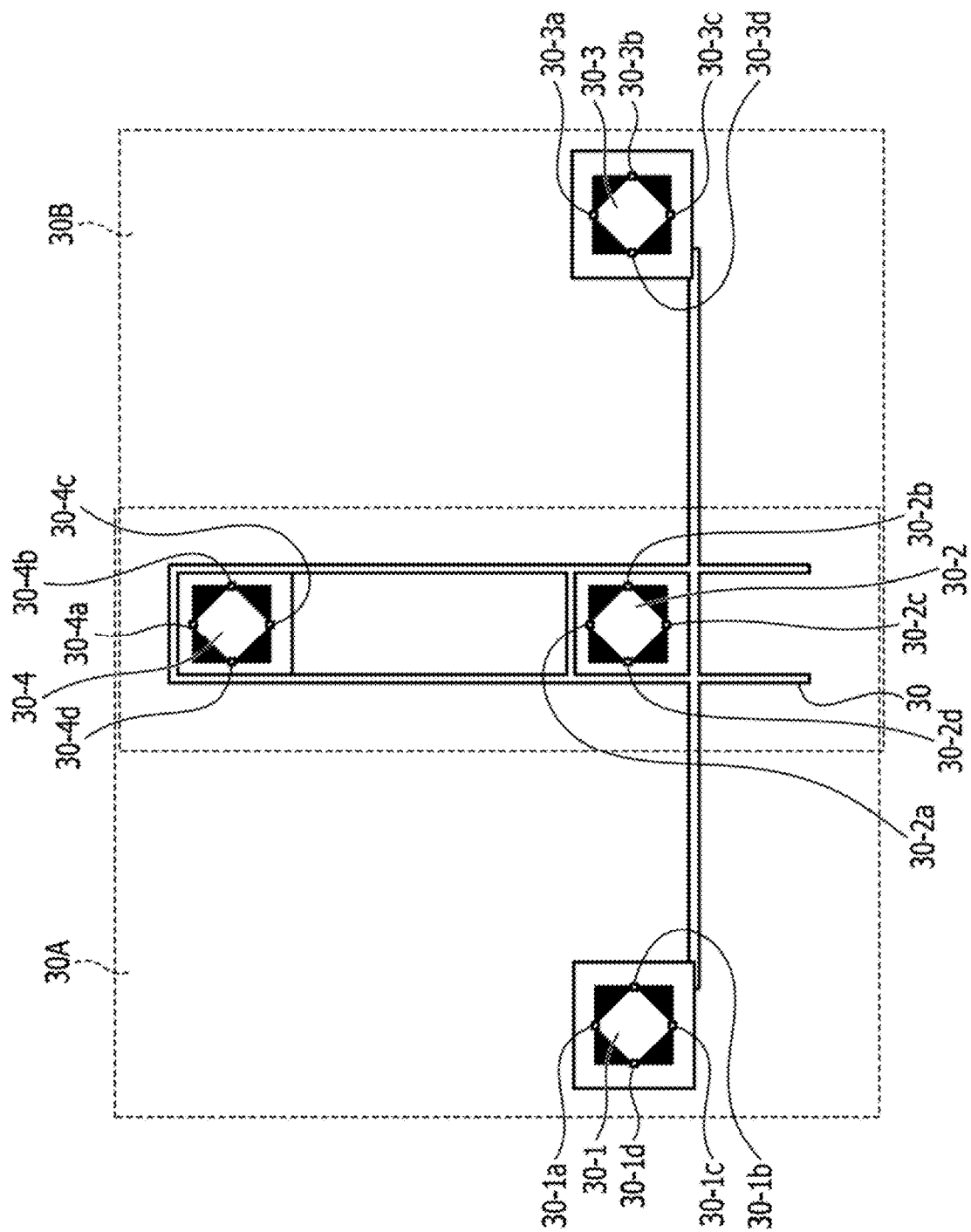
FIG. 28 is a diagram illustrating examples of markers used in the present embodiment 4.

FIG. 28 is a diagram illustrating examples of markers used in the present embodiment 4. As illustrated in FIG. 28, a marker arrangement table 30 includes markers 30-1, 30-2, 30-3, and 30-4. A plurality of stickers is attached to the markers 30-1 to 30-4, respectively. Each sticker is a retroreflective sticker. A measurable range by the sensor 10A is defined as a range 30A. A measurable range by the sensor 10B is defined as a range 30B.

For example, stickers 30-1a, 30-1b, 30-1c, and 30-1d are arranged at respective corners of the marker 30-1. Stickers 30-2a, 30-2b, 30-2c, and 30-2d are arranged at respective corners of the marker 30-2. Stickers 30-3a, 30-3b, 30-3c, and 30-3d are arranged at respective corners of the marker 30-3. Stickers 30-4a, 30-4b, 30-4c, and 30-4d are arranged at respective corners of the marker 30-4.

Figure 29:
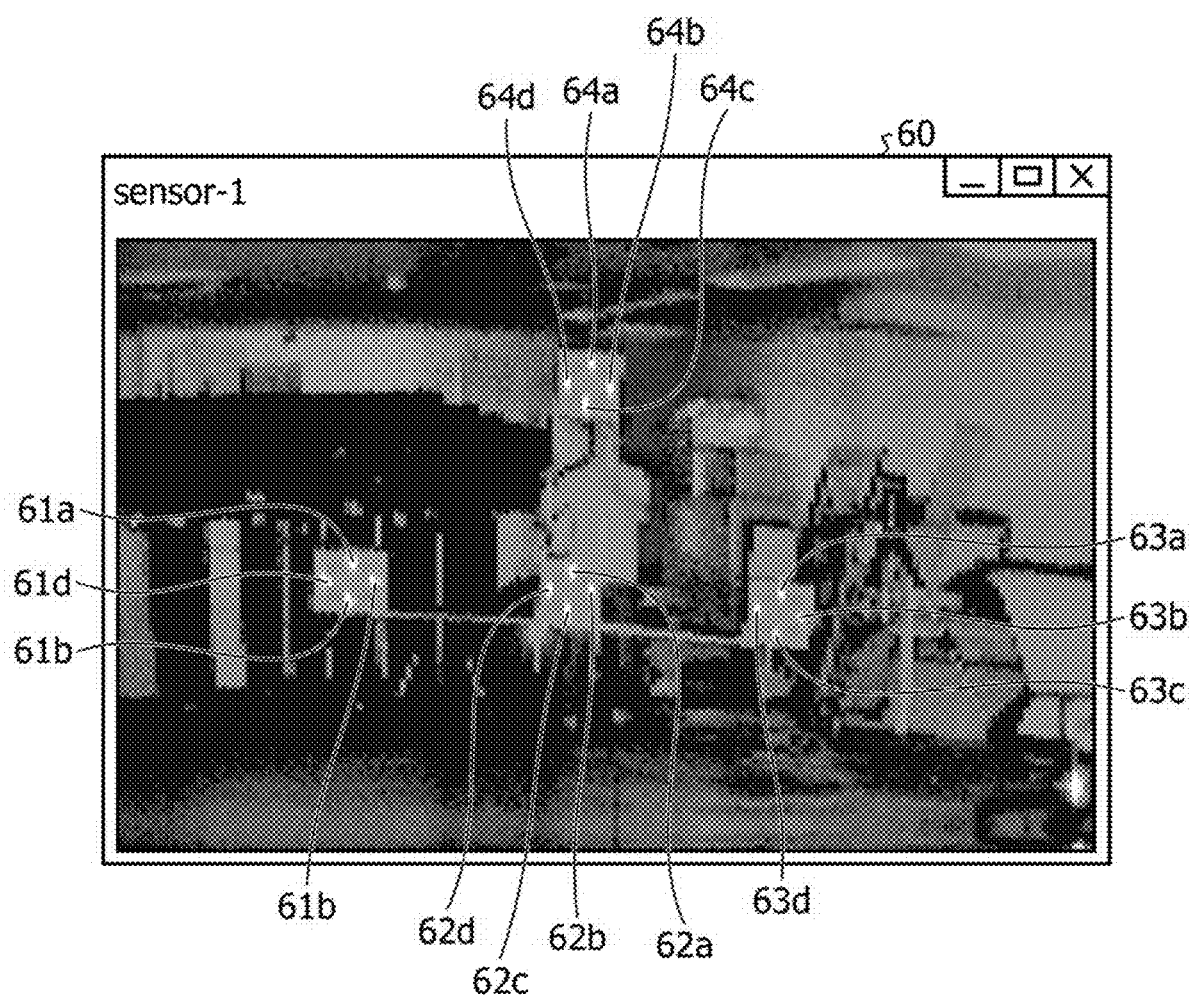
FIG. 29 is a diagram illustrating an example of reflection intensity images of respective markers to which stickers are attached.

FIG. 29 is a diagram illustrating an example of reflection intensity images of respective markers to which stickers are attached. In the example illustrated in FIG. 29, a region with high reflection intensity is brighter than a region with low reflection intensity. For example, in a reflection intensity image 60, regions 61a, 61b, 61c, and 61d are regions where the stickers 30-1a, 30-1b, 30-1c, and 30-1d are arranged. Regions 62a, 62b, 62c, and 62d are regions where the stickers 30-2a, 30-2b, 30-2c, and 30-2d are arranged. Regions 63a, 63b, 63c, and 63d are regions where the stickers 30-3a, 30-3b, 30-3c, and 30-3d are arranged. Regions 64a, 64b, 64c, and 64d are regions where the stickers 30-4a, 30-4b, 30-4c, and 30-4d are arranged.

The sensor 10A according to the present embodiment 4 is a measuring device that emits a laser beam and measures a distance between a point group constituting an object and the sensor 10A. The sensor 10A captures a visible image. Furthermore, the sensor 10A also measures the reflection intensity of the laser beam. The sensor 10A outputs first distance image information to the information processing apparatus. The first distance image information includes information of the distance between the point group constituting the object and the sensor 10A, information of the visible image, and information of the reflection intensity.

The sensor 10B according to the present embodiment 4 is a measuring device that emits a laser beam and measures a distance between the point group constituting the object and the sensor 10B. The sensor 10B captures a visible image. Furthermore, the sensor 10B measures the reflection intensity of the laser beam. The sensor 10B outputs second distance image information to the information processing apparatus. The second distance image information includes information of the distance between the point group constituting the object and the sensor 10A, information of the visible image, and information of the reflection intensity.

The information processing apparatus according to the present embodiment 4 generates information of the instruction screen on the basis of the visible image of the marker arrangement table 30, and displays the information on the display unit. The information processing apparatus receives selection of start points and end points of first to fourth vectors and first and second translation points from a user who refers to instruction screens.

Next, the information processing apparatus repeatedly executes processing of specifying the position of each sticker arranged on each marker on the basis of the information of the reflection intensity sequentially input from the sensor 10A or 10B, and calculating the position of each marker on the basis of the position of each sticker. The information processing apparatus performs processing of correcting the start points and end points of the first to fourth vectors and the positions of the first and second translation points selected by the user on the basis of the positions of the respective markers. The information processing apparatus executes such processing, thereby specifying the optimum start points and end points of the first to fourth vectors and the optimum positions of the first and second translation points even in the case where the start points and end points of the first to fourth vectors and the positions of the first and second translation points selected by the user are not accurate or even in the case where the markers are shifted due to some reasons after selected.

Figure 30:
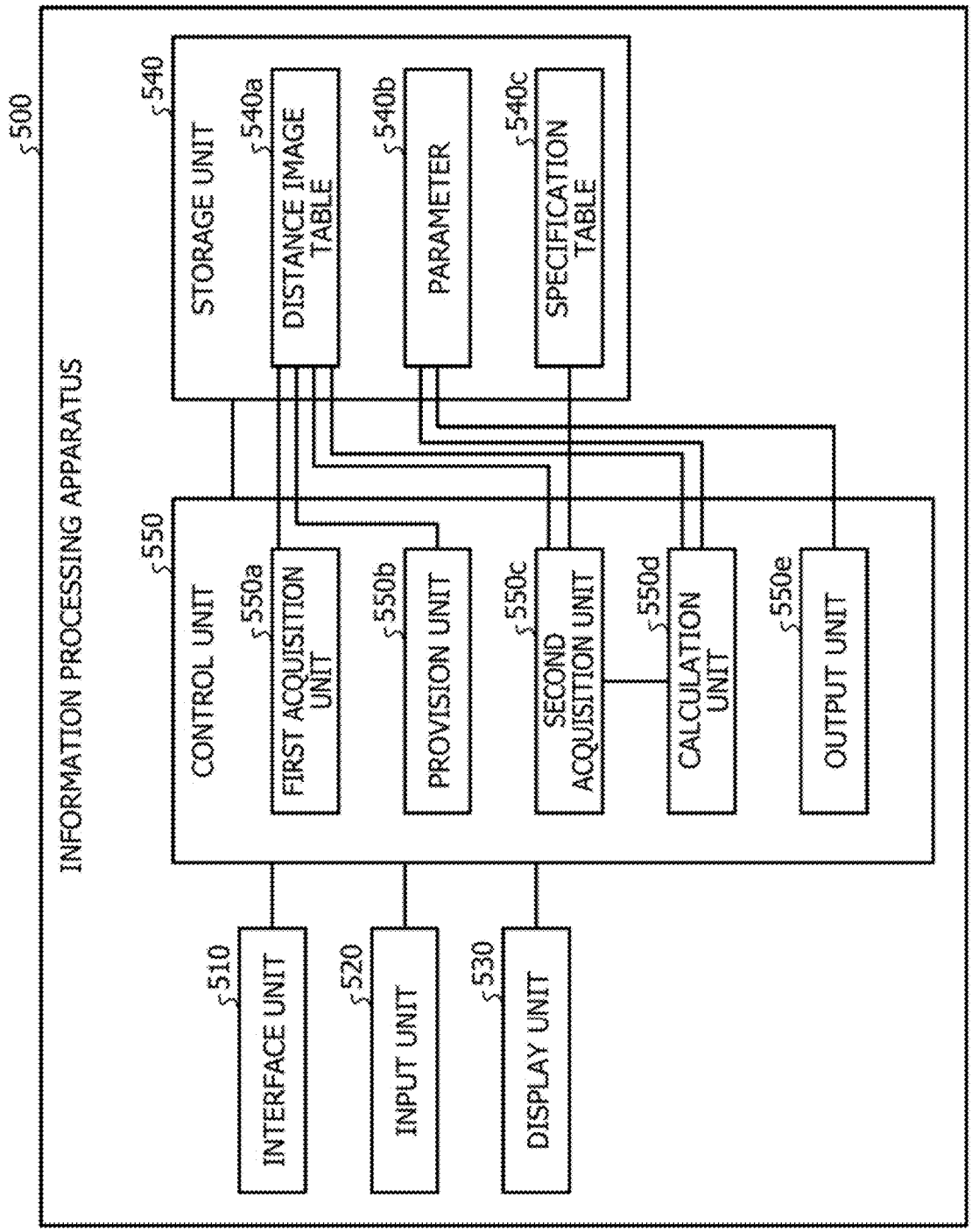
FIG. 30 is a functional block diagram illustrating a configuration of an information processing apparatus according to the present embodiment 4.

FIG. 30 is a functional block diagram illustrating a configuration of the information processing apparatus according to the present embodiment 4. As illustrated in FIG. 30, the information processing apparatus 500 includes an interface unit 510, an input unit 520, a display unit 530, a storage unit 540, and a control unit 550.

The Interface unit 510 is a communication device that receives information from the sensor 10A and the sensor 10B. The interface unit 510 receives first distance image information from the sensor 10A, and outputs the received first distance image information to the control unit 550. The interface unit 510 receives second distance image information from the sensor 101, and outputs the received second distance image information to the control unit 550. Furthermore, the interface unit 510 may be connected to the scoring device 200 described in the embodiment 1.

The input unit 520 is an input device for inputting various types of information to the information processing apparatus 500. For example, the input unit 520 corresponds to a keyboard, a mouse, a touch panel, or the like. The user refers to the instruction screen and operates the input unit 520 to select the start point and the end point of the first vector, the start point and the end point of the second vector, and the first translation point. Furthermore, the user operates the input unit 520 to select the start point and the end point of the third vector, the start point and the end point of the fourth vector, and the second translation point.

The display unit 530 is a display device that displays various types of information output from the control unit 550. For example, the display unit 530 corresponds to a liquid crystal display, a touch panel, or the like. For example, the display unit displays an instruction screen.

The storage unit 540 includes a distance image table 540a, a parameter 540b, and a specification table 540c. The storage unit 540 corresponds to a semiconductor memory element such as a RAM, a ROM, or a flash memory, or a storage device such as an HDD.

The distance image table 540a is a table that stores the first distance image information of each time output from the sensor 10A and the second distance image information of each time output from the sensor 10B. The data structure of the distance image table 540a is similar to the data structure of the distance image table 440a described in FIG. 26 of the embodiment 3. Note that the first distance image information at each time includes the distance information measured by the sensor 10A, the visible image information, and the reflection intensity information. The second distance image information at each time includes the distance information, the visible image information, and the reflection intensity information.

The parameter 540b is a parameter for aligning the point group measured by the sensor 10A and the point group measured by the sensor 10B. The parameter 540b includes information of an alignment rotation angle and information of an alignment translation distance.

The specification table 540c is a table used to specify coordinates of the start points and end points of the first to fourth vectors and the first and second translation points. FIG. 31 is a diagram illustrating an example of a data structure of the specification table. As illustrated in FIG. 31, this specification table 540c includes a coordinate table 541 and a coordinate table 542. The coordinate table 541 is a table that stores information of coordinates selected on the instruction screen and coordinates specified from the reflection intensity information at each time, for the start points and end points of the first to fourth vectors. The coordinate table 542 is a table that stores information of coordinates selected on the instruction screen and coordinates specified from the reflection intensity information at each time, for the first and second translation points.

The coordinate table 541 associates a vector type, selected start point coordinates, selected end point coordinates, candidate start point coordinates, and candidate end point coordinates. The vector type is information indicating a type of the vector. The vector type is one of the first vector, second vector, third vector, and fourth vector. The selected start point coordinates indicate the coordinates of the start point of the vector selected by the user on the instruction screen. The selected end point coordinates indicate the coordinates of the end point of the vector selected by the user on the instruction screen. The candidate start point coordinates indicate the coordinates of the start point of the vector calculated on the basis of the reflection intensity information. The candidate end point coordinates indicate the coordinates of the end point of the vector calculated on the basis of the reflection intensity information. For example, the candidate start point coordinates and the candidate end point coordinates are calculated for each time.

The coordinate table 542 associates a translation point type, selected coordinates, and candidate coordinates. The translation point type is information indicating a type of the translation point. The translation point type is either the first translation point or the second translation point. The selected coordinates indicate the coordinates of the translation point selected by the user on the instruction screen. The candidate coordinates indicate the coordinates of the translation point calculated on the basis of the reflection intensity information. For example, the candidate coordinates are calculated for each time.

The description returns to FIG. 30. The control unit 550 includes a first acquisition unit 550a, a provision unit 550b, a second acquisition unit 550c, a calculation unit 550d, and an output unit 550e. The control unit 550 can be implemented by a CPU, an MPU, or the like. Furthermore, the control unit 550 can also be implemented by hard-wired logic such as an ASIC or an FPGA.

The first acquisition unit 550a acquires the first distance image information output from the sensor 10A at each time via the interface unit 510, and registers the acquired first distance image information in the distance image table 540a. The first acquisition unit 150a acquires the second distance image information output from the sensor 10B at each time, and registers the acquired second distance image information in the distance image table 140a. Other descriptions regarding the first acquisition unit 550a are similar to those regarding the first acquisition unit 150a described in the embodiment 1.

The provision unit 550b is a processing unit that generates information of the instruction screen and outputs the information of the instruction screen to the display unit 530 to display the instruction screen. For example, when receiving a display request of the instruction screen from the input unit 520, the provision unit 550b generates the instruction screen for receiving selection of the first vector, the second vector, and the first translation point, using the visualized image of the first distance image information corresponding to the time when the request has been received. Furthermore, when receiving a display request of the instruction screen, the provision unit 55b generates the instruction screen for receiving selection of the third vector, the fourth vector, and the second translation point, using the visualized image of the second distance image information corresponding to the time when the request has been received.

The other processing for generating the instruction screen by the provision unit 550b is similar to the processing of the provision unit 150b described in the embodiment 1.

The second acquisition unit 550c is a processing unit that acquires the first vector, the second vector, the first translation point, the third vector, the fourth vector, and the second translation point on the basis of the information selected by the user on the instruction screen.

Processing of specifying the selected start point coordinates and selected end point coordinates of the first to fourth vectors, and the selected coordinates of the first and second translation points selected by the user on the instruction screen by the second acquisition unit 550c will be described.

When the instruction screen for selecting the start point and the end point of the first vector is displayed on the display unit 530 by the provision unit 550b, the user operates the input unit 520 to select the start point and the end point of the first vector. The second acquisition unit 550c acquires information of the start point and the end point of the first vector from the input unit 520. The information of the start point and the end point of the first vector selected by the input unit 520 corresponds to the coordinates of the visible image.

The second acquisition unit 550c specifies coordinates of a point corresponding to the start point of the first vector selected by the user on the instruction screen on the basis of the first distance image information of the distance image table 540a, and registers the specified coordinates in the coordinate table 541 as the "selected start point coordinates" of the vector type "first vector".

The second acquisition unit 550c specifies coordinates of a point corresponding to the end point of the first vector selected by the user on the instruction screen on the basis of the first distance image information of the distance image table 540a, and registers the specified coordinates in the coordinate table 541 as the "selected end point coordinates" of the vector type "first vector".

When the instruction screen for selecting the start point and the end point of the second vector is displayed on the display unit 530 by the provision unit 550b, the user operates the input unit 520 to select the start point and the end point of the second vector. The second acquisition unit 550c acquires information of the start point and the end point of the second vector from the input unit 520. The information of the start point and the end point of the second vector corresponds to the coordinates of the visible image.

The second acquisition unit 550c specifies coordinates of a point corresponding to the start point of the second vector selected by the user on the instruction screen on the basis of the first distance image information of the distance image table 540a, and registers the specified coordinates in the coordinate table 541 as the "selected start point coordinates" of the vector type "second vector".

The second acquisition unit 550c specifies coordinates of a point corresponding to the end point of the first vector selected by the user on the instruction screen on the basis of the first distance image information of the distance image table 540a, and registers the specified coordinates in the coordinate table 541 as the "selected end point coordinates" of the vector type "second vector".

When the instruction screen for selecting the first translation point is displayed on the display unit 530 by the provision unit 550b, the user operates the input unit 520 to select the first translation point. The second acquisition unit 550c acquires information of the first translation point from the input unit 520. The information of the first translation point selected by the input unit 520 corresponds to the coordinates of the visible image.

The second acquisition unit 550c specifies coordinates of a point corresponding to the first translation point selected by the user on the instruction screen on the basis of the first distance image information of the distance image table 540a, and registers the specified coordinates in the coordinate table 542 as the "selected coordinates" of the translation point type "first translation point".

When the instruction screen for selecting the start point and the end point of the third vector is displayed on the display unit 530 by the provision unit 550b, the user operates the input unit 520 to select the start point and the end point of the third vector. The second acquisition unit 550c acquires information of the start point and the end point of the third vector from the input unit 520. The information of the start point and the end point of the third vector selected by the input unit 520 corresponds to the coordinates of the visible image.

The second acquisition unit 550c specifies coordinates of a point corresponding to the start point of the third vector selected by the user on the instruction screen on the basis of the second distance image information of the distance image table 540a, and registers the specified coordinates in the coordinate table 541 as the "selected start point coordinates" of the vector type "third vector".

The second acquisition unit 550c specifies coordinates of a point corresponding to the end point of the third vector selected by the user on the instruction screen on the basis of the second distance image information of the distance image table 540a, and registers the specified coordinates in the coordinate table 541 as the "selected end point coordinates" of the vector type "third vector".

When the instruction screen for selecting the start point and the end point of the fourth vector is displayed on the display unit 530 by the provision unit 550b, the user operates the input unit 520 to select the start point and the end point of the fourth vector. The second acquisition unit 550c acquires information of the start point and the end point of the fourth vector from the input unit 520. The information of the start point and the end point of the fourth vector selected by the input unit 520 corresponds to the coordinates of the visible image.

The second acquisition unit 550c specifies coordinates of a point corresponding to the start point of the fourth vector selected by the user on the instruction screen on the basis of the second distance image information of the distance image table 540a, and registers the specified coordinates in the coordinate table 541 as the "selected start point coordinates" of the vector type "fourth vector".

The second acquisition unit 550c specifies coordinates of a point corresponding to the end point of the fourth vector selected by the user on the instruction screen on the basis of the second distance image information of the distance image table 540a, and registers the specified coordinates in the coordinate table 541 as the "selected end point coordinates" of the vector type "fourth vector".

When the instruction screen for selecting the second translation point is displayed on the display unit 530 by the provision unit 550b, the user operates the input unit 520 to select the second translation point. The second acquisition unit 550c acquires information of the second translation point from the input unit 520. The information of the second translation point selected by the input unit 520 corresponds to the coordinates of the visible image.

The second acquisition unit 550c specifies coordinates of a point corresponding to the second translation point selected by the user on the instruction screen on the basis of the second distance image information of the distance image table 540a, and registers the specified coordinates in the coordinate table 542 as the "selected coordinates" of the translation point type "second translation point".

By the above processing, the selected start point coordinates and selected end point coordinates of the vector types "first vector to fourth vector" are registered in the coordinate table 541. The selected coordinates of the translation point types "first translation point and second translation point" are registered in the coordinate table 542.

Processing of specifying the candidate start point coordinates and the candidate end point coordinates of the first to fourth vectors, and the selected coordinates of the first and second translation points by the second acquisition unit 550c will be described. Here, as an example, it is assumed that the marker 30-1 is selected as the start point of the first vector and the marker 30-2 is selected as the end point of the first vector on the basis of the instruction screen. It is assumed that marker 30-2 is selected as the start point of the second vector and the marker 30-4 is selected as the end point of the second vector. It is assumed that the marker 30-2 is selected as the first translation point.

It is assumed that the marker 30-2 is selected as the start point of the third vector and the marker 30-3 is selected as the end point of the third vector on the basis of the instruction screen. It is assumed that the marker 30-2 is selected as the start point of the fourth vector and the marker 30-4 is selected as the end point of the fourth vector. It is assumed that the marker 30-2 is selected as the second translation point.

The second acquisition unit 550c binarizes the reflection intensity information (reflection intensity image) included in the first distance image information at time $T_{n+1}$. The time $T_n$ is the time corresponding to the first distance image information that generated the instruction screen.

For example, the second acquisition unit 550c sets a portion where the reflection intensity is less than a predetermined threshold to 0 and a portion where the reflection intensity is the threshold or larger to 1 in the reflection intensity image. The second acquisition unit 550c labels the portion set to 1 in the binarized reflection intensity image. In the reflection intensity image 60 illustrated in FIG. 29, the labeled regions are the region 61a to 61d, 62a to 62d, and 64a to 64d (63a to 63d are not included in the measurement range of the sensor 10A).

The second acquisition unit 550c compares the selected start point coordinates and the selected main point coordinates of each vector type of the coordinate table 541 with the coordinates of the labeled region, and associates the vector type with the labeled region, which are close to each other.

For example, in FIG. 29, since the regions 61a to 61d are closest to the selected start point coordinates of the vector type "first vector", the regions 61a to 61d are associated with the start point coordinates of the vector type "first vector". The second selection unit 550c specifies coordinates of an intersection of a line segment connecting center coordinates of the region 61a and center coordinates of the region 61c and a line segment connecting center coordinates of the region 61b and center coordinates of the region 61d as one candidate start point coordinates corresponding to the vector type of "first vector", and registers the specified coordinates in the coordinate table 541.

Since the regions 62a to 62d are closest to the selected end point coordinates of the vector type "first vector", the regions 62a to 62d are associated with the end point coordinates of the vector type "first vector". The second selection unit 550c specifies coordinates of an intersection of a line segment connecting center coordinates of the region 62a and center coordinates of the region 62c and a line segment connecting center coordinates of the region 62b and center coordinates of the region 62d as one candidate end point coordinates corresponding to the vector type of "first vector", and registers the specified coordinates in the coordinate table 541.

Since the regions 62a to 62d are closest to the selected start point coordinates of the vector type "second vector", the regions 62a to 62d are associated with the start point coordinates of the vector type "second vector". The second selection unit 550c specifies the coordinates of an intersection of a line segment connecting center coordinates of the region 62a and center coordinates of the region 62c and a line segment connecting center coordinates of the region 62b and center coordinates of the region 62d as one candidate start point coordinates corresponding to the vector type of "second vector", and registers the specified coordinates in the coordinate table 541.

Since the regions 64a to 64d are closest to the selected end point coordinates of the vector type "second vector", the regions 64a to 64d are also associated with the end point coordinates of the vector type "second vector". The second selection unit 550c specifies coordinates of an intersection of a line segment connecting center coordinates of the region 64a and center coordinates of the region 64c and a line segment connecting center coordinates of the region 64b and center coordinates of the region 64d as one candidate end point coordinates corresponding to the vector type of "second vector", and registers the specified coordinates in the coordinate table 541.

Since the regions 62a to 62d are closest to the selected coordinates of the translation point type "first translation point", the regions 62a to 62d are associated with the coordinates of the translation point type "first translation point". The second selection unit 550c specifies the coordinates of an intersection of a line segment connecting center coordinates of the region 62a and center coordinates of the region 62c and a line segment connecting center coordinates of the region 62b and center coordinates of the region 62d as one candidate coordinates corresponding to the translation point type of "first translation point", and registers the specified coordinates in the coordinate table 542.

The second acquisition unit 550c also executes the above processing for the first distance image information at time $T_{n+2}$, $T_{n+3}$, $T_{n+4}$, and $T_{n+5}$, and registers a plurality of candidate start point coordinates and a plurality of candidate end point coordinates corresponding to the first vector and the second vector in the coordinate table 541. Furthermore, the second acquisition unit 550c registers a plurality of candidate coordinates corresponding to the first translation point in the coordinate table 542.

The second acquisition unit 550c binarizes the reflection intensity information (reflection intensity image) included in the second distance image information at time $T_{n+1}$. The time $T_n$ is the time corresponding to the second distance image information that generated the instruction screen.

For example, the second acquisition unit 550c sets a portion where the reflection intensity is less than a predetermined threshold to 0 and a portion where the reflection intensity is the threshold or larger to 1 in the reflection intensity image. The second acquisition unit 550c labels the portion set to 1 in the binarized reflection intensity image. In the reflection intensity image 60 illustrated in FIG. 29, the labeled regions are the region 62a to 62d, 63a to 63d, and 64a to 64d (61a to 61d are not included in the measurement range of the sensor 10B).

The second acquisition unit 550c compares the selected start point coordinates and the selected main point coordinates of each vector type of the coordinate table 541 with the coordinates of the labeled region, and associates the vector type with the labeled region, which are close to each other.

For example, in FIG. 29, since the regions 62a to 62d are closest to the selected start point coordinates of the vector type "third vector", the regions 62a to 62d are associated with the start point coordinates of the vector type "third vector". The second selection unit 550c specifies coordinates of an intersection of a line segment connecting center coordinates of the region 62a and center coordinates of the region 62c and a line segment connecting center coordinates of the region 62b and center coordinates of the region 62d as one candidate start point coordinates corresponding to the vector type of "third vector" and registers the specified coordinates in the coordinate table 541.

Since the regions 63a to 63d are closest to the selected end point coordinates of the vector type "third vector", the regions 63a to 63d are associated with the end point coordinates of the vector type "third vector". The second selection unit 550c specifies coordinates of an intersection of a line segment connecting center coordinates of the region 63a and center coordinates of the region 63c and a line segment connecting center coordinates of the region 63b and center coordinates of the region 63d as one candidate end point coordinates corresponding to the vector type of "third vector", and registers the specified coordinates in the coordinate table 541.

Since the regions 62a to 62d are closest to the selected start point coordinates of the vector type "fourth vector", the regions 62a to 62d are associated with the start point coordinates of the vector type "fourth vector". The second selection unit 550c specifies the coordinates of an intersection of a line segment connecting center coordinates of the region 62a and center coordinates of the region 62c and a line segment connecting center coordinates of the region 62b and center coordinates of the region 62d as one candidate start point coordinates corresponding to the vector type of "fourth vector", and registers the specified coordinates in the coordinate table 541.

Since the regions 64a to 64d are closest to the selected end point coordinates of the vector type "fourth vector", the regions 64a to 64d are also associated with the end point coordinates of the vector type "fourth vector". The second selection unit 550c specifies coordinates of an intersection of a line segment connecting center coordinates of the region 64a and center coordinates of the region 64c and a line segment connecting center coordinates of the region 64b and center coordinates of the region 64d as one candidate end point coordinates corresponding to the vector type of "fourth vector", and registers the specified coordinates in the coordinate table 541.

Since the regions 62a to 62d are closest to the selected coordinates of the translation point type "second translation point", the regions 62a to 62d are associated with the coordinates of the translation point type "second translation point". The second selection unit 550c specifies coordinates of an intersection of a line segment connecting center coordinates of the region 62a and center coordinates of the region 62c and a line segment connecting center coordinates of the region 62b and center coordinates of the region 62d as one candidate coordinates corresponding to the translation point type of "second translation point", and registers the specified coordinates in the coordinate table 542.

The second acquisition unit 550c also executes the above processing for the second distance image information at time $T_{n+2}$, $T_{n+3}$, $T_{n+4}$, and $T_{n+5}$, and registers a plurality of candidate start point coordinates and a plurality of candidate end point coordinates corresponding to the third vector and the fourth vector in the coordinate table 541. Furthermore, the second acquisition unit 550c registers a plurality of candidate coordinates corresponding to the second translation point in the coordinate table 542.

The second acquisition unit 550c executes the above processing, thereby registering the respective coordinates in the coordinate tables 541 and 542 illustrated in FIG. 31.

The second acquisition unit 550c compares the selected start point coordinates of a certain vector type with the plurality of candidate start point coordinates corresponding to the vector type, and specifies the candidate start point coordinates closest to the selected start point coordinates as final start point coordinates of the vector. The second acquisition unit 550c compares the selected end point coordinates of a certain vector type with the plurality of candidate end point coordinates corresponding to the vector type, and specifies the candidate end point coordinates closest to the selected end point coordinates as final end point coordinates of the vector.

For example, the second acquisition unit 550c compares the selected start point coordinates corresponding to the vector type "first vector" with each candidate start point coordinates, and specifies the closest candidate start point coordinates as the final start point coordinates of the first vector. The second acquisition unit 550c compares the selected end point coordinates corresponding to the vector type "first vector" with each candidate end point coordinates, and specifies the closest candidate end point coordinates as the final end point coordinates of the first vector.

The second acquisition unit 550c performs similar processing for the other vector types "second vector, third vector, and fourth vector", thereby specifying the final start point coordinates and end point coordinates.

The second acquisition unit 550c compares the selected coordinates of a certain translation point type with a plurality of candidate coordinates corresponding to the translation point type, and specifies the candidate coordinates closest to the selected coordinates as final coordinates of the translation point.

For example, the second acquisition unit 550c compares the selected coordinates corresponding to the translation point type "first translation point" with each candidate coordinates, and specifies the closest candidate coordinates as the final coordinates of the first translation point. The second acquisition unit 550c compares the selected coordinates corresponding to the translation point type "second translation point" with each candidate coordinates, and specifies the closest candidate coordinates as the final coordinates of the second translation point.

The second selection unit 550c identifies identification information of a point corresponding to the final start point coordinates of the first vector from each point group on the basis of the first distance image information of the distance image table 540a. The identification information of the point corresponding to the start point of the first vector is referred to as "first start point identification information". The second acquisition unit 550c identifies identification information of a point corresponding to the final end point coordinates of the first vector from each point group on the basis of the first distance image information of the distance image table 540a. The identification information of the point corresponding to the end point of the first vector is referred to as "first end point identification Information".

The second selection unit 550c identifies identification information of a point corresponding to the final start point coordinates of the second vector from each point group on the basis of the first distance image information of the distance image table 540a. The identification information of the point corresponding to the start point of the second vector is referred to as "second start point identification information". The second acquisition unit 550c identifies identification information of a point corresponding to the final end point coordinates of the second vector from each point group on the basis of the first distance image information of the distance image table 540a. The identification information of the point corresponding to the end point of the second vector is referred to as "second end point identification information".

The second selection unit 550c identifies identification information of a point corresponding to the final start point coordinates of the third vector from each point group on the basis of the second distance image information of the distance image table 540a. The identification information of the point corresponding to the start point of the third vector is referred to as "third start point identification information". The second acquisition unit 550c identifies identification information of a point corresponding to the final end point coordinates of the third vector from each point group on the basis of the second distance image information of the distance image table 540a. The identification information of the point corresponding to the end point of the third vector is referred to as "third end point identification information".

The second selection unit 550c identifies identification information of a point corresponding to the final start point coordinates of the fourth vector from each point group on the basis of the second distance image information of the distance image table 540a. The identification information of the point corresponding to the start point of the fourth vector is referred to as "fourth start point identification information". The second acquisition unit 550c identifies identification information of a point corresponding to the final end point coordinates of the fourth vector from each point group on the basis of the second distance image information of the distance image table 540a. The identification information of the point corresponding to the end point of the fourth vector is referred to as "fourth end point identification information".

The second acquisition unit 550c identifies identification information of a point corresponding to the final coordinates of the first translation point from each point group on the basis of the first distance image information of the distance image table 540a. The identification information of the point corresponding to the first translation point is referred to as "first translation point identification information".

The second acquisition unit 550c identifies identification information of a point corresponding to the final coordinates of the second translation point from each point group on the basis of the second distance image information of the distance image table 540a. The identification information of the point corresponding to the second translation point is referred to as "second translation point identification information".

The second acquisition unit 550c outputs the first start point identification information, the first end point identification information, the second start point identification information, the second end point identification information, and the first translation point identification information to the calculation unit 550d. The second acquisition unit 550c outputs the third start point identification information, the third end point identification information, the fourth start point identification information, the fourth end point identification information, and the second translation point identification information to the calculation unit 550d.

The calculation unit 550d is a processing unit that calculates the rotation angle and the translation distance for alignment on the basis of the first vector, the second vector, the third vector, the fourth vector, the first translation point, and the second translation point. The calculation unit 550d stores the calculated rotation angle and translation distance information in the storage unit 540 as a parameter 540b. The processing of the calculation unit 550d is similar to the processing of the calculation unit 150d described in the embodiment 1.

The output unit 550e is a processing unit that outputs the parameter 540b to an external device such as the scoring device 200 described in the embodiment 1.

Figure 32:
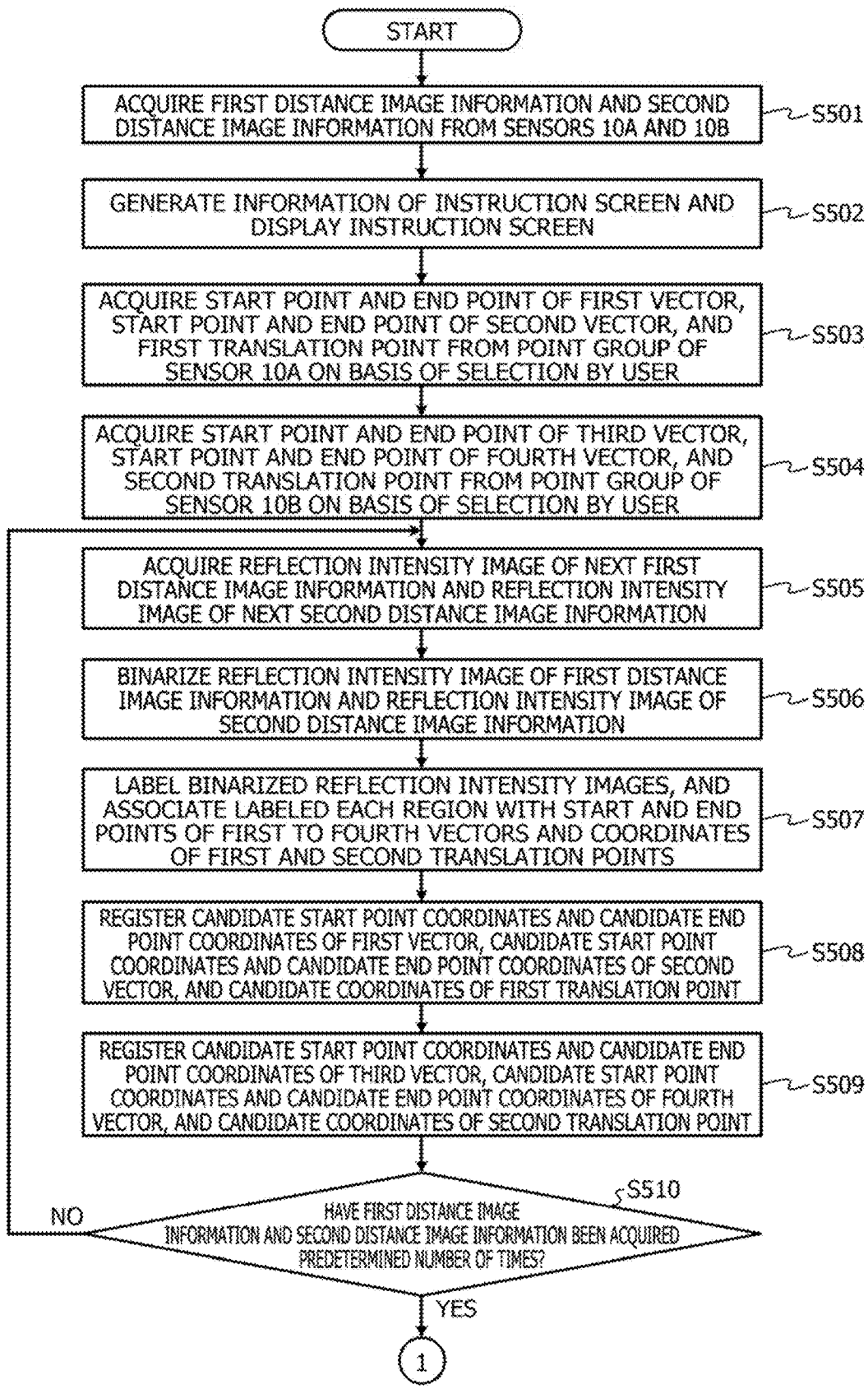
FIG. 32 is a flowchart (1) illustrating a processing procedure of the information processing apparatus according to the present embodiment 4.
Figure 33:
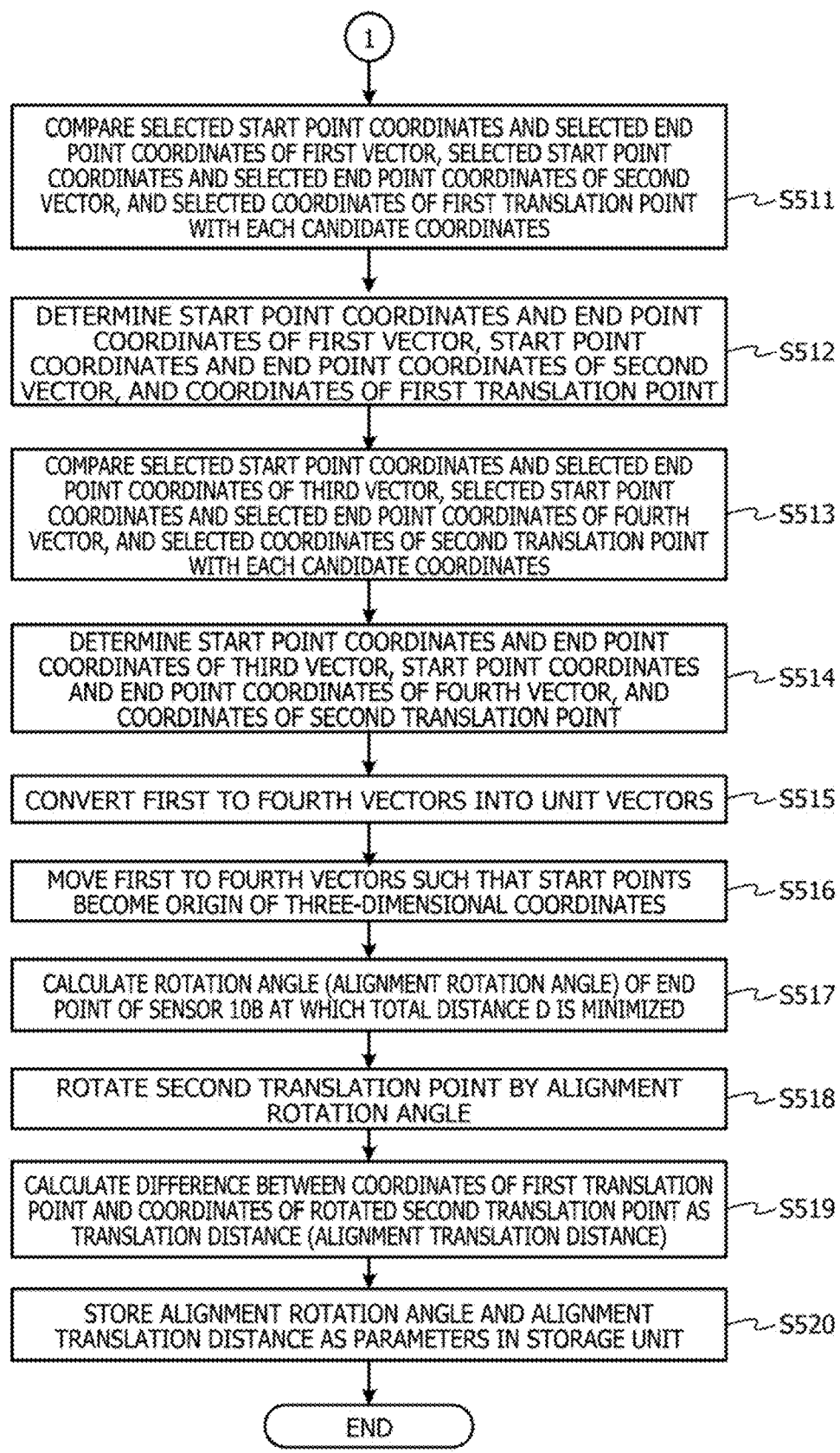
FIG. 33 is a flowchart (2) illustrating a processing procedure of the information processing apparatus according to the present embodiment 4.

Next, an example of a processing procedure of the information processing apparatus 400 according to the present embodiment 4 will be described. FIGS. 32 and 33 are flowcharts illustrating a processing procedure of the information processing apparatus according to the present embodiment 4. As illustrated in FIG. 32, the first acquisition unit 550a of the information processing apparatus 400 acquires the first distance image information and the second distance image information from the sensors 10A and 10B (step S501).

The provision unit 550*b* of the information processing apparatus 500 generates the information of the instruction screen and causes the display unit 530 to display the instruction screen (step S502).

The second acquisition unit 550*c* of the information processing apparatus 500 acquires the start point and end point of the first vector, the start point and end point of the second vector, and the first translation point from the point group of the sensor 10A on the basis of the selection by the user (step S503). The second acquisition unit 550*c* acquires the start point and end point of the third vector, the start point and end point of the fourth vector, and the second translation point from the point group of the sensor 10B on the basis of the selection by the user (step S504).

The second acquisition unit 550*c* acquires the reflection intensity image of the next first distance image information and reflection distance image information of the next second distance image information (step S505). The second acquisition unit 550*c* binarizes the reflection intensity image of the first distance image information and the reflection distance image information of the second distance image information (step S506).

The second acquisition unit 550*c* labels the binarized reflection intensity image, and associates each labeled region with the start points and end points of the first to fourth vectors and the coordinates of the first and second translation points (step S507).

The second acquisition unit 550*c* registers the candidate start point coordinates and candidate end point coordinates of the first vector, the candidate start point coordinates and candidate end point coordinates of the second vector, and the candidate coordinates of the first translation point in the specification table 540*c* (step S508). The second acquisition unit 550*c* registers the candidate start point coordinates and candidate end point coordinates of the third vector, the candidate start point coordinates and candidate end point coordinates of the fourth vector, and the candidate coordinates of the second translation point in the specification table 540*c* (step S509).

In a case where the information processing apparatus 500 has not acquired the first distance image information and the second distance image information a predetermined number of times (a preset number of times) (step S510, No), the information processing apparatus 500 proceeds to step S505. On the other hand, in a case where the information processing apparatus 500 has acquired the first distance image information and the second distance image information the predetermined number of times (step S510, Yes), the information processing apparatus 500 proceeds to step S511 in FIG. 33.

Next, description of FIG. 33 will be given.

The second acquisition unit 550*c* compares the selected start point coordinates and selected end point coordinates of the first vector, the selected start point coordinates and selected end points of the second vector, and the selected coordinates of the first translation point with the respective candidate coordinates (step S511). The second acquisition unit 550*c* determines the start point coordinates and end point coordinates of the first vector, the start point coordinates and end point coordinates of the second vector, and the coordinates of the first translation point (step S512).

The second acquisition unit 550*c* compares the selected start point coordinates and selected end point coordinates of the third vector, the selected start point coordinates and selected end points of the fourth vector, and the selected coordinates of the second translation point with the respective candidate coordinates (step S513). The second acquisition unit 550*c* determines the start point coordinates and end point coordinates of the fourth vector, the start point coordinates and end point coordinates of the fourth vector, and the coordinates of the second translation point (step S514).

The calculation unit 550*d* of the information processing apparatus 500 converts the first to fourth vectors into unit vectors (step S515). The calculation unit 550*d* moves the first to fourth vectors such that the start points become the origin of three-dimensional coordinates (step S516).

The calculation unit 550*d* calculates the rotation angle (alignment rotation angle) of the end point of the sensor 10B at which the total distance D is minimized (step S517). The calculation unit 550*d* rotates the second translation point by the alignment rotation angle (step S518).

The calculation unit 550*d* calculates the difference between the coordinates of the first translation point and the coordinates of the rotated second translation point as the translation distance (alignment translation distance) (step S519). The calculation unit 550*d* stores the alignment rotation angle and the alignment translation distance as parameter 540*b* in the storage unit 540 (step S520).

Next, effects of the information processing apparatus 500 according to the present embodiment 4 will be described. The information processing apparatus 500 repeatedly executes processing of specifying the coordinates of each sticker arranged on each marker on the basis of the reflection intensity image sequentially input from the sensor 10A or 10B, and calculating the coordinates of each marker on the basis of the coordinates of each sticker. The information processing apparatus 500 performs processing of correcting the start points and end points of the first to fourth vectors and the coordinates of the first and second translation points selected by the user on the basis of the positions of the respective markers. The information processing apparatus 500 executes such processing, thereby specifying the optimum start points and end points of the first to fourth vectors and the optimum positions of the first and second translation points even in the case where the start points and end points of the first to fourth vectors and the positions of the first and second translation points selected by the user are not accurate or even in the case where the markers are shifted due to some reasons after selected.

Figure 34:
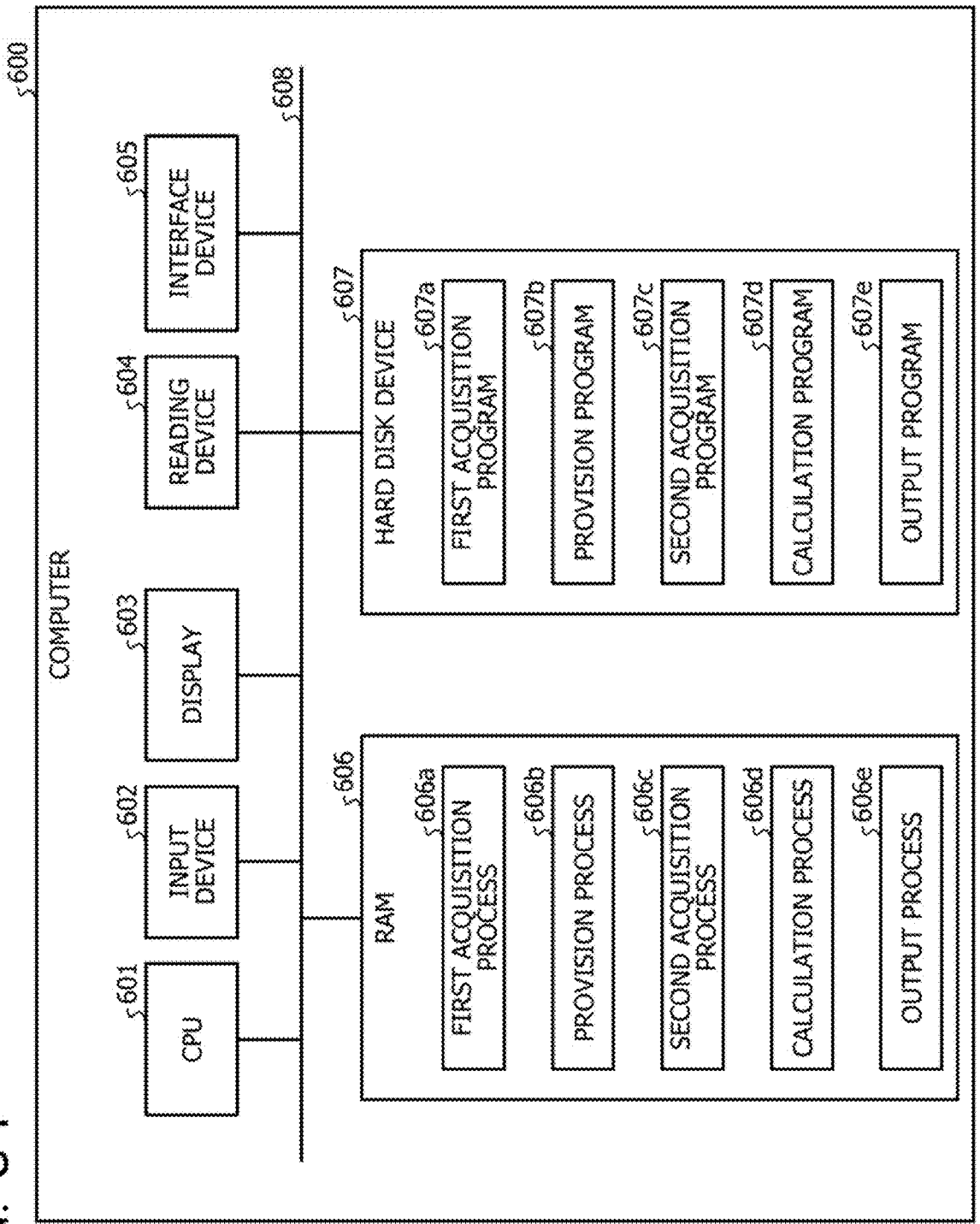
FIG. 34 is a diagram illustrating an example of a hardware configuration of a computer that implements functions similar to the information processing apparatus according to the present embodiment.

Next, an example of a hardware configuration of a computer that implements functions similar to the information processing apparatus 100, 300, 400, or 500 and the scoring device 200 described in the embodiments will be described. FIG. 34 is a diagram illustrating an example of a hardware configuration of a computer that implements functions similar to the information processing apparatus according to the present embodiment.

As illustrated in FIG. 34, a computer 600 includes a CPU 601 that executes various types of arithmetic processing, an input device 602 that receives data input from a user, and a display 603. Furthermore, the computer 600 includes a reading device 604 that reads a program and the like from a storage medium, and an interface device 605 that exchanges data with an external device or the like via a wired or wireless network. The interface device 605 is connected to the sensors 10A and 10B, and the like. Furthermore, the interface device 605 may be connected to the scoring device 200. The computer 600 includes a RAM 606 that temporarily stores various types of information, and a hard disk device 607. Then, the respective devices 601 to 607 are connected to a bus 608.

The hard disk device 607 includes a first acquisition program 607*a*, a provision program 607*b*, a second acquisition program 607c, a calculation program 607d, and an output program 607e. The CPU 601 reads the first acquisition program 607a, the provision program 607b, the second acquisition program 607c, the calculation program 607d, and the output program 607e, and expands the read programs to the RAM 406.

The first acquisition program 607a functions as a first acquisition process 606a. The provision program 607b functions as a provision process 606b. The second acquisition program 607c functions as a second acquisition process 606c. The calculation program 607d functions as a calculation process 607d. The output program 607e functions as an output process 607e.

Processing of the first acquisition process 606a corresponds to the processing of the first acquisition unit 150a, 350a, 450a, or 550a. Processing of the provision process 606b corresponds to the processing of the provision unit 150b, 450b, or 550b. Processing of the second acquisition process 606c corresponds to the processing of the second acquisition unit 150c, 350b, 450c, or 550c. Processing of the calculation process 606d corresponds to the processing of the calculation unit 150d, 350c, 450d, or 550d. Processing of the output process 606e corresponds to the processing of the output unit 150e, 350d, 450e, or 550e.

Note that the respective programs 607a to 607e may not need to be stored in the hard disk device 507 beforehand. For example, each of the programs may be stored in a "portable physical medium" such as a flexible disk (FD), a compact disc read only memory (CD-ROM), a digital versatile disc (DVD) disk, a magneto-optical disk, or an IC card to be inserted in the computer 600. Then, the computer 600 may read and execute each of the programs 607a to 607e.

Figure 35:
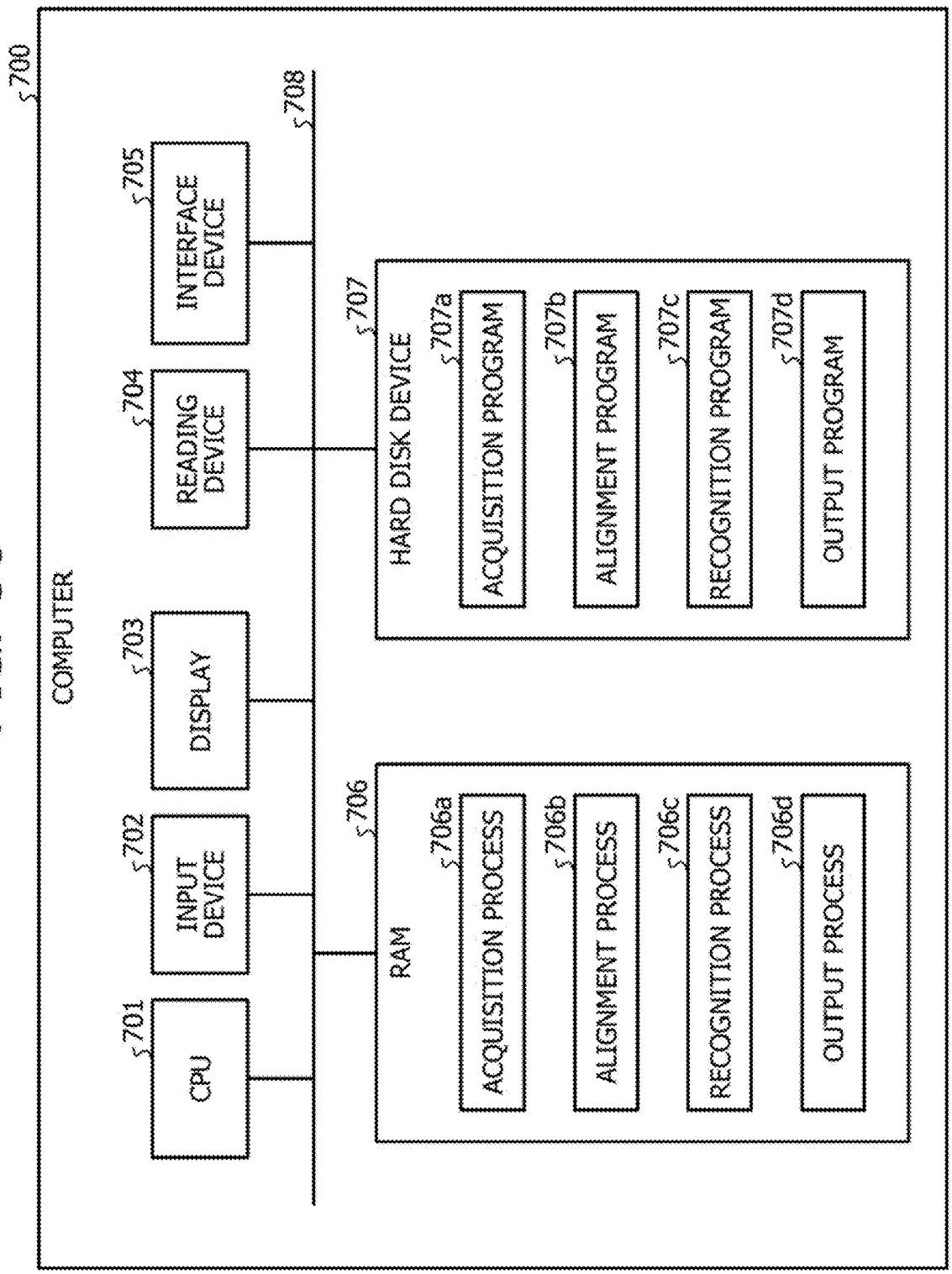
FIG. 35 is a diagram illustrating an example of a hardware configuration of a computer that implements functions similar to the scoring device according to the present embodiment.

FIG. 35 is a diagram illustrating an example of a hardware configuration of a computer that implements functions similar to the scoring device according to the present embodiment.

As Illustrated in FIG. 35, a computer 700 includes a CPU 701 that executes various types of arithmetic processing, an input device 702 that receives data input from a user, and a display 703. Furthermore, the computer 700 includes a reading device 704 that reads a program and the like from a storage medium, and an interface device 705 that exchanges data with an external device or the like via a wired or wireless network. The computer 700 includes a RAM 706 that temporarily stores various types of information, and a hard disk device 707. Then, the devices 701 to 707 are connected to a bus 708.

The hard disk device 707 includes an acquisition program 707a, an alignment program 707b, a recognition program 707c, and an output program 707d. The CPU 701 reads the acquisition program 707a, the alignment program 707b, the recognition program 707c, and the output program 707d and expands the read programs to the RAM 706.

The acquisition program 707a functions as an acquisition process 706a. The alignment program 707b functions as an alignment process 706b. The recognition program 707c functions as a recognition process 706c. Processing of the output process 706a corresponds to the processing of the output unit 350d.

Note that the respective programs 707a to 707d may not need to be stored in the hard disk device 707 beforehand. For example, each of the programs may be stored in a "portable physical medium" such as a flexible disk (FD), a compact disc read only memory (CD-ROM), a digital versatile disc (DVD) disk, a magneto-optical disk, or an IC card to be inserted in the computer 700. Then, the computer 700 may read and execute each of the programs 707a to 707d.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A calculation method for causing a computer to execute processing of:
    acquiring first measurement information including information of a distance to an object measured by a first sensor, and second measurement information including information of a distance to the object measured by a second sensor;
    acquiring a first vector, a second vector in a different direction from the first vector, and a first translation point from the first measurement information;
    acquiring information of a third vector treated as a vector parallel to and in a same direction as the first vector in a real space, a fourth vector treated as a vector parallel to and in a same direction as the second vector in the real space, and a second translation point treated as a same position as the first translation point in the real space from the second measurement information;
    calculating a rotation angle and a translation distance for aligning a point group of the object measured by the second sensor with respect to a point group of the object measured by the first sensor on the basis of an end point of the first vector, an end point of the second vector, the first translation point, an end point of the third vector, an end point of the fourth vector, and the second translation point; and
    storing the rotation angle and the translation distance in a storage device.

2. The calculation method according to claim 1, wherein the computer further executes processing of: acquiring a first image indicating a measurement result by the first sensor and a second image indicating a measurement result by the second sensor, displaying the first image and the second image in a display device, and receiving selection of a start point and the end point of the first vector, a start point and the end point of the second vector, the first translation point, a start point and the end point of the third vector, a start point and the end point of the fourth vector, and the second translation point.

3. The calculation method according to claim 2, wherein the first image includes an image of a first shape marker, an image of a second shape marker, and an image of a third shape marker, the second image includes the image of the second shape marker, the image of the third shape marker, and an image of a fourth shape marker, and a first line segment passing through the first shape marker and the fourth shape marker and a second line segment passing through the second shape marker and the third shape marker intersect in the real space, and the computer further executes processing of: acquiring a vector from a point corresponding to the first shape marker to a point corresponding to the second shape marker as the first vector, a vector from a point corresponding to the second shape marker to a point corresponding to the third shape marker as the second vector, and the point corresponding to the second shape marker as the first translation point, in the point group included in the first measurement information, and acquiring a vector from a point corresponding to the second shape marker to a point corresponding to the fourth shape marker as the third vector, a vector from the point corresponding to the second shape marker to a point corresponding to the third shape marker as the fourth vector, and the point corresponding to the second shape marker as the second translation point, in the point group included in the second measurement information.

4. The calculation method according to claim 3, wherein the first line segment and the second line segment are orthogonal to each other in the real space.

5. The calculation method according to claim 2, wherein the first image and the second image include an image of an object having a horizontal portion and an object having a vertical portion, and selection of the start point and the end point of the first vector, the start point and the end point of the second vector, the first translation point, the start point and the end point of the third vector, the start point and the end point of the fourth vector, and the second translation point is received from points on the object having the horizontal portion and on the object having the vertical portion.

6. The calculation method according to claim 1, wherein the computer further executes: aligning the point group measured by the first sensor and the point group measured by the second sensor on the basis of the rotation angle and the translation distance.

7. The calculation method according to claim 1, wherein a plurality of markers has a plurality of reflectors arranged respectively, and the first measurement information further includes first reflection intensity information of light of the plurality of markers and the second measurement information further includes second reflection intensity information of light of the plurality of markers, and the computer further executes processing of: correcting a start point and the end point of the first vector, a start point and the end point of the second vector, and the first translation point on the basis of positions of the markers respectively estimated from a plurality of pieces of the first reflection intensity information, and correcting a start point and the end point of the third vector, a start point and the end point of the fourth vector, and the second translation point on the basis of positions of the markers respectively estimated from a plurality of pieces of the second reflection intensity information.

8. A non-transitory computer-readable recording medium recording a calculation program for causing a computer to execute processing of:
  acquiring first measurement information including information of a distance to an object measured by a first sensor, and second measurement information including information of a distance to the object measured by a second sensor;
  acquiring a first vector, a second vector in a different direction from the first vector, and a first translation point from the first measurement information;
  acquiring information of a third vector treated as a vector parallel to and in a same direction as the first vector in a real space, a fourth vector treated as a vector parallel to and in a same direction as the second vector in the real space, and a second translation point treated as a same position as the first translation point in the real space from the second measurement information;
  calculating a rotation angle and a translation distance for aligning a point group of the object measured by the second sensor with respect to a point group of the object measured by the first sensor on the basis of an end point of the first vector, an end point of the second vector, the first translation point, an end point of the third vector, an end point of the fourth vector, and the second translation point; and
  storing the rotation angle and the translation distance in a storage device.

9. The non-transitory computer-readable recording medium according to claim 8, wherein the computer further executes processing of: acquiring a first image indicating a measurement result by the first sensor and a second image indicating a measurement result by the second sensor, displaying the first image and the second image in a display device, and receiving selection of a start point and the end point of the first vector, a start point and the end point of the second vector, the first translation point, a start point and the end point of the third vector, a start point and the end point of the fourth vector, and the second translation point.

10. The non-transitory computer-readable recording medium according to claim 9, wherein the first image includes an image of a first shape marker, an image of a second shape marker, and an image of a third shape marker, the second image includes the image of the second shape marker, the image of the third shape marker, and an image of a fourth shape marker, and a first line segment passing through the first shape marker and the fourth shape marker and a second line segment passing through the second shape marker and the third shape marker intersect in the real space, and the computer further executes processing of: acquiring a vector from a point corresponding to the first shape marker to a point corresponding to the second shape marker as the first vector, a vector from the point corresponding to the second shape marker to a point corresponding to the third shape marker as the second vector, and the point corresponding to the second shape marker as the first translation point, in the point group included in the first measurement information, and acquiring a vector from a point corresponding to the second shape marker to a point corresponding to the fourth shape marker as the third vector, a vector from the point corresponding to the second shape marker to a point corresponding to the third shape marker as the fourth vector, and the point corresponding to the second shape marker as the second translation point, in the point group included in the second measurement information.

11. The non-transitory computer-readable recording medium according to claim 10, wherein the first line segment and the second line segment are orthogonal to each other in the real space.

12. The non-transitory computer-readable recording medium according to claim 9, wherein the first image and the second image include an image of an object having a horizontal portion and an object having a vertical portion, and selection of the start point and the end point of the first vector, the start point and the end point of the second vector, the first translation point, the start point and the end point of the third vector, the start point and the end point of the fourth vector, and the second translation point is received from points on the object having the horizontal portion and on the object having the vertical portion.

13. The non-transitory computer-readable recording medium according to claim 8, wherein the computer further executes: aligning the point group measured by the first sensor and the point group measured by the second sensor on the basis of the rotation angle and the translation distance.

14. The non-transitory computer-readable recording medium according to claim 8, wherein a plurality of markers has a plurality of reflectors arranged respectively, and the first measurement information further includes first reflection intensity information of light of the plurality of markers and the second measurement information further includes second reflection intensity information of light of the plurality of markers, and the computer further executes processing of: correcting a start point and the end point of the first vector, a start point and the end point of the second vector, and the first translation point on the basis of positions of the markers respectively estimated from a plurality of pieces of the first reflection intensity information, and correcting a start point and the end point of the third vector, a start point and the end point of the fourth vector, and the second translation point on the basis of positions of the markers respectively estimated from a plurality of pieces of the second reflection intensity information.

15. An information processing apparatus comprising:
a memory; and
a processor coupled to the memory and configured to:
acquire first measurement information including information of a distance to an object measured by a first sensor, and second measurement information including Information of a distance to the object measured by a second sensor;
acquire a first vector, a second vector in a different direction from the first vector, and a first translation point from the first measurement information, and information of a third vector treated as a vector parallel to and in a same direction as the first vector in a real space, a fourth vector treated as a vector parallel to and in a same direction as the second vector in the real space, and a second translation point treated as a same position as the first translation point in the real space from the second measurement information; and calculate a rotation angle and a translation distance for aligning a point group of the object measured by the second sensor with respect to a point group of the object measured by the first sensor on the basis of an end point of the first vector, an end point of the second vector, the first translation point, an end point of the third vector, an end point of the fourth vector, and the second translation point, and store the rotation angle and the translation distance in the memory.

16. The information processing apparatus according to claim 15, wherein the processor is configured to acquire a first image indicating a measurement result by the first sensor and a second image indicating a measurement result by the second sensor, display the first image and the second image in a display device, and receive selection of a start point and the end point of the first vector, a start point and the end point of the second vector, the first translation point, a start point and the end point of the third vector, a start point and the end point of the fourth vector, and the second translation point.

17. The information processing apparatus according to claim 16, wherein the first image includes an image of a first shape marker, an image of a second shape marker, and an image of a third shape marker, the second image includes the image of the second shape marker, the image of the third shape marker, and an image of a fourth shape marker, and a first line segment passing through the first shape marker and the fourth shape marker and a second line segment passing through the second shape marker and the third shape marker intersect in the real space, the processor is configured to: acquire a vector from a point corresponding to the first shape marker to a point corresponding to the second shape marker as the first vector, a vector from the point corresponding to the second shape marker to a point corresponding to the third shape marker as the second vector, and the point corresponding to the second shape marker as the first translation point, in the point group included in the first measurement information, and acquire a vector from a point corresponding to the second shape marker to a point corresponding to the fourth shape marker as the third vector, a vector from the point corresponding to the second shape marker to a point corresponding to the third shape marker as the fourth vector, and the point corresponding to the second shape marker as the second translation point, in the point group included in the second measurement information.

18. The information processing apparatus according to claim 17, wherein the first line segment and the second line segment are orthogonal to each other in the real space.

19. The information processing apparatus according to claim 16, wherein the first image and the second image include an image of an object having a horizontal portion and an object having a vertical portion, and the processor is configured to receive selection of the start point and the end point of the first vector, the start point and the end point of the second vector, the first translation point, the start point and the end point of the third vector, the start point and the end point of the fourth vector, and the second translation point from points on the object having the horizontal portion and on the object having the vertical portion.

20. The information processing apparatus according to claim 15, wherein the processor is configured to align the point group measured by the first sensor and the point group measured by the second sensor on the basis of the rotation angle and the translation distance.

* * * * *